(12) United States Patent
Goswami et al.

(10) Patent No.: US 6,689,391 B2
(45) Date of Patent: Feb. 10, 2004

(54) NATURAL NON-POLAR FLUORESCENT DYE FROM A NON-BIOLUMINESCENT MARINE INVERTEBRATE, COMPOSITIONS CONTAINING THE SAID DYE AND ITS USES

(75) Inventors: Usha Goswami, Goa (IN); Anutosh Ganguly, Goa (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 10/107,588

(22) Filed: Mar. 28, 2002

(65) Prior Publication Data

US 2003/0021851 A1 Jan. 30, 2003

Related U.S. Application Data

(63) Continuation-in-part of application No. 09/820,654, filed on Mar. 30, 2001, now Pat. No. 6,582,730.

(51) Int. Cl.⁷ .................. A61K 35/48; A61K 35/32; A61K 35/56; C09B 1/00
(52) U.S. Cl. .................. 424/559; 424/520; 424/547; 435/41; 435/810; 435/968; 8/648
(58) Field of Search .................. 424/520, 559, 424/547; 435/41, 968, 810; 8/648

(56) References Cited

U.S. PATENT DOCUMENTS

| | | |
|---|---|---|
| 4,063,878 A | 12/1977 | Weeks |
| 4,452,822 A | 6/1984 | Shrikhande |
| 4,762,701 A | 8/1988 | Horan et al. |
| 4,774,339 A | 9/1988 | Haugland et al. |
| 4,783,401 A | 11/1988 | Horan et al. |
| 4,859,584 A | 8/1989 | Horan et al. |
| 5,187,288 A | 2/1993 | Kang et al. |
| 5,248,782 A | 9/1993 | Haugland et al. |
| 5,274,113 A | 12/1993 | Kang et al. |
| 5,304,493 A | 4/1994 | Nowak |
| 5,321,268 A | 6/1994 | Crosby et al. |
| 5,405,416 A | 4/1995 | Swinton |
| 5,433,896 A | 7/1995 | Kang et al. |
| 5,451,663 A | 9/1995 | Kang et al. |
| 5,519,010 A * | 5/1996 | Fan et al. |
| 5,710,197 A | 1/1998 | Fischer et al. |
| 5,770,205 A | 6/1998 | Collin |
| 5,858,761 A | 1/1999 | Tsubokura et al. |
| 5,876,762 A * | 3/1999 | Collin |
| 5,888,514 A | 3/1999 | Weisman |
| 5,902,749 A | 5/1999 | Lichtwardt et al. |
| 5,908,650 A | 6/1999 | Lenoble et al. |
| 5,920,429 A | 7/1999 | Burns et al. |
| 5,935,808 A | 8/1999 | Hirschberg et al. |
| 5,985,330 A | 11/1999 | Collin |
| 5,989,135 A | 11/1999 | Welch |
| 5,993,797 A | 11/1999 | Kitazato et al. |
| 6,055,936 A | 5/2000 | Collin |
| 6,056,162 A | 5/2000 | Leighley |
| 6,103,006 A | 8/2000 | DiPietro |
| 6,110,566 A | 8/2000 | White et al. |
| 6,140,041 A | 10/2000 | LaClair |
| 6,165,384 A | 12/2000 | Cooper et al. |
| 6,180,154 B1 | 1/2001 | Wrolstad et al. |
| 6,203,827 B1 | 3/2001 | Katsukura |
| 6,255,295 B1 | 7/2001 | Henderson et al. |
| 6,428,823 B1 | 8/2002 | Goswami et al. |

FOREIGN PATENT DOCUMENTS

| | | |
|---|---|---|
| AU | 704112 | 4/1997 |
| CN | 1142365 | 2/1997 |
| CN | 1173290 | 2/1998 |
| CN | 1179261 | 4/1998 |
| CN | 1223131 | 7/1999 |
| CN | 1286926 | 3/2001 |
| CN | 1312031 | 9/2001 |
| DE | 4416476 A1 | 11/1995 |
| DE | 19643097 A1 | 4/1998 |
| DE | 19648564 A1 | 5/1998 |
| DE | 19650958 A1 | 6/1998 |
| DE | 19755642 A1 | 6/1999 |
| DE | 19711445 A1 | 4/2001 |
| DE | 19611351 A1 | 10/2001 |
| EP | 0206718 A2 | 12/1986 |
| EP | 0410002 A1 | 1/1991 |
| EP | 0495116 A1 | 7/1992 |
| IR | 901379 | 4/1990 |
| RU | 2147239 | 4/2000 |
| WO | WO9010044 | 9/1990 |
| WO | WO9530679 | 11/1995 |
| WO | WO9920688 | 4/1999 |
| WO | WO9937314 | 7/1999 |
| WO | WO9938916 | 8/1999 |
| WO | WO9938919 | 8/1999 |
| WO | WO0001399 | 1/2000 |
| WO | WO9823688 | 7/2000 |
| WO | WO0058406 | 10/2000 |
| WO | WO9841583 | 4/2001 |
| WO | WO9735926 | 10/2001 |

OTHER PUBLICATIONS

Indap et al. Environ. Ecol. 1996. vol. 14, No. 4, pp. 917–919, LIFESCI Abstract enclosed.*
Anjaneyulu et al. Indian J. Chem. 1995. vol. 34, No. 7, pp. 666–668, SCISEARCH Abstract enclosed.*
Villela, G. The fluorescent pigment of *Holothuria grisea*. Rev. Brasil. Biol. 1951. vol. 11, pp. 33–36.*

(List continued on next page.)

*Primary Examiner*—Christopher R. Tate
(74) *Attorney, Agent, or Firm*—Steven B. Kelber; Piper Rudnick LLP

(57) ABSTRACT

The present invention discloses a process of extraction, purification and characterization of a non-polar fluorescent dye from a marine echinoderm *Holothuria scabra*, compositions containing the dye and various applications of the dye, said dye is a natural, cell permeant, nontoxic and environmentally friendly non-polar fluorescent dye.

15 Claims, 17 Drawing Sheets

(10 of 17 Drawing Sheet(s) Filed in Color)

OTHER PUBLICATIONS

Hobson, D.K., et al., "'Green' Dyes", Journal of Society of Dyers and Colorists, vol. 114, 42–44, (1998).

Bandaranayake, W.M., et al., "Role of Secondary Metabolites and Pigments in the Epidermal Tissues, Ripe Ovaries, Viscera, Gut Contents and Diet of the Sea Cucumber *Holothuria Atra*", Marine Biology, 133, 163–169 (1999).

Shimomura, O., et al., "Extraction, Purification and Properties of Aequorin, a Bioluminescent Protein from the Luminous Hydromedusan, Aequorea", Luminescence of Aequorin, Journal of Cellular and Comparative Physiology, 59, 223–239 (1962).

Chalfie, M., "Green Fluorescent Protein", Photochemistry and Photobiology, vol. 62, No. 4, 651–656 (1995).

Youvan, D.C., et al., "Structure and Fluorescence Mechanism of GFP", Nature Biotechnology, vol. 14, (1995).

Chalfie, M., et al., "Green Fluorescent Protein as a Marker for Gene Expression", Science, vol. 263, 802–805 (1994).

Gurskaya, N.G., et al., "GFP–Like Chromoproteins as a Source of Far–Red Fluorescent Proteins", FEBS Letters, 507, 16–20 (2001).

Wachter, R. M., et al., "Structural Basis of Spectral Shifts in the Yellow–Emission Variants of Green Fluorescent Protein", Structure, vol. 6, No. 10, 1267–1277 (1998).

Fradkov, A.F., et al., "Novel Fluorescent Protein from *Discosoma* Coral and its Mutants Possesses a Unique Far–Red Fluorescence", FEBS Letters 479, 127–130 (2000).

Matz, M. V., et al., "Fluorescent Proteins from Nonbioluminescent Anthozoa Species", Nature Biotechnology, vol. 17, 969–973 (1999).

Mercier, A., et al., "Settlement Preferences and Early Migration of the Tropical Sea Cucumber *Holothuria Scabra*", J. Exp. Mar. Biol. and Ecol., 249, 89–110 (2000).

Johnson, I.D., "Introduction to Fluorescence Techniques", Handbook of Fluorescent Probes and Research Chemicals, $6^{th}$ Ed., 1, 1–6 (1996).

Haugland, R.P., "A Wide Variety of Protein Conjugates", Handbook of Fluorescent Probes and Research Chemicals, $6^{th}$ Ed., 7, 126–128 (1996).

Jones, R. N., "Fluorescence", Encyclopedia of Chemistry, $2^{nd}$ Ed. 435–436 (1966).

Linz, A., "Pigments", Encyclopedia of Chemistry, $2^{nd}$ Ed. 833–835 (1966).

* cited by examiner

NATURAL NON-POLAR FLUORESCENT DYE FROM A NON-BIOLUMINESCENT MARINE INVERTEBRATE, COMPOSITIONS CONTAINING THE SAID DYE AND ITS USES

The present application is a continuation-in-part application of U.S. patent application Ser. No. 09/820,654, filed on Mar. 30, 2001 now U.S. Pat. No. 6,582,730.

FIELD OF THE INVENTION

The present invention relates to a bioactive extract containing a natural non-polar and non-proteinaceous fluorescent dye extracted from alcoholic extract of ovarian tissue of a marine invertebrate *Holothuria scabra*. The invention also provides a process for the extraction, partial purification and characterization of this new non-polar dye. The marine invertebrate mentioned is especially the sea cucumber. Sea cucumbers are echinoderms, members of the group of spiny skinned animals that also includes starfishes and sea urchins. Scientifically called Holothurians, they have elongated tubular bodies which are rubbery and without bony skeletons. They have the following taxonomic position.

BACKGROUND AND PRIOR ART REFERENCES

Sea cucumbers have following taxonomic position.

Subkingdom: Metazoa
    Phylum: Echinodermata
        Sub-Phylum: Eleutherozoa
            Class: Holothuroidea
                Subclasses: Aspidochirotacea, Dendrochirotacea, Apodacea
                    Orders: Dendrochirota, Aspidochirota, Elasipoda, Molpadonia
                        and Apoda Amongst these orders sea cucumber *Holothuria scabra* belongs to:

Order: Aspidochirota
    Family: Holothuriidae
        Genus: Holothuria
            Species: *scabra*

Echinoderms are coelomate invertebrates which are exclusively marine, never colonial, are unsegmented with a basic pentameric radial, symmetry in the adult form, no head or brain, and distinguished from all other animals by structural peculiarities of skeleton and coelom. Class Holothuroidea has animals with body bilaterally symmetrical, usually elongated in the oral-aboral axis having mouth at or near one end and anus at or near the other end. The body surface is coarse, endoskeleton reduced to microscopic spicules or plates embedded in the body wall, mouth surrounded by a set of tentacles attached to water vascular system; podia or tube feet are usually present and locomotory; alimentary canal is long and coiled and cloaca usually with respiratory trees; sexes are usually separate and gonad single or paired tuft of tubules. They are sedentary forms either attached to hard substrate or burrow into soft sediments with anterior and posterior ends projected. There are more than 1000 species of holothuroids. They vary from 2 cm to 2 meter in length. They are among a few of the animals whose habitat is not restricted by ocean depths. Some of the species are reported to be making 50% of life forms at 4000 m and 90% at 8000-m depths. The species *Holothuria scabra* also called by some as *Metriatyla scabra* Jaegea is widely distributed in East Africa, Red Sea, Bay of Bengal, East India, Australia, Japan, South Pacific, Philippines, Indian Ocean and other Indo-Pacific regions. It is used for human/animal consumption in Sabah, Malaysia and Indonesia and other Indo-Pacific countries.

Fluorescent dyes are of immense value in the fluorescent probe industries to enable researchers to detect particular components of complex biomolecular assemblies, including live cells with exquisite sensitivity and selectivity (Iain D. Johnson. "Introduction to fluorescence techniques" Chapter 1.pp1 in The Handbook of Fluorescent probes and Research Chemicals by Richard P. Haughland, $6^{th}$ edition Printed in the United States of America, 1996). Fluorescent dyes are widely used in labeling of molecular probes for localizing biological structures by fluorescence microscopy e.g in immunoassays, labeling nucleotides and oligonucleotides for in situ hybridization studies, binding to polymeric microspheres and staining of cells for use in imaging studies. Dyes are also used for selective destruction of cells such as in the technique of photodynamic therapy. (Haughland, R. P and Kang, H. C. U.S. Pat. No. 4,774,339 of Sep. 27, 1988; Haughland, R. P and Kang, H. C. U.S. Pat. No. 5,248,782, Sep. 28, 1993).

Non-polar dyes are useful in detection of neutral lipids and other non-polar liquids. The fluorophores with the non-polar quality are most suitable for making conjugants with variety of biomolecules as per the requirement of the reseachers. Two non-polar probes namely NBD probes, NBD dihexadecylamine (D-69) and NBD hexadecylamine (H-429) are primarily been used for fluorescence detection of lipids separated by TLC (The Molecular probes Handbook of Fluorescent probes and Research Chemicals by Richard P. Haughland, $6^{th}$ edition Printed in the United States of America, 1996 pp.321–322). The same authors reported three non-polar derivatives of the bodipy fluorophore that offers an unusual combination of non-polar structure and long-wavelength absorption and fluorescence. These dyes are described to have potential applications as stains for neutral lipids and as tracers for oil and other non-polar liquids. For example BODIPY 493/503 (D-3922) is more specific for cellular lipid droplets then staining with Nile red (N-1142). BODIPY 505/515 (D-3921) rapidly permeates cell membranes of live Zebrafish embryos, selectively staining cytoplasmic yolk platelets (Mark Cooper, University of Washington quoted by Molecular probes The Handbook of Fluorescent probes and Research Chemicals by Richard P. Haughland, $6^{th}$ edition Printed in the United States of America, 1996 pp.322). Bodipy dyes have a small fluorescence, Stokes shift extinction coeffecients that are typically greater than 80,000 $cm^{-1}$ $M^{-1}$ and high fluorescence quantum yields (0.94 for D-3921 in methanol) that are not diminished in water. Their photostability is generally high These Bodipy dyes are used in flash lamp-pumped laser dyes. Bodipy 665/676 (B-3932) can be excited using the 633 nm spectral line of the he-Ne laser or the 647 nm spectral line of the Ar-Kr laser for applications requiring long-wavelength fluorescence detection. (Richard P. Haughland, Molecular probes. The Handbook of Fluorescent probes and Research Chemicals $6^{th}$ edition Printed in the United States of America, 1996 pp.321–322). Non-polar fluorescent dyes as dye component in industrial applications are reported in US patents (Fischer, Wolfgang; Deckers, Andreas; Guntherberg, Norbert; Jahns, Ekkehard; Haremza, Sylke; Ostertag, Werner; Schmidt, Helmut. U.S. Pat. No. 5,710,197 released on Jan. 20, 1998 entitled "Crosslinked polymer particles containing a fluorescent dye"; U.S. Pat. No. 5,304,493 dated Apr. 19, 1994 by Nowak, Anthony V Title "Method for detecting a marker dye in aged petroleum distillate fuels; U.S. Pat. No. 4,063,878 dated Dec. 20, 1977 by Weeks, Bruce W entitled "Applying sublimation indicia to pressure sensitive adhesive tape").

At the website, http://www.uniulm.de/uni/fak/natwis/oc2/ak_wuert/publications.htm there are reported 39 publications of A. K. Wuerthner, most of which pertains to synthesis and design of chromatphores for refractive index materials and photorefractive organic glasses. About nine international patents are also disclosed (S. Beckmann, F. Effenberger, F. Würthner, F. Steybe, DE 44 16 476 (Nov. 16, 1995), WO 95/30679, Preparation of oligothiophenes for use in nonlinear optical materials; K-H. Etzbach, C. Krah, R. Sens, F. Würthner, DE 19.611.351 (Mar. 22, 1996), WO 97/35926 (Oct. 2, 1997); Farbstoffmischungen, enthaltend Thienyl- und/oder Thiazolazofarbstoffe; Dye mixtures containing thiophene and/or thiazole azo dyes Farbstoffmischungen, enthaltend Thienyl- und/oder Thiazolazofarbstoffe; Dye mixtures containing thiophene and/or thiazole azo dyes; C. Grund, H. Reichelt, A. J. Schmidt, F. Würthner, R. Sens, S. Beckmann, DE 19648564 A1 (May 28, 1998), DE 196 50 958 A1 (Jun. 10, 1998); WO 98/23688 (Jun. 4, 1998) Indoleninmethinfarbstoffe auf Basis von Trifluormethylpyridonen; Trifluormethylpyridone Based Indolenine Methine Dyes; Indoleninmethinfarbstoffe auf Basis von Trifluormethylpyridonen; Trifluormethylpyridone Based Indolenine Methine Dyes; F. Würthner, H.-W. Schmidt, F. Haubner, DE 19643097 A1 (Apr. 23, 1998), Vernetzbare Triarylaminverbindungen und deren Verwendung als Ladungstransportmaterialien; Crosslinkable triarylamines bearing ethynyl groups for use as charge transport materials; F. Würthner, R. Sens, G. Seybold, K.-H. Etzbach, DE 197 11 445 A1 (Sep. 24, 1998), WO 98/41583 (Sep. 24, 1998) Farbstoffsalze und ihre Anwendung beim Färben von polymerem Material; Colorant Salts and their Use in Dying Polymeric Materials)

At website, www.sigma-aldrich.com and in their section immunochemicals of the catalogue "Biochemicals and reagents for life sciences research, 2000–2001 of Sigma-Aldrich has described labeling reagents and cell linker labeling kits pp. 1454–1456. Three US patents by Horan, Paul K, Jensen, Bruce D, Siezak, Sue E, U.S. Pat. No. 4,783,401 of Nov. 8, 1988; Horan, Paul K, Siezak, Sue E in U.S. Pat. No. 4,762,701 of Aug. 9, 1988 and Horan, Paul K, Jensen, Bruce D, Siezak, Sue E in U.S. Pat. No. 4,859,584 dated Aug. 22, 1989 disclosed respectively "viable cell labeling", in vivo cellular tracking and cell growth rate determination by measurement of changes in cyanine dye levels in plasma membranes.

Nontoxic and cell permeant fluorescent dyes are greatly in demand for their applications in the study of live cell functions, drug delivery, study of various cell organelle and many more. An eukaryotic cell may have several compartments each bounded by a membrane whereas a bacterial cell may consist of a single compartment. The permeability specificity is a characteristic of the cell membranes. A good dye is the one which can show the different parts of the cell at one emission and at different emissions (The Handbook of Fluorescent probes and Research Chemicals by Richard P. Haughland, $6^{th}$ edition Printed in the United States of America, 1996).

Dyes with fluorophore attached to various proteins have been synthesized and described in Handbook of fluorescent probes and Research chemicals by Richard P. Haughland 1996. Page 126–128. The range from the blue fluorescent Cascade blue and new AMCA-S dyes to the red fluorescent Texas Red dyes and phycobiliproteins is embodied. The company has high lighted Oregon green conjugates, Rhodol Green conjugates; Bodipy conjugates;Eosin labelled secondary reagents; Red fluorescent Rhodamine Rd-X and Texas Red-X conjugates; Phycobiliprotein conjugates; Cascade blue and AMCA-S conjugates.

All these dyes are synthetic and single one of them emits in one particular spectral range. The combinations of 2–3 dyes are then made for multiple colored experiments. The same company also offers Jasplakinolide, a macro-cyclic peptide isolated from the marine sponge Jaspis jolnstoni as a cell permeant F-actin probe. But it is toxic and exhibits fungicidal, insecticidal, and antiproliferative activity. Most of the currently available dyes in the market are synthetic. Stainfile-Dyes A has given a Dye index of 264 dyes. Out of which 258 are synthetic and only six are natural dyes. (http://members.pgonline.com/~bryand/dyes/dyes.htm).

Production of synthetic dyes often require use of strong acids, alkalis and heavy metals as catalysts at high temperatures. This makes the processes and the effluents to be discharged an issue of environment degradation. The dyestuff industry is continuously looking for cheaper and more environmentally friendly routes to existing dyes. (Hobson and Wales, 1998. Green Dyes, Journal of the Society of Dyers and colorists (JSDC), 1998,114,42–44).

All of the available dyes are not fluorescent. Bitplane products have displayed list of the 123 fluorochromes in the market and their excitation and emission spectrum (http://www.bitplane.ch/public/support/standard/fluorochrome.htm).

Fluorescence is a phenomenon in which an atom or molecule emits radiation in the course of its transition from a higher to a lower electronic state. It follows Stoke's law, according to which the wavelength of the fluorescent radiation is always longer than that of the excitation radiation. The process of fluorescence is quite different from the phosphorescence and bioluminescence. The term fluorescence is used when the interval between the act of excitation and emission of radiation is very small ($10^{-8}$ to $10^{-3}$ second). In phosphorescence, the time interval between absorption and emission may vary from $10^{-3}$ second to several hours (R. Norman Jones, 1966 in: The encyclopaedia of chemistry, $2^{nd}$ edition, 1966, Pages 435–436). Bioluminescence is the term used for the light produced as a result of a chemical reaction, occurred at a particular time in a particular cell within the body of a living organism.

A large number of fluorescent dyes are reported in "The Handbook of Fluorescent probes and Research Chemicals" by Richard P. Haughland, $6^{th}$ edition Printed in the United States of America, 1996. In the same book on pages 1–6, Ian D. Johnson (1996) described in details the process of fluorescence and its methods of detection in certain molecules called iluorophores or fluorescent dyes by him (generally polyaromatic hydrocarbons or heterocycles). The most versatile currently in use fluorescent dyes are Fluorescein, fluorescein based, BODIPY dyes, and their derivatives. The authors have dealt in with the shortcomings of all these dyes and described their preferences of characteristics of dyes. Many derivatives of the fluorescent dyes and their synthesis are disclosed in US patents (Haughland, R. P and Kang, H. C. U.S. Pat. No. 4,774,339, published on Sep. 27, 1988; Haughland, R. P and Kang, H. C. U.S. Pat. No. 5,248,782 of Sep. 28, 1993; Kang, H. C. and Haughland, R. P, U.S. Pat. No. 5,187,288 published on Feb. 16, 1993; Kang, H. C. and Haughland, R. P in U.S. Pat. No. 5,274,113 of Dec. 28, 1993 and; Kang, H. C. and Haughland, R. P, U.S. Pat. No. 5,433,896 Jul. 18, 1995; Kang, H. C. and Haughland, R. P. U.S. Pat. No. 5,451,663 published on Sep. 19, 1995). Rosenblum Barnett B, Spurgeon S, Lee Linda G, Benson Scott C and Graham Ronald J in international patent No. WO0058406, publication date Oct. 5, 2000 reported 4,7-Dichlororhodamine dyes useful as molecular probes.

R. Norman Jones in The encycopaedia of chemistry, $2^{nd}$ edition, 1966, Pages 435–436 has described specialty of a good fluorophore. According to him A fluorescent molecule must have a good chromophoric system for absorption of excitation energy and a shielding mechanism to save too rapid dissipation of the excitation energy into vibrational motion before the fluorescence retardation act can occur. He also commented that though the relationship of the molecular structure and the fluorescence of compounds are not well understood there are certain groups, presence of which is associated with fluorescence. For example, in the organic molecule presence of phthalein and aromatic structures such as anthracene and naphthacene are particularly associated with bright fluorescence. Few inorganic compounds fluoresce strongly in the liquid state and in solids, fluorescence is often modified by the presence of trace impurities.

Pigments belong to the categories of inorganic and organic types. The formers are the inorganic chemistry compounds, which are used for various decorative and painting purposes etc. Organic pigments like organic dyes date back to the ancient times. The use of dyes from plants like Eirazil wood, log-wood, Persian berry indigo and madder are reported from near east and far eastern countries even before Biblical times (George L. Clark, 1966 "Encyclopaedia of chemistry, 2nd ed. Pages 833–835).

Debra K. Hobsonand David S. Wales describe "Green dyes" which are produced as secondary metabolites from some groups of living organisms like fungi, blue green algae, sea urchins, star fishes, arthropods and coral reef coelenterates (Journal of the Society of Dyers and Colourists (JSDC), 114, 42–44, 1998). These are anthraquinone compounds, historically of crucial importance in the dyestuffs industry.

Variety of carotenoid pigments are reported from the carotenoid-producing bacterial species (U.S. Pat. No. 5,935, 808 published on Aug. 10, 1999, inventors Hirschberg, et al and U.S. Pat. No. 5,858,761, Jan. 12, 1999 inventors Tsubokura, et al). Collin; Peter Donald in his U.S. Pat. No. 6,055,936 published on May 2, 2000 disclosed sea cucumber carotenoid lipid fractions and process. Bandaranayake, W. M. and Des Rocher, A 1999 (Marine biology 133;163–169) described carotenoid pigments from the body wall, ovaries and viscera of Holothuiria atra from Australia.

All these colorants and dyes are however not fluorescent. Fluorescent dyes most of which are synthetics are disclosed in several international patents and US patents. These have been used in variety of applications. The amount of patents in this field shows the importance of these dyes. Synthetic parazoanthoxanthin A (m.w.214.2), emitting fluorescence at lambda (em) 420 nm, was found to be a pure competitive inhibitor of cholinesterases. Sepcic K, Turk T, Macek P (Toxicon, 36 (6): 937–940,1998). Welch; David Emanuel (U.S. Pat. No. 5,989,135 released on date Nov. 23, 1999 disclosed a luminescent golf ball.

White et al. (U.S. Pat. No. 6,110,566, dated Aug. 29, 2000 and WO9920688) described a flexible polyvinyl chloride film that exhibits durable fluorescent colors.

Dipietro Thomas C (International patent WO9938916) disclosed the use of fluorescent polymeric pigments in variety of paints, inks and textiles. Cramer Randall J (Patent No. EP0206718 published on Dec. 30, 1986) described a composition with fluorescent dye for bleaching and brightening of polymer.

Leak detection is another utility disclosed by some (Leighley; Kenneth C. U.S. Pat. No. 6,056,162 dated May 2, 2000). Cooper et al. U.S. Pat. No. 6,165,384 published on Dec. 26, 2000 disclose a full spectrum fluorescent dye composition for the same purposes. Lichtwardt et al. U.S. Pat. No. 5,902,749 dated May 11, 1999 use fluorescent dye in an automated chemical metering system.

There are reports on few fluorescent natural dyes available. A green fluorescent protein GFP has been described from the pacific jellyfish, Aequora aequora by Shimomura, O, Johnson, F. H. and Saiga, Y; in Journal of cellular and comparative physiology, 59, 223–239, 1962, Chalfie M in 1: Photochem Photobiol October 1995 62 (4): 651–6 "Green fluorescent protein"; Youvan D C, Michel-Beyerie ME "Structure and fluorescence mechanism of GFP in National Biotechnology Oct. 14, 1996 (10): 1219–20 and Chalfie M, Yuan Tu, Ghia Euskirchen, William W. Ward, Douglas C Prasher in SCIENCE 263 (1994) 802–805 reported that GFP purified is a protein of 238 amino acids. It absorbs blue light maximally at 395 nm with a minor peak at 470 nm and emits green light at the peak emission of 509 nm with a shoulder at 540 nm. This fluorescence is very stable and virtually no photo bleaching is observed.

GFP with fluorescence in other wavelengths in the ranges of red and yellow are described from non bioluminescent anthozoans, particularly Discosoma coral. Gurskaya N G, Fradkov A F, Terskikh A, Matz M V, Labas Y A, Martynov V I, Yanushevich Y G, Lukyanov K A, Lukyanov S A in 1: FEBS Lett Oct. 19, 2001; 507 (1): 16–20n described GFP-like chromoproteins as a source of far-red fluorescent proteins. Wachter R M, Elsliger M A, Kallio K, Hanson G T, Remington S J. In 1: Structure Oct. 15, 1998; 6(10): 1267–77 described "Structural basis of spectral shifts in the yellow-emission variants of green fluorescent protein". Fradkov A F, Chen Y, Ding L, Barsova E V, Matz M V,Lukyanov S A "Novel fluorescent protein from Discosoma coral and its mutants possesses a unique far-red fluorescence. In 1:FEBS Lett 2000 Aug. 18: 479 (3): 127–30. They describe a novel gene for advanced red-shifted protein with an emission maximum at 593 nm was cloned from Discosoma coral. The protein, named dsFP593, is highly homologous to the recently described GFP-like protein drFP583 with an emission maximum at 583 nm. They developed various mutants of both these genes. A hybrid mutant variant resulted I a mutant variant with a uniquely re-shifted emission maximum at 616 nm. Matz M V, Fradkov A F, Labas Y A, Savitsky A P, Zaraisky A G, Markelov M L, Lukyanov S A. 1: Nat Biotechnolo 1999 Dec: 17(10): 969–73.

In the south east and south pacific countries sea cucumbers are well known for their use in the health food and drug industry as a food item or ingredient to various drug compositions especially for inflammation of joints, sprains and other therapeutics. Several US and International patents are on record and screened. (Fan Hui-Zeng, Yu Song, Yamanaka E, Numata K, Oka T, Suzuki N, muranaka Y in U.S. Pat. No. 5,519,010 dated May 21, 1996; Weiman, Bernard, U.S. Pat. No. 5,888,514 published on Mar. 30, 1999; Katsukura, Kitazato, Kenji Yamazaki, Yasundo U.S. Pat. No. 5,993,797 dated Nov. 30, 1999; Henderson, R. W; Henderson, T and Hammd, T U.S. Pat. No. 6,255,295 dated Jul. 3, 2001; Shinya U.S. Pat. No. 6,203,827 of Mar. 20, 2001; U.S. Pat. No. 5,770,205 patent by Collin Peter Donald published on Jun. 23, 1998 and WO patent no. 0001399 published on Jan. 13, 2000; Kovalev V G, Sementsov V K, Slutskaja, Akulin V N, Timchishina G N in RU 2147239 published on Apr. 10, 2000; Li Zhaoming, Zhu Beiwei CN 1286926 dated Mar. 14, 2001 Qu Jianhong, Song Xiuqin, Zheng Fuqiang CN 1223131 dated Jul. 21, 1999; Wufa Zhuang Wufa, Meizheng Zhuang CN 1142365 dated Feb. 12, 1997; Fang Hua CN1312031 dated Sep. 12, 2001 and Ding Cunyi CN1173290 dated Feb. 10, 1998, Collin Peter Donald W09937314 published on Jul. 29, 1999). The use of the ingredients originated from sea-cucumber in Anti HIV drug are disclosed (Hoshino Hiroo EP 410002 dated Jan. 30, 1991 and Hoshino Hiroo EP495116 dated Jul. 22, 1992). In view of their importance the animals are tried to be cultivated under captivity (Annie Mercier, S C Battaglene and Jean-Francois Hamel in Journal of experimental Marine Biology and Ecology Volume 249 issue 1: 89–110. 2000 "Settlement preferences and early migration of the tropical sea cucumber *Holothuria scabra*). Gu Zaishi, Wang Shuhai, Zhou Wei disclosed "Ecological reproducing method for Stichopus japonicus "in patent No. CN1179261 dated Apr. 22, 1998.

But as all these patents are not directly of relevance to the topic of the present patent so they have been not included as reference.

Goswami, Usha and Ganguly, Anutosh has filed a patent on a natural fluorescent dye from a marine invertebrate (CSIR, NF-140/2001; U.S. patent application Ser. No.: 09/820654 filed on Mar. 30, 2001). This pertains to the crude extract from *Holothuria scabra*, which has the fluorescent qualities at three different wavelengths when excited at different UV and visible ranges of the spectra of light. The invention also provides a process of the extraction, purification and characterization of this new dye, which is a partially purified natural dye from a sea cucumber. The utilities of the dye as a epifluorescent stain and non-radioactive fluorescent dye useful for labeling of molecular probes for in situ hybridization studies is described besides several other qualities of the dye as a drug. In this patent prior art, we have dealt in details about the pigments, synthetic dyes and natural dyes from terrestrial plants and microbes. (U.S. Pat. No. 4,452,822 published on Jun. 5, 1984, inventors Shrikhande, Anil J., U.S. Pat. No. 5,321,268 of Jun. 14, 1994 by Crosby David A and Ekstrom Philip A; U.S. Pat. No. 5,405,416 published on Apr. 11, 1995 authors Swinton; Robert J, U.S. Pat. No. 5,858,761 published on Jan. 12, 1999, inventors Tsubokura, et al. U.S. Pat. No. 5,902,749 of May 11, 1999 inventors Lichtwardt et al. U.S. Pat. No. 5,908,650 published on Jun. 1, 1999 inventors Lenoble, et al. U.S. Pat. No. 5,920,429 published on Jul. 6, 1999 Burns et al. U.S. Pat. No. 5,935,808 on Aug. 10, 1999 of Hirschberg, et al; U.S. Pat. No. 5,989,135 of Nov. 23, 1999 inventors Welch; David Emanuel; U.S. Pat. No. 6,055, 936 of May 2, 2000; Collin; Peter Donald; U.S. Pat. No. 6,056,162 May 2, 2000; Leighley; Kenneth C.; U.S. Pat. Nos. 6,103,006 Aug. 5, 2000 DiPietro; Thomas C.; 6,110, 566 Aug. 29, 2000 White et al. 6,140,041 Oct. 31, 2000 LaClair; James J. 6,165,384 Dec. 26, 2000 Cooper et al.; U.S. Pat. No. 6,180,154 Jan. 30, 2001 Wrolstad et al. EP0206718 published on Dec. 30, 1986 inventors Cramer Randall J; IE901379 of Jan. 30 1991 Lee Linda G; Mize Patrick D; WO9010044 of Jul. 7, 1990. Swinton; Robert J; AU704112 published on Oct. 7, 1997 inventors Burns David M; Pavelka Lee A; DE19755642 of Jun. 24, 1999 of Weimer Thomas D R.; WO9938919, Sep. 28, 1999 Laclair James J; WO0058406 of Oct. 5, 2000 by Rosenblum Barnett B et al.; WO9938916 of Aug. 15, 2000 inventors DiPietro; Thomas C; WO9920688 of Aug. 29, 2000 inventors Pavelka Lee et al.; WO9920688 of Aug. 29, 2000 inventors White et al. The multiple uses oiF fluorescent dyes in the molecular biology research, in industrial applications and in life saving devices etc. are also described. Collin, P. D in his U.S patents of Jun. 23, 1998, Mar. 2, 1999 and Nov. 16, 1999 respective U.S. Pat. Nos. as 5,770,205, 5,876,762 and 5,985, 330 have described therapeutic properties of various body parts of sea cucumber.

In another patent application, inventors of the present application i.e. Goswami, Usha and Anutosh Ganguly (U.S. Provisional application No. 60/317,190 filed on Sep. 6, 2001) has described a novel organosilicon Si—O—R type of compound and multiple fluorescent natural dye purified from the body wall extract of a marine invertebrate *Holothuria scabira*. The compound is a polysacchride fluorochrome having a phenolic fluorophore part and is connected to a silicon matrix around it through the sulphate bonds. This silcon part is an integral part of the core molecule and takes part in the metabolism of the animal. The compound is rich in sulfur. The invention also provides a process for the extraction, purification and characterization of the novel compound and the multiple fluorescent dye from a living marine organism, especially sea cucumber. Further, the compound can be an easily miscible ingredient in compositions of Dye industry, Cosmetic industry and pharmaceutical industries.

In this patent a large body of literature upon fluorescent dyes reported in the Handbook of Fluorescent probes and Research Chemicals by Richard P. Haughland, 6$^{th}$ edition Printed in the United States of America, 1996 are incorporated. In US and international patents many derivatives of the fluorescent dyes and their synthesis are disclosed (Haughland, R. P and Kang, H. C. U.S. Pat. No. 4,774,339, published on Sep. 27, 1988; Haughland, R. P and Kang, H. C. U.S. Pat. No. 5,248,782 of Sep. 28, 1993; Kang, H. C. and Haughland, R. P, U.S. Pat. No. 5,187,288 published on Feb. 16, 1993; Kang, H. C. and Haughland, R. P in U.S. Pat. No. 5,274,113 of Dec. 28, 1993 and; Kang, H. C. and Haughland, R. P, U.S. Pat. No. 5,433,896 Jul. 18, 1995; Kang, H. C. and Haughland, R. P. U.S. Pat. No. 5,451,663 published on Sep. 19, 1995, Rosenblum Barnett B, Spurgeon S, Lee Linda G, Benson Scott C and Graham Ronald J, international patent No. W00058406, publication date Oct. 5th, 2000 reported 4,7-Dichlororhodarnine dyes useful as molecular probes).

All these references pertain to the present patent also.

The applicants have adopted a different approach from their earlier patents and those reported by other workers.

The dyes reported in our earlier patents were though natural but they were toxic. The spectral ranges of emissions at various excitation wavelengths were also different. The dyes were toxic, and not suitable for in situ studies of live cells. Their applications and uses in the biomedical and engineering sciences were different.

The dye now reported is though also a natural dye but is a non-polar multiple fluorescent flurophore extracted from the female gonads of a non-bioluminescent invertebrate. The marine animal source is a holothurian, sea cucumber called

*Holothuria scabra* which is a new source for a non-polar fluorescent dye. The dye is environmentally friendly, as unlike the synthetic dyes there is no need of intervening steps of strong acids and alkalis in their productions. Unlike the earlier described carotenoid pigments from the sea cucumber ovaries this dye is not a carotenoid pigment. It is a non-polar fluorophore easily separable from the conjugant biomolecule, which is a negatively charged protein.

Unlike most synthetic fluorescent dyes, our dye does not need to be mixed with another dye for getting different fluorescence hues at different wavelengths. They themselves emit six different colored fluorescence at three different excitation wavelengths, which can have multiple uses. The cell constituents show a contrasting staining from the background where only dye solution is present.

The present dye is cell permanent and permeates through plasma membrane, cytosol, nuclear membrane, nucleoplasm and chromosomes.

Once the dye attaches to the cell membranes it is stable at the room temperature for months and does not get photobleached and contaminated by microbes. Its fluorescence does not get deteriorated at high and low temperatures unlike extracts of some algae and luminescent organisms.

The dye is nontoxic to the E.coli bacteria and the sex cells and larvae of estuarine and marine animals. So its effluents will not kill the marine and estuarine animals larval stages. It is a nontoxic and eco-friendly dye.

Another important feature of the dye is that it shows fluorescence in only the live and fixed tissues. The dead ones are not stained and do not give any fluorescence. One important aspect of the dye is its making compositions and kits for non-radioactive in situ labeling of molecular probes and counter staining. At different wavelength excitations it gives the effect equivalent to color of DAPI, FITC and PI and other marketed fluorescent probes. The dye is a natural multiple fluorescent dye. Actually, this single dye covers the colors of wavelength spectrum of 123 flurochromes presently known in the market (see Bitplane products (Fluorochrome) on the Internet (http://www.bitplane.ch/public/support/standard/Fluorochrome.htm).

Yet another aspect is its use as a nontoxic fluorochrome stain in epiflourescence microscopy for the live cells. The dye is a natural dye and not synthetic which is permeant through various membranes and stains them differentially. This application provides a simple and quick method of checking cytogenetical preparations for multiple uses like molecular diagnostics using fluorescent in situ hybridization techniques, rapid diagnosis of bio-contamination in tissue cultures, food industry and industrial preparations, flow-cytometry etc.

Yet another aspect of the dye is its use as a component of the non-radioactive labeling kits for advanced molecular biology applications where protein dyes are needed for studies of live cell functions.

OBJECTS OF THE INVENTION

The present invention discloses a process of extraction, purification and characterization of a fluorescent dye solution from 70% alcoholic solution of ovarian tissue of a marine echinoderm. This is al natural dye, which has non-polar coloring part. Bioactive extract containing a natural non-polar and non-proteinaceous fluorescent dye extracted from alcoholic extract of the ovarian cells and a process of extraction, purification and characterization of a fluorescent pigment from ovarian extract of a marine echinoderm. The pigment is a natural dye, which is a non-polar fluorophore. The dye emits fluorescence in multiple fluorescent excitation ranges of UV and visible light spectra. It further discloses the chemical, physical, epifluorescent microscopic nature of the dye. The nontoxic, cell membrane permeable qualities are seen.

The main object of the present invention is to provide a natural nontoxic ecofriendly non-polar multiple colored fluorescent dye from the ovarian tissue of sea-cucumber *Holothuria scabra*.

Another object of the invention is to provide a process for extraction, partial purification and characterization of the said dye from the marine animal *Holothuria scabra* which is a non bioluminescent marine invertebrate.

Another object of the invention is to provide a dye which is cell membranes permeable, giving demarcation of cell partitioning and having a visual effect at single and multiple emission ranges of UV and visible light spectral wavelengths.

Another object of the invention is to develop a dye with high quantum of fluorescence Another object of the invention is to develop a dye with less photobleaching.

Another object of the invention is to develop a longer time photo stable dye at the room temperature.

Another object of the invention is to use the dye for checking survival and growth of animal and bacterial cells.

Yet another object of the invention is to provide compositions employing the dye obtained from the tissues of *Holothuria scabra*.

Still another object of the invention is to provide a dye that emits fluorescence in six different wavelength ranges of UV and visible light spectra on particular excitation with three wavelengths.

Another object of invention is to observe the fluorescence and visible spectroscopic analysis and range of emission wavelengths.

Yet another object is to observe the six different fluorescence colored emissions of the dye in UV and visible ranges of epifluorescence microscopy cubes.

Still another object of the invention is to observe the effect of fluorescence staining of the cytogenetical slides to screen chromosomes, cells and tissues by using the dye of the invention.

Yet another object of invention is to see its nontoxic nature by performing experiments with bacteria.

Yet another object of invention is to see its nontoxic nature by performing experiments with marine animal cells.

Yet another object of the invention is its application for checking bacterial contaminations in food industry.

Yet another object of the invention is to observe the fluorescence and visible spectroscopic analysis and range of emission wavelengths.

Yet another object of the invention is that the dye is useful as a non-radioactive label of fluorescent molecular probes.

Still another object of the invention is that the dye does not get quenched fast in the excited light and photobleaching does not occur while screening slides.

Yet another object of the invention is to observe the fluorescence and visible spectroscopic analysis and range of emission wavelengths.

Yet, another object of the invention is that the dye is useful as a non-radioactive label of fluorescent molecular probes.

Another object of the invention is that the dye is highly stable at the room temperature of its own as well as when attached to the cell membranes.

Still another object of the invention is that its fluorescence quality does not get deteriorated even at extremely high and low temperatures.

Yet, another object of the invention is to develop kits for non-radioactive labeling of molecular probes and counter staining.

Yet, another object of the invention is industrial use of the fluorophore for synthesizing biomolecule-conjugants for flow-cytometry, micro-arrays, immunoassays and several other molecular applications as per the requirements of the researcher.

Still another object is to develop kits containing the fluorescent dye as in situ hybridization non-radioactive labelling kits for molecular probes.

Still another object is to develop low cost LIVE/DEAD Viability/Cytotoxicity kit for animal cells.

Still another object is to develop low cost LIVE/DEAD Viability/Cytotoxicity kit for bacteria.

Still another object is to develop low cost LIVE/DEAD Viability kit for sperms.

Still another object is to develop low cost LIVE/DEAD Viability kit for yeast cells.

Still another object is to develop low cost LIVE/DEAD Viability kit for animal cells.

Still another object is to develop low cost bacterial gram stain and LIVE/DEAD Viability kits.

Still another object is to develop low cost LIVE bacterial gram stain kit.

Still another object is to develop low cost bacteria counting kit.

Still another object is to develop low cost kits for animal cells with simple steps.

Still another object is to develop kits containing the fluorescent dye for cell culture contamination detection.

Still another aspect of the invention is the specificity and reliability. The live cells color and give fluorescence and the dead cells do not show any fluorescence.

Still another aspect of the invention is to use a single dye in the kits in place of presently used 2 dyes for live/dead cells detection.

Still another aspect of the invention is to develop less expensive and non-hazardous proliferation assays than the radioisotopic techniques.

SUMMARY OF THE INVENTION

Accordingly, the invention provides a bioactive extract containing a natural non-polar and non-proteinaceous fluorescent dye extracted from alcoholic extract obtained from ovarian cells of a non bioluminescent marine organism called sea-cucumber *Holothuria scabra*. The invention also provides a process for extraction, isolation and characterization of the said dye, which is a fluorophore detached from a protein conjugant. The said dye is partially purified and is in a solution form. The dye is tested for its nontoxic nature upon animal and bacterial live cells. The dye compositions will be useful as fluorescent epifluorescence microscopic stain, as fluorescent dye ingredient in multiple type of applications in the biomedical, molecular biology, microbiology, cell biology, recombinant technologies etc. and in formulation of new biomolecule conjugarits for applications in fluorescent probes.

DETAILED DESCRIPTION OF THE INVENTION

After much research, the applicants have now identified a novel natural nontoxic fluorescent dye obtained from tissue of marine animals, especially from invertebrates and more specifically from the sea-cucumber *Holothuria scabra*.

Subkingdom: Metazoa
Phylum: Echinodermata
Sub-Phylum: Eleutherozoa
Class: Holothuroidea
Subclass: Aspidochirotacea
Order: Aspidochirota
Family: Holothuridae
Genus: Holothuria
Species: *scabra*

The invention further provides a natural non-polar multiple fluorescent dyes which is obtained from the ovary of the animal and which is nontoxic to live cells. It also describes the physical and chemical nature of the dye and its stability in direct light, high and low temperatures. The said dye has six colored fluorescent emissions at three different excitation wavelengths of UV and visible light spectrum. The invention also relates to screening of cells under fluorescence microscope for a rapid check of contaminations and cell survival. The invention is also concerned with the uses of the dye as a non-radioactive label of protein, DNA and RNA molecular probes for advanced molecular diagnostics, epi-fluorescence microscopy for single double and multiple staining of chromosomes, cells and tissues, fluorescence in situ hybridization applications, and biocontamination check, in aquaculture and biomedical sciences for enhancement of fertility, as a component of kits where studies on live cells are required, novel remote sensing devices, underwater probes, life saving devices, mark the location of crashed aircraft, life rafts and Defence equipment for example rockets, various fluorescence applications in sub zero temperature conditions and many more. The dye is environmentally ecofriendly as it does not kill larvae of the estuarine and marine animals.

The invention describes fluorescent dye obtained from marine animals, which either absorb sunlight for their physiological functions or are exposed to longer duration of sunlight and appear to have evolved mechanisms of fluorescence at different wavelengths. Like the phytoplankton, picoplankton and photosynthetic bacteria absorb sunlight for their photosynthetic functions, the required wavelengths of light spectra are used in the chemical pathways and extra light is emitted following Stoke's law.

The invertebrate animals who do not have an extra outer armor like a shell and conspicuous defence organs, who have hard and spiny skin, who have a strong endoskeleton formed of ossicles, are sedentary or slow mobility, have long hours of exposures to direct sunlight, live in sand or crevices may show fluorescence.

The present invention seeks to overcome the drawbacks inherent in the prior art by providing highly efficient and selective methods for extraction, purification and characterization of a dye from a marine invertebrate and its multiple uses in making kits for molecular diagnostics using non-radioactive labels, molecular markers, epiflourescence microscopy, component of new instrumentation devices for land and underwater probes, cosmetic industry, food industries and defense purposes etc., The said marine invertebrate is an echinoderm taxonomically called *Holothuria scabra* belonging to the class Holothuroidea. The product of the invention is a novel nontoxic multicolor fluorescent protein dye, which is reported for the first time. The animals were collected from the shores of central West Coast of India during low tide, brought to the laboratory and maintained in glass tanks containing seawater of salinity 30–32% per par. The animals were adults and sexually mature. The taxonomic position was identified as above.

In fact, most of the dyes available are synthetic in nature. There are only 6 types of natural dyes. This includes dyes obtained from all living organisms. The fluorescent dye reported in the present invention is the only one of its specialty of multicolor fluorescence nontoxic, living cell membrane permeant extracted from ovarian tissue of a marine sea cucumber and has abilities to be conjugated to biomolecules.

As used herein the term dye is used for a dye solution, which does not get decolorized by a reducing agent. The said dye imparts color to the fibre, cellulose, cell membranes etc. It is called a natural dye as the source is from a marine animal found commonly in the nature along shores, shallow and deep waters of the world and is not a synthetic pigment. A fluorescent dye is one, which on excitation at a particular wavelength during the transition from a higher to the lower electronic state within a very short duration it emits light.

Multiple colored fluorescence means the emission of different colored light when excited at different ranges of wavelengths. It emits blue, yellowish green and orangish red colored hues of fluorescence at excitations with different spectra of UV and visible light.

Cell membrane permeant means that the dye passes through the pores of the live cell and nuclear membranes of the cell and imparts it multicolored fluorescence in the shades of blue, bluish white, green, yellow orange and orangish red depending upon excitation with the UV, blue and green wavelength ranges.

The dye does not stain the already dead cells of both animal and bacteria.

The nontoxic to live cells means when tested upon live cells of both marine animal and bacteria (*E.coli*), their cells do not die.

Photostability at room temperature means when left on the bench at room temperature (~28 degree centigrade) the florescence quality does not deteriorate. Photostabilty of dye after attaching to cell membranes means the continuation of fluorescence emission after staining the live and fixed cells with the said dye.

The molecular diagnostics as used herein means the use of the dye as a non-radioactive label of molecular probes for fluorescent in situ hybridization applications in molecular cytogenetics and as markers in microarrays, and molecular biological studies.

The epifluorescent microscopy here pertains to the microscopic studies of cyto-genetical preparations of slides by using the present dye as a stain and recording different colored fluorescence when observed under different cube configurations emits a particular colored emission on excitation with known fluorochromes. The fluoro-chrome cubes WUB, WB, WG are the designated filter cube configurations of the Olympus BX-FLA reflected light fluorescence attachment for different wavelengths.

Accordingly, the present invention provides a bioactive extract containing non-polar and non-proteinaceous fluorescent dye obtained from alcoholic extract ovarian cells of a non bioluminescent marine organism *Holothuria scabra* occurring in intertidal, submerged, shallow and deep waters, usually abundant in shaded areas such as acloves, crevices, ledges, overhangings, rocky and sandy habitats; dull to bright coloured with or without exo- and endo skeleton, sessile, sedentary drifters, ektonic with varied swimming power usually nocturnal in habit, liabile to active predation, with and without luminescent and fluorescent pigments giving emissions in few to all wavelength ranges of UVB, UVA visible colored spectrums and infra red spectrum.

One embodiment of the invention relates, to the bioactive extract obtained from the marine organism, which is useful as a natural fluorescent dye having the following characteristics:

i. no decolorization by a reducing agent,
ii. it is a natural compound,
iii. crude extract of the dye is orange in color,
iv. semi purified dye solution is bright orange in color for the naked eye,
v. under tube light it emits variety of colors of the visible light spectrum,
vi. the pigment separated form protein part is insoluble in water and alcohol,
vii. the partially purified dye pigment is soluble in ether.
viii. the dye is a non-polar dye having pH 7.0,
ix. absence of reduciable chromophore,
x. dye solution emits six different colored fluorescence at 3 different wavelengths of the UV and visible ranges of the fluorescent cubes of an epifluorescence microscope, depending upon whether it is the dye solution alone or the cells on which dye has permeated and attached,
xi. fluorescence of blue color emission occur in the 450 nm–470 nm range on excitation under ultra violet cube WU-330 nm–385 nm excitation range,
xii. fluorescence of yellowish green color emission occurs in the 510 nm–570 nm range on excitation under WB cube of 450 nm–480 nm excitation range,
xiii. fluorescence of orange color emission occurs in the 610 nm–650 nm range on excitation under WG cube of 510 nm–550 nm excitation range,
xiv. the dye emits hues of yellowish grays under the ordinary transmitted light bulb of the epifluorescence microscope when seen under 100×oil immersion objective,
xv. the dye emits fluorescence colors even at a dilution range of 1:40000 times
xvi. the fluorescence of the extract persisted even up to 1 year when preserved at about 4° C.,
xvii. the fluorescence of the dye is highly photostable and does not get deteriorated by long exposures to direct light,
xviii. the fluorescence of the dye does not change even when frozen at −20° C., a temperature at which the molecules are unable to attain the energy necessary for activation like in extracts from luminescent organisms,
xix. the dye is nontoxic to the living cells of eukaryotes and prokaryotes (*E. coli*)
xx. the dye is permeable to cell membranes,
xxi. the dye is impermeable to dead eukaryotic cells and dead prokaryotic cells, and
xxii. the dye is non degradable even after staining the cell components.

Another embodiment of the invention, the multicolored emissions of the dye at different wavelengths of excitations are comparable to the fluorochrome microscopic stains available in the market.

Still another embodiment, the blue colored fluorescence of the present dye is comparable to the emission of same color by DAPI fluorochrome at the same wavelength excitation, used as components of the non-radioactive labeling kits of biochemistry, cell biology, immuno-chemistry and molecular biology.

Still another embodiment, the yellow colored fluorescence of the dye under the visible range is comparable to the same colored emissions of Auramin used as components of the non-radioactive labeling and detection kits of biochemistry, cell biology, immunochemistry, and molecular biology.

Yet another embodiment, the yellow colored fluorescence of the said dye in the visible range is comparable to the same colored emissions of FITC used as components of the non-radioactive labeling and detection kits of biochemistry, cell biology, immunochemistry and molecular biology.

Yet another embodiment of the invention provides a dye having orange colored fluorescent emission, comparable to the orange fluorescence color of Propidium Iodide fluorochrome which is used as components of the non-radioactive labeling and detection kits of biochemistry, cell biology, immunochemistry, and molecular biology.

Yet another embodiment of the invention provides a dye having orange colored fluorescent emission, comparable to the orange fluorescence color of Rhodamine fluorochrome used as components of the non-radioactive labeling and detection kits of biochemistry, cell biology, immunochemistry, and molecular biology.

Yet another embodiment of the invention provides a dye having orange colored fluorescent emission, comparable to the orange fluorescence color of TRITC fluorochrome used as components of the non-radioactive labeling and detection kits of biochemistry, cell biology, immunochemistry, and molecular biology.

Yet another embodiment of the invention provides a stable dye at room temperature and has a long shelf life.

Yet another embodiment of the invention the molecular and radioactive kits of the said dye can be exported at the room temperatures.

Yet another embodiment of the invention provides a dye having characteristics of at least one hundred different fluorochromes available in the market namely DAPI, Hoechest 33258, Hoechest 33342, FITC, acridine orange, auramine, Rhodamine, TRITC, and propidium iodide, etc.

Yet another embodiment of the invention provides a dye used in all applications in place of Phycobiliproteins.

Yet another embodiment of the invention, the said dye under bright field of fluorescent microscope when seen under 10×objective, the hues of bluish grays produce a phase contrast effect which is useful in rapid screening of cytogentical, cytological, and histochemical slides and save expenses on the extra phase contrast accessory component of microscope.

Yet another embodiment of the invention, the said dye under 100×oil immersion objective of an ordinary transmitted light microscope the proteins of yolk, nucleoplasm and chromatin of actively dividing cleavage cells show different colors of staining in the hues of brownish yellow for former, yellow for the latter and dark blue for the last cell component, which is useful in rapid bioassays of effect can be seen on the various histochemical components of the cells.

Yet another embodiment of the invention, the fluorescence color emissions follow Stoke's law of fluorescence.

Yet another embodiment of the invention, the microphotographs with Kodak film rolls show hues of the adjacent color emission wavelengths such as blue color fluorescence under the epifluorescence.

Yet another embodiment of the invention, the microphotographs with Kodak film rolls shows hues of the adjacent color emission wavelengths like when seen yellow color fluorescence under the epifluorescence microscope in microphotograph the hues of green also found.

Yet another embodiment of the invention, orange fluorescence color is seen under the epifluorescence microscope in microphotograph, the hues of red also found.

Yet another embodiment, the cytogenetic slides seen under all fluorescences gives a counterstain effect of cells and cell components versus the background color where no specimen but only dye is present.

Yet another embodiment, the diluted dye with water in the ratio above 1:4,50,000 to 1:9,00,000 times give fluorescence of six colors at three different wavelengths.

One more embodiment of the invention provides compositions comprising bioactive extract obtained from the marine sea-cucumber *Holothuria scabra* together with suitable additives for the following useful applications:

i. preparing fluorescent color coating compositions and inks useful in variety of paints, inks, textile;

ii. as a fluorescent molecular probe in situ hybridization kits for molecular diagnostics;

iii. used in experiments where various applications of fluorescent dyes are needed to be performed at field stations situated at subzero degree temperature areas;

iv. useful as fluorochrome stains for epifluorescence microscopy;

v. useful in cell permeant dye compositions;

vi. a composition of fluorescent dye for bleaching and brightening polymer;

vii. leak detection with a full spectrum fluorescent dye;

viii. use in automated chemical metering system;

ix. to mark location of crashed air-crafts, life crafts, and equipment for example rockets;

x. under sea probes;

xi. chromatophore sunscreen component of cosmetics creams and lotions;

xii. fluorescent in situ hybridization application kit component for molecular diagnostics;

xiii. component of the non-radioactive labeling and detection kits of biochemistry, cell biology, immunochemistry, and molecular biology for labeling of DNA, RNA, Proteins and enzymes;

xiv. immunofluorescent detections;

xv. counterstain of DIG-labeled oligonucleotide probes and Anti-DIG Fab-fragments;

xvi. single and multiple flow cytometry applications;

xvii. fluorochrome stains for epifluorescence microscopy;

xviii. for a quick check of biocontamination in the health food industry, cosmetic industry, pharmaceutical and chemical industries;

xix. for rapid estimations of biocontaminants in laboratory cultures;

xx. for a rapid check of biopollutants under field conditions;

xxi. for a rapid check of dead and live bacteria *E.coli*;

xxii. a natural colorant;

xxiii. a bioactive composition of the fluorescent dye in the ratio of 1:400000 in ether is sufficient to produce fluorescences of six colors at three different wavelengths and a phase contrast effect under transmitted light;

xxiv. a dye for various fluorescent applications to be performed in areas of sub zero temperatures;

xxv. a dye for making conjugants with variety of biomolecules;

xxvi. for cell permeant membrane dye compositions;

xxvii. for identification of dead and live cells in tissue cultures;

xxviii. for dye compositions in biosensors;

xxix. as dye composition in molecular and microbiological kits; and xxx. a non-polar dye for detection of lipids and oils.

One more embodiment of the invention relates to a process for preparation of a bioactive extract containing a natural fluorescent dye from *Holothuria scabra* sea cucumber, said process comprises the steps of:

a) collecting the marine organism from seashore, b) maintaining the organism in tanks containing seawater without any mechanical aeration overnight, c) dissecting the washed animals and removing the female gonads, d) extracting with 70% ethyl alcohol to obtain yellowish orange solution, e) repeating the extraction steps 3–4 times to obtain colored solution, f) filtering the above solution through Whatman No. 1 filter paper to obtain partially purified extract, g) dissolving the extract obtained in step (f) in solvent ether, and h) filtering through Whatmaini No 1 filter paper to obtain clear yellow colored solution named as "Non-polar fluorescent dye solution Another embodiment of the invention, the said dye solution is diluted further with water/seawater, in the ratio ranging between 1:400,000 to 1:900,000 times give fluorescence of six colors at three different excitation wavelengths.

Still another embodiment of the invention, wherein bioassays are conducted by using dilutions of the bioactive extract in the range of 1:450000, 1:200000, 1:100000, 1:50000 and 1:25000 times for assessing non-toxic nature of the dye upon survival of eukaryotic and prokaryotic cells.

The present invention provides a method for extraction, partial purification and characterization of a natural nonpolar nontoxic cell membrane permeant multiple fluorescent dye. It further provides compositions at which the dye can detect live eukaryotic and prokaryotic cells without killing them and it comprises of:

collection of the material from field and maintenance in the laboratory conditions, extraction of the pigment from the 70% alcoholic extract of the ovary of the echinoderm sea cucumber *Holothuria scabra*, and partial purification of the dye.

Testing of biological activities.

The bioactive extract of the invention is obtained from 70% alcoholic extract of the ovarian tissue of marine seacucumber *Holothuria scabra*. This extract is useful as a natural fluorescent dye and has the following characteristics:

1) no decolorization by a reducing agent,
2) not a synthetic compound,
3) crude extract of the dye is yellowish orange in color,
4) the dye has two steps of its extraction from the ovarian cells i.e. at step-1 the alcoholic solution is extracted and left to evaporate and step-2, solvent ether is added to the dried mass and filtered through Whatmann filter 1.
5) it produces dye solution containing partially purified fluorophore.
6) the dye solution is bright orange in color.
7) under tube light it emits variety of colors of the visible light spectrum.
8) the pigment is insoluble in water and alcohol.
9) the pure dye pigment is soluble in solvent ether, the further dilutions can be made by following the procedures given.
10) is a non-polar dye,
11) has pH of about 7,
12) absence of a reducable group,
13) the fluorophore is associated with the protein which is removed when heated and coagulated,
14) dye in solution emits six different colored fluorescence at 3 different wavelengths of the UV and visible ranges of the fluorescent cubes of an epifluorescence microscope, depending upon whether it is the dye solution alone or the cells on which it has attached.
15) fluorescence blue color emission occur in the 450 nm–470 nm range when excited under ultra violet cube WU-330 nm–385 nm excitation range,
16) fluorescence yellowish green color emission occurs in the 510 nm–570 nm range when excited under WB cube of 450 nm–480 nm excitation range,
17) fluorescence orange color emission occurs in the 610 nm–650 nm range when excited under WG cube of 510 nm–550 nm excitation range,
18) the dye emits hues of yellowish grays under the ordinary transmitted light bulb of the epifluorescence microscope when seen under 100×oil immersion objective,
19) the dye emitted these fluorescence colors even at a dilution range of 1:400000 to 1:900,000 times and above.
20) the fluorescence of the extract persisted even after at least 1 year at the 4 degree centigrade
21) the fluorescence of the dye is highly photostable and does not get deteriorated by long exposures to direct light once the cells are stained even at the room temperature.
22) the fluorescence of the dye does not change even when frozen at minus 20 degree centigrade, a temperature at which the molecules are unable to attain the energy necessary for activation like in extracts from luminescent organisms.
23) The dye is nontoxic to the living cells of eukaryotes.
24) The dye is also nontoxic to the prokaryotes (*E.coli*)
25) The dye is cell membrane penmeant
26) The dye is cell membrane impermeable to dead animal cells.
27) The dye is cell membrane impermeable to dead *E.coli*-bacteria.
28) The dye is a non-degradable stain of the cell membranes.

The physical and other characteristics of the dye may be assessed by the following step:

a. color and solubility of the dye,
b. photostability
c. photobleaching
d. nontoxicity
e. selective staining of cell membranes
f. Physical checking of emission under a UV transilluminator 260–280 nm range,
g. Preparation of slide with live oyster eggs and sperms
h. Preparation of slides of live bacteria
i. Preparation of the fixed cells slides by air dried method,
j. Staining of slides with the dye,
k. Keeping controls for each experiment without adding dye.
l. Epifluorescent microscopic screening of the live eukaryotic cells slides under fluorochrome cubes WU, WB, WG and Bright field,
m. Epifluorescent microscopic screening of the fixed eukaryotic cells under fluorochrome cubes WU, WB, WG and Bright field, n. Epifluorescent microscopic screening of the dead eukaryotic cells under fluorochrome cubes WU, WB, WG and Bright field,
o. Epifluorescent microscopic screening of the live bacterial cells under fluorochrome cubes WU, WB, WG and Bright field,
p. Epifluorescent microscopic screening of the dead bacterial cells under fluorochrome cubes WU, WB, WG and Bright field,
q. Epifluorescent microscopic screening of the live control cells without the dye under fluorochrome cubes WU, WB, WG and Bright field,
r. Microphotography of emitted fluorescence in the areas of slides without any cells,
s. Microphotography of emitted fluorescence of the cytogenetic slides under fluorochrome cubes WU, WB, WG and Bright field, and
t. Checking of wavelength ranges of the fluorescent hues of emission and wavelength ranges of the excitation ranges of fluorochrome cubes with the dye
u. Checking of wavelength ranges of the fluorescent hues of emission and wavelength ranges of the excitation ranges of fluorochrome cubes with the cells stained with the dye
v. Checking for cell membrane permeability of plasma membrane, cytoplasm, nuclear membrane, nucleoplasm and chromosomes.

Thus the invention provides a non-polar natural fluorescent dye of marine animal origin which emits six different colored fluorescence in the hues of blue, yellow and orangish red when excited with three different ranges of wavelengths in the UV and visible light spectral cubes of an epifluorescence microscope. The range of emissions of the dye solution and that of cells stained with the dye differs. The invention further relates to the epifluorescence microscopy of eukaryotic and prokaryotic live, fixed and dead cell preparations by using this dye as the epifluorescent microscopic stain. This dye could be used in making non-radioactive labeling kits for molecular diagnostics by fluorescent in situ hybridization in various molecular, biomedical and engineering sciences.

In an embodiment the source of the dye is an invertebrate marine animal belonging to SubKingdom: Metazoa, Phylum Echinodermata; subphylum: Eleutherozoa, Class Holothuroidea. Name: *Holothuria scabra*

In yet another embodiment the *Holothuria scabra* is selected from the group comprising of sea cucumbers and widely distributed in the shores, shallow waters, deep waters all over the world particularly Indo-Pacific. The nearest well-known relatives of sea cucumber are the sea urchins and starfishes etc.

In yet another embodiment *Holothuria scabra* is dissected, its ovaries are separated and weighed. In step 1, to 1 mg of ovarian tissue by wet weight 3 ml×3 times of 70% alcohol is added. This is called 70% alcoholic extract of ovarian tissue.

In yet another embodiment in step 2, heating the solution coagulates the protein and alcohol is evaporated. The dried mass dissolves only in non-polar solvent ether.

In yet another embodiment, the colored solution is partially purified by filtering through Whattman No. 1 filter paper.

In yet another embodiment the vial with screw cap carrying the solution of the dye is labeled as "non-polar dye solution" and stored in cold room at 4° centigrade.

In yet another embodiment, the color of the dye solution is noted with naked eyes and tube light.

In yet another embodiment, the dye is found to be soluble in ether. The further dilutions for experiments can be made following given procedures.

In yet another embodiment, the photostability of the dye at the room temperature in the solution and on the stained cells is noted. It showed that the dye is non-degradable both at the room temperature and also once it attaches to the cell membranes.

In yet another embodiment test for electric charge of the Dye by electrophoresis is performed, the yellow spot showed non-polar behaviour and does not move towards any pole.

In yet another embodiment, the pigment is a dye as it is giving a color to the filter paper and staining the cell membranes.

In yet another embodiment, the dye has a pH of 7.0.

In yet another embodiment 1 ml of the dye solution of 70% alcoholic extract from which the present dye is isolated was taken and 0.2 gms of di thio erythritol was incorporated. The solution does not get decolorized. It showed that the reducible group is absent in the coloring part of the solution.

In yet another embodiment 9 ml of the 70% alcoholic extract from which the present dye is isolated was subjected to heating in a water bath at 100-degree Centigrade. Coagulation was observed. Which confirmed the presence of protein in the step 1 solution of the dye.

In yet another embodiment, after removal of the protein from the starting material, the colored part gets separated and dissolves only in ether.

In yet another embodiment, the alcoholic extract was subjected to Anthrone test (Ref) by using 4 ml of sulfuric acid and Anthrone reagent. 1 ml of Water 4 ml of conc. sulfuric acid and Anthrone reagent was kept as a blank. The blank was faintly green after 5 minutes whereas the extract was turned bright green after 5 minutes. The test proved that the carbohydrate is present in the alcoholic extract.

The fluorescence activity of the dye solution is due to a colored component that includes non-polar fluorophore attached to a negatively charged protein, which gets easily separated when the protein is coagulated.

In yet another embodiment nontoxicity test of the dye on eukaryotic cell survival was performed.

The dye was tested for cytotoxicity upon the oyster sperms. The survival of the sperms in the experimental set ups was taken as a parameter for showing nontoxicity. Male gonads of an oyster were removed and sperms were released in 100% seawater. These were filtered through muscline cloth to remove any debris. 1 mililiter (ml) of the sperm solution was Oaken and different concentrations (1 $\mu l$, 2 $\mu l$, 3 $\mu l$, 4$\mu l$ and 5 $\mu l$) of the Dye solutions were added. At every half an hour the observations of survival of the sperms were made under a microscope. The experiments were continued for 24 hours. The Controls were maintained without addition of Dye. It was seen that there was no effect upon the survival rates of sperms with addition of the dye. This proved nontoxic nature of the dye.

In yet another embodiment nontoxicity test of the dye was performed upon survival of prokaryotes. The extract was tested for cytotoxicity upon gram negative *E.coli* bacteria by observing their survival or mortality. A drop of the live *E.coli* bacteria in water (50 $\mu l$) was placed on a microscopic slide. To this was added 0.5 $\mu l$–1.0 $\mu l$ of the ether extract. The mixture was mixed using stirring needle. The slide was sealed so as to save it from evaporation. It was seen under the microscope that the bacteria remained alive for 24 hours till they remained in solution. They died if the solution got dried. The control experiments were performed. This proved that the dye is nontoxic to the bacteria.

In yet another embodiment, the bacteria do not show agglutination behavior. In another embodiment, the oyster eggs, sperms do not show agglutination behavior.

The applicants studied the nature of the dye and found that it gave multicolored emissions at different wavelengths of excitations, which are comparable to the fluorochrome microscopic stains already in the market. The blue colored fluorescence of the present dye is comparable to the emission of same color by DAPI fluorochrome at the same wavelength excitation, used as components of the non-radioactive labeling kits of biochemistry, cell biology, immunochemistry, and molecular biology. The yellow colored fluorescence of the said dye in the visible range is comparable to the same colored emissions of auramine used as components of the non-radioactive labeling and detection kits of biochemistry, cell biology, immunochemistry, and molecular biology.

The yellow colored fluorescence of the said dye in the visible range is comparable to the same colored emissions of FITC used as components of the non-radioactive labeling and detection kits of biochemistry, cell biology, immunochemistry, and molecular biology.

The orange colored fluorescent emission is comparable to the orange fluorescence color of Propidium Iodide fluorochrome used as components of the non-radioactive labeling and detection kits of biochemistry, cell biology, immunochemistry, and molecular biology.

The orange colored fluorescent emission is comparable to the orange fluorescence color of TRITC fluorochrorrie used as components of the non-radioactive labeling and detection kits of biochemistry, cell biology, immunochemistry, and molecular biology.

The dye is stable at the room temperature and has a long shelf life. The molecular and radioactive kits of the said dye can be exported at the room temperatures. The dye has characteristics of at least one hundred and twenty three different fluorochromes namely DAPI, Hoechest 33258, Hoechest 33342, FITC, acridine orange, auramine, Rhodamine, TRITC, and propidium iodide etc., which are now in the market (Bitplane products). The dye, under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.

In yet another embodiment the epifluorescence microscopic studies are made by using this dye as a stain in the dilutions of above 1:400000 and recording emissions of light when excited by different cubes and compared the color hues with the known fluorochromes.

In yet another embodiment the screening was done using excitations of UV light and visible light spectra by WU, WB, WG and BF cubes of the Olympus reflected light.

In yet another embodiment WU cube's wavelength range is 330 nm–385 nm.

In yet another embodiment WB cube's wavelength range is 450 nm–480 nm.

In yet another embodiment WG cube's wavelength range is 510 nm–550 nm.

In yet another embodiment BF is for the bright field where an ordinary tungsten bulb delivers light.

In yet another embodiment, the emission ranges of the dye at different excitation ranges were found out. The background of the eggs in the epifluorescence microscopy photos shows the emission color of the dye.

In yet another embodiment it was seen that excitation with the WU 330 nm–385 nm range emitted fluorescence in the 450 nm–470 nm range.

In yet another embodiment Excitation with the WB filter having spectral range of 450 nm–480 nm emitted fluorescence in the 510-nm–570 nm range.

In yet another embodiment, the excitation with the WG filter having spectral range of 510 nm–550 nm emitted fluorescence in the 610-nm–650 nm range.

In yet another embodiment With BF the shades of yellowish grays were seen.

In yet another embodiment, the emission ranges of the dye after staining to the cell membranes at different excitation ranges were found out.

In yet another embodiment, the dye was used as fluorescence microscopic stain on the dead, live and fixed eggs of the oyster. The slides were screened under a epifluorescence microscope. It was noticed that the dead cells do not take up dye and shows no fluorescence.

In yet another embodiment, the dye was used as fluorescence microscopic stain on the live eggs of the oyster. The slides were screened under a epifluorescence microscope. It was noticed that the live cells showed fluorescence. The excitation spectral range and the emitted fluorescence strictly followed the Stoke's law. These ranges were different from the emission ranges of the dye, which represents the background of the fluorescing cell.

In yet another embodiment the dye was used as fluorescence microscopic stain on the fixed eggs of the oyster in 3:1 ethanol and acetic acid fixative. The slides were screened under a epifluorescence microscope. It was noticed that the fixed cells showed fluorescence. The excitation spectral range and the emitted fluorescence strictly followed the Stoke's law. These ranges were different from the emission ranges of the dye, which represents the background of the fluorescing cell.

In yet another embodiment excitation with the WU 330 nm–385 nm range emitted fluorescence in the 470nm–500 nm range in the cells.

In yet another embodiment excitation with the WB filter having spectral range of 450 nm–480 nm emitted fluorescence in the 570 nm–610 nm range.

In yet another embodiment, the excitation with the WG filter having spectral range of 510 nm–550 nm emitted fluorescence in the 610 nm–650 nm range.

In yet another embodiment the epifluorescent microscopic screening of the dead eggs under Bright Field emitted light in full white range of the visible spectra and depending upon the density of the cell ingredients gave hues of yellowish grays like a phase contrast effect.

In yet another embodiment the epifluorescent microscopic screening of the live eggs under Bright Field emitted light in full white range of the visible spectra and depending upon the density of the cell ingredients gave hues of yellowish grays like a phase contrast effect.

In yet another embodiment the epifluorescent microscopic screening of the fixed eggs (3:1 ethanol:acetic acid fixative) under Bright Field emitted light in full white range of the visible spectra and depending upon the density of the cell ingredients gave hues of yellowish grays like a phase contrast effect.

In yet another embodiment, the dye was used as microscopical stain for the *E.coli*. One loop of live *E.coli* bacteria was placed in 50 microliter of water on a microscopic slide and mixed. To this was added 0.5–1 microlitre (1 $\mu$l) of the dye solution towards outskirt of the bacterial suspension drop. The ether in the extract was allowed to evaporate by leaving the slide on bench for 4–5 sec. Both the drops were then mixed and a coverslip was placed on the sample and immediately sealed. Similarly a control preparation of bacterial suspension in water without dye was made.

In yet another embodiment both the slides were screened under oil immersion objective of a epifluorescence microscope (100×objective, 10×eye lens) for checking fluorescence. It was noticed that the dead cells don't take up dye and shows no fluorescence.

In yet another embodiment the live bacterial cells showed fluorescence. The excitation spectral range and the emitted fluorescence wavelengths strictly followed the Stoke's law. These were different from the dye solution and was as given below:

In yet another embodiment excitation with the WU 330-nm–385 nm range emitted fluorescence in the 470 nm–500 nm ranges.

In yet another embodiment Excitation with the WB filter having spectral range of 450 nm–480 nm emitted fluorescence in the 570-nm–610 nm range.

In yet another embodiment, the excitation with the WG filter having spectral range of 510 nm–550 nm emitted fluorescence in the 610-nm–650 nm range.

In yet another embodiment, the control *E.coli* without any dye also showed no fluorescence.

In yet another embodiment microphotography of the slides with the dye used as epifluorescence microscopy stain was done.

In yet another embodiment The microphotography of emitted fluorescence in the areas of slides with cells and the surrounding background which represented the emissions of colors only due to dye was done, under WU 330 nm–385 nm range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done, under WB 450 nm–480 nm range, range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done, under WB 510 nm–550 nm range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done, under Bright field with Kodak film of 400 ASA speed with an exposure time varying from 50 to 60 seconds.

In yet another embodiment permeation of dye in the Cell membranes was found out. The unfertilized, fertilized eggs and larvae of oysters were stained with the dye and egg suspension ratio of 1:50 microliter and screened under a fluorescent microscope. It was seen that the fluorescence was noticeable in the plasma membrane, nuclear envelope and chromatin. Though the wavelength ranges of emissions were the same and the colors were the hues of the same shade, there was a noticeable demarcation of boundaries of these parts of the cell. This proved that the dye is permeable through the live and fixed cell membranes of egg plasma membrane, cytoplasm, nuclear membrane, nucleoplasm and chromatin.

In yet another embodiment, the absence of fluorescence of these parts of the cell in the dead cells showed that dye is irnpermeant to dead cell membranes.

Different stains are used for different excitation cubes of the fluorescent microscope. For example DAPI (DNA staining, emits blue color), Fluorescein-dUTP; Hoechest 33258, 33342 are seen under excitation with 330 nm–385 nm excitation cubes; FITC, Acridine Orange (for DNA, RNA emits greenish/yellowish hues), Auramine under 450 nm–480 nm excitation cube and Rhodamine, TRITC and Propidium iodide (DNA, emits orange hues) under 510 nm–550 nm excitation cube.

In an embodiment to this epifluorescence putting a drop of the diluted extract and excitation with the WU filter having spectral range of 330–385 nm wavelengths does microscopic screening of the cytological slides.

In another embodiment epifluorescence microscopic screening of the cytological slides is done by putting a drop of the extract and excitation with the WB filter having spectral range of 450 nm–480 nm wavelengths.

In another embodiment epifluorescence microscopic screening of the cytological slides is done by putting a drop of the extract and excitation with the WG filter having spectral range of 510 nm–550 nm wavelengths.

In yet another embodiment epifluorescent microscopic screening of the cytological slides under Bright Field objective using this dye by transmitted light.

In yet another embodiment epifluorescence microscopic screening of the cytological slides stained with the dye is done by observing hues of the fluorescence color emitted by the respective excitations.

In another embodiment the excitation with the WU 330 nm–385 nm range emitted fluorescence is in the 470 nm–500 nm range.

In another embodiment, the excitation with the WB filter having spectral range of 450 nm–480 nm emitted fluorescence in the 570 nm–610 nm range.

In yet another embodiment the excitation with the WG filter having spectral range of 510 nm–550 nm emitted fluorescence in the 610 nm–650 nm range.

In another embodiment epifluorescent microscopic screening of the cytological slides under Bright Field by using transmitted light emitted light in full white range of the visible spectra depending upon the density of the cell ingredients and giving a phase contrast effect.

In still another embodiment, the dye is diluted in 70% ethyl alcohol 1:9000 times and vaporized and the dried matter is again dissolved in 3 ml ether by repeating dissolution in the same amount of ether three times and further mixed in water to 1:50 time which means total dilution of the pigment is above 1:400000 times which gives fluorescence of six colors at three different wavelengths.

In yet another embodiment the invention provides a bioactive composition containing an extract obtained from the marine sea-cucumber *Holothuria scabra* in the ratio of 1:400000 to obtain fluorescence of six colors at three different wavelengths and a phase contrast effect under transmitted light.

In an embodiment, the invention provides a composition comprising a bioactive extract obtained from the marine sea-cucumber *Holothuria scabra* together with conventional additives and useful in the preparation of coating compositions and inks.

In another embodiment, the invention provides composition comprising a bioactive extract obtained from the marine sea-cucumber *Holothuria scabra* together with conventional additives and useful in detection of leaks.

In yet another embodiment the invention provides a composition comprising a bioactive extract obtained from the marine sea-cucumber *Holothuria scabra* together with conventional additives and useful in undersea probes.

In yet another embodiment the invention provides a composition comprising a bioactive extract obtained from the marine sea-cucumber *Holothuria scabra* together with conventional additives and useful as a fluorescent probe in situ hybridization kits for molecular diagnosis.

In yet another embodiment the invention provides a composition comprising a bioactive extract obtained from the marine sea-cucumber *Holothuria scabra* together with conventional additives and useful as a component of non-radioactive labeling and detection kits of biochemistry, cell biology, immunochemistry and molecular biology.

In yet another embodiment the invention provides a composition comprising a bioactive extract obtained from the marine sea-cucumber *Holothuria scabra* together with conventional additives and useful in immuno fluorescent detections.

In yet another embodiment the invention provides a composition comprising a bioactive extract obtained from the marine sea-cucumber *Holothuria scabra* together with conventional additives and useful as a counterstain of DIG-labeled oliogonucleotide probes and anti-DIG Fab-fragments.

In yet another embodiment the invention provides a composition comprising a bioactive extract obtained from the marine sea-cucumber *Holothuria scabra* together with conventional additives and useful in single and multiple cell quantitative fluorescence in flowcytometry.

In yet another embodiment the invention provides a composition comprising a bioactive extract obtained from the marine sea-cucumber *Holothuria scabra* together with conventional additives and useful as fluorochrome stains for epifluorescence microscopy.

In yet another embodiment the invention provides a composition comprising a bioactive extract obtained from the marine sea-cucumber *Holothuria scabra* together with conventional additives and useful for a quick check of biocontamination in the health food industry, cosmetic industry, pharmaceutical and chemical industries.

In yet another embodiment the invention provides a composition comprising a bioactive extract obtained from the marine sea-cucumber *Holothuria scabra* together with conventional additives and useful for rapid estimations of biocontaminants in laboratory cultures.

In yet another embodiment the invention provides a composition comprising a bio active extract obtained from the marine sea-cucumber *Holothuria scabra* together with conventional additives and useful for a rapid check of biopollutants under field conditions.

In yet another embodiment the invention provides a composition comprising a bio active extract obtained from the marine sea-cucumber *Holothuria scabra* together with conventional additives and useful in microbial kits.

In yet another embodiment the invention provides a composition comprising a bio active extract obtained from the marine sea-cucumber *Holothuria scabra* together with conventional additives and useful as a natural colorant.

In yet another embodiment the dye solution contains a fluorophore which can be conjugated with proteins and other bio molecules for making customer oriented dye compositions.

DESCRIPTION OF THE TABLES

TABLE-1 The Emissions of the different colored fluorescence of the fluorescent dye when excited with different wavelength fluorescent filter cubes of the Olympus epifluorescence microscope with dye solution and when attached to cell membranes of the prokaryotic cells.

TABLE-2 The Emissions of the different colored fluorescence of the fluorescent dye when excited with different wavelength fluorescent filter cubes of the Olympus epifluorescence microscope with dye solution and when attached to cell membranes of the eukaryotic cells.

Table-3 Table showing various commercially important features of the three natural fluorescent dyes extracted from the sea cucumber of the present invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 6a Colored photograph of FIG. 6. The chromatin inside the nucleus is also seen.

Figure 1:
FIG. 1 Black and white figure of epifluorescence microscopy results of green color fluorescent emissions of the dye and yellow colored emissions of the bacterial cells where dye has attached (arrow) when the dye was excited with WB filter cube of Olympus BX-60 microscope having excitation range of 450–480 nm.
Figure 1A:
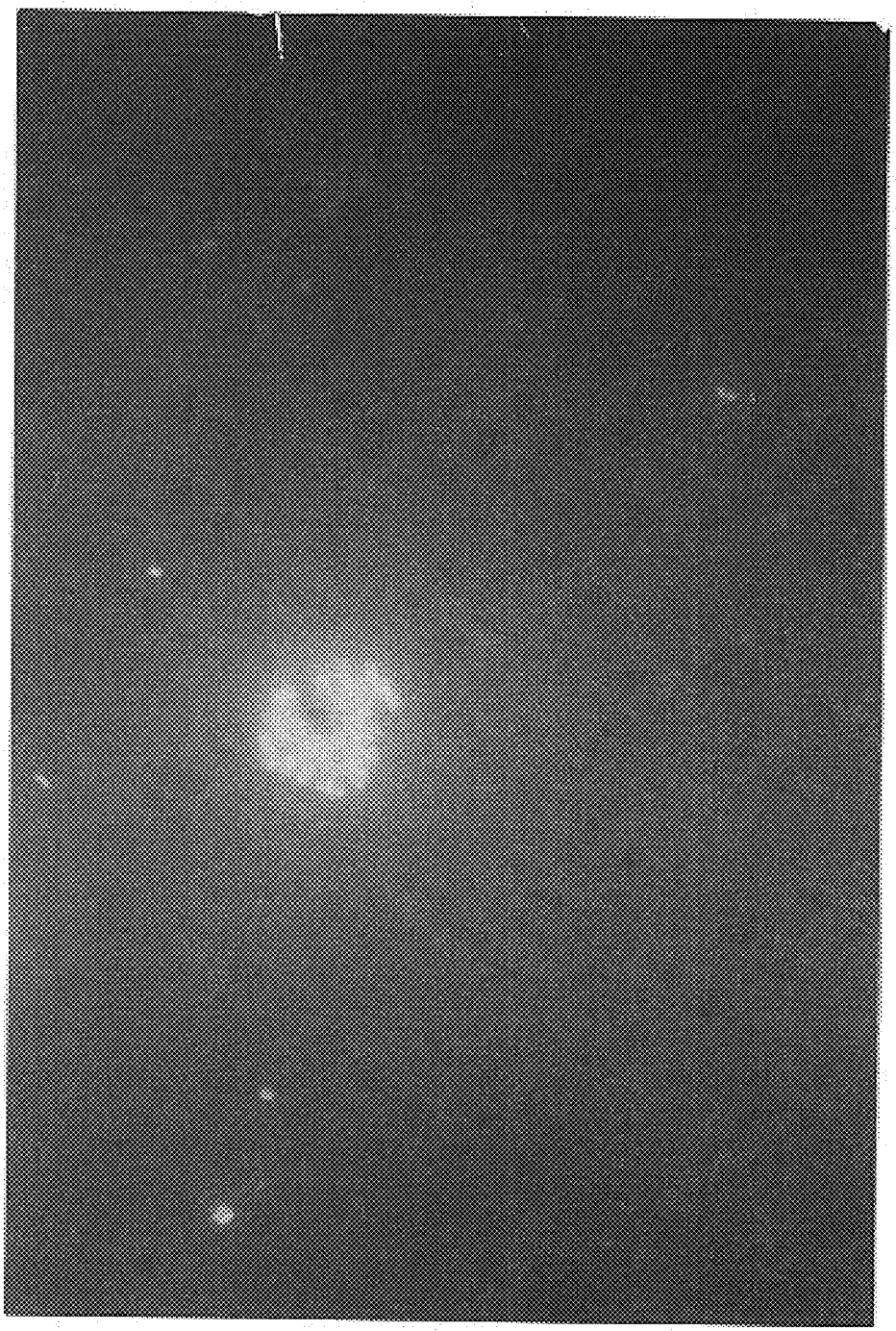
FIG. 1a Colored photograph of FIG. 1.
Figure 2:
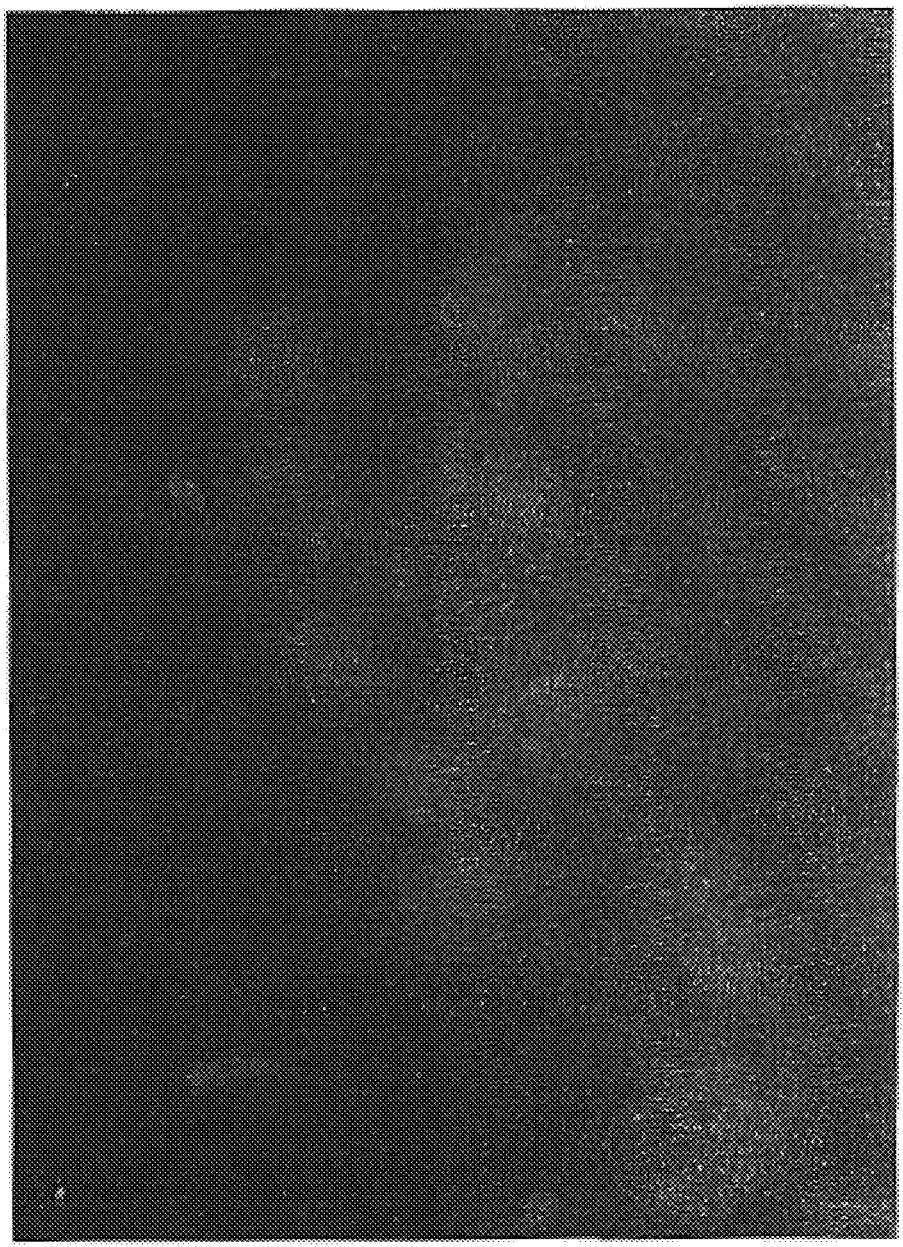
FIG. 2 Black and white figure of epifluorescence microscopy results of dark red color fluorescent emissions of the dye and orange colored emissions of the bacterial cells where dye has attached (arrow) when the dye was excited with WG filter cube of Olympus BX-60 microscope having excitation range of 510 nm–550 nm nm.
Figure 2A:
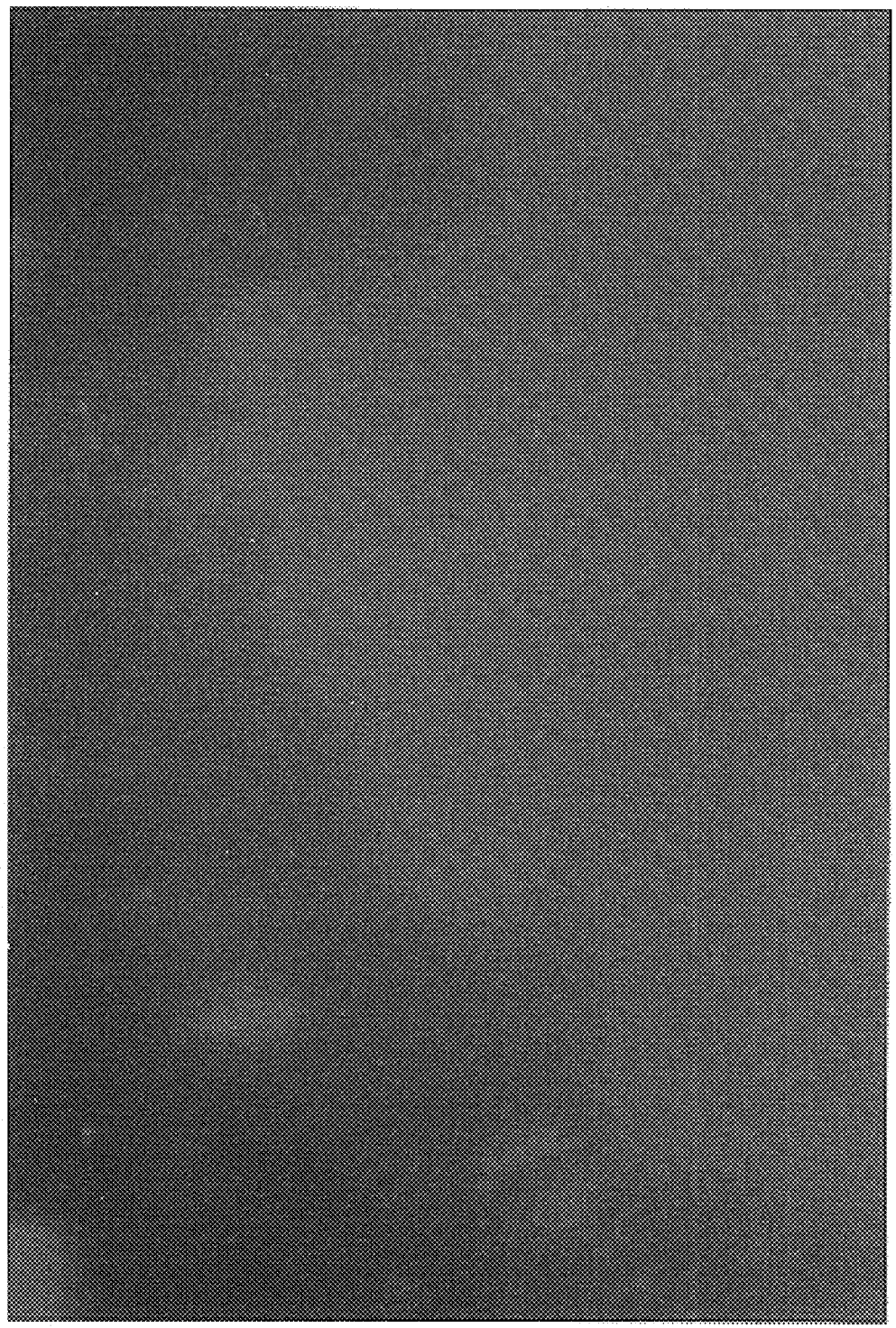
FIG. 2a Colored photograph of FIG. 2.

This invention pertains to the process of extraction, partial purification and characterization of a New natural non-polar pigment which is fluorescent dye from an echinoderm (Holothuroidea: *Holothuria scabra*) widely distributed along the central West Coast of India and the Indo-pacific regions of the world.

The invention further provides a novel fluorescent protein dye from the ovarian tissue of the animal which can be repeatedly extracted 3–4 times from the same tissue by storing in 70% ethyl alcohol under −4 degree Centigrade, thus saving over exploitation of natural resources.

The present invention also contemplates that the said dye has six colored fluorescent emissions at three different excitation wavelengths of UV and visible light spectra equivalent to emissions by six different fluorochromes (DAPI, FITC and PI) and the pycobiliproteins and rhodamines currently used for multicolor fluorescent detentions. The dye actually covers the wavelength emission spectra of about one hundred and twenty three fluorochromes currently sold in the market for fluorescent microscopy probes. The stained cells show different color emissions at the same excitations but strictly follow stroke's law. Thus altogether at same excitations of olympus BX-60 microscope filters the dye emits 6 colors.

The dye is nontoxic to living *E.coli* bacteria and eukaryotic cells.

The dye permeates through the various cell constituents membranes and stains them fluroscently.

The dye is non-degradable once it is attached to cell membranes by staining them. The dye does not show agglutination of bacteria and anomal cells. The dye is a fluorophore in ether solution. The fluorciphore is conjugated to a protein in the 70% alcohol solution of ovarian tissue.

Thus, the dye can be commercialized as natural nontoxic cell permeant multiple fluorescent dye of epifluorescence microscopy for single, double and triple staining of chromosomes cells and tissues following simple protocols.

The present invention also contemplates the use of the dye in non-radioactive labeling of protein, DNA and RNA probes for fluorescent in situ hybridization applications in molecular biology.

Thus in a preferred mode of use the dye can be a component of molecular labeling and detection kits, most of which are imported and sold at high rates.

These labeling kits are widely sought after for molecular diagnostics using rapid molecular cytogenetic and microarrays techniques.

Yet another advantage of the dye is that its fluorescence is visible even in very dilute solutions (1:40000 to 400000) and above.

This property and the nontoxic Eco friendly nature of the dye can be utilized in life saving devices as a component of life jackets and to mark the location of crashed aircraft, life rafts and defense equipment for example rockets, leaking checks in the industries etc.

The invention would be useful for quantitative measure of fluorescence in flow cytometer for single and multiple cells.

The invention would be also advantageous in quick estimations of bio-contamination in natural and controlled environments like tissue cultures, pollution, and industrial contamination in health, food and cosmetic industries.

In another preferred mode of use the dye bottle if sealed properly has a long shelf life at the room temperature.

In another preferred mode of use the dye has a long shelf life at the room temperature once the cells are stained as checked by fluorescent microscopic analysis.

Another utility of the fluorescent dye is as a component of novel remote sensing devices and undersea probes where light wavelength sensitivity based data is required.

The invention is illustrated by the following examples, which should not be construed as limitations on the inventive scope of the invention in any manner.

EXAMPLES

The methods of isolation, partial purification, characterization of the dye and the details of the experiments performed to check non-polar, nontoxic, cell permeant, non-agglutination and multiple fluorescent effects of the dye by epifluorscence microscopy are disclosed:

Example 1

Collection of the Material

Material of the patent is a sea cucumber with following taxonomic details. Subkingdom: Metazoa; Phylum: Echinodermata; Sub-Phylum: Eleutherozoa; Class: Holothuroidea; Subclass: Aspidochirotacea; Order: Aspidochirota; Genus: Holothuria Species: scabra The material was collected from the shores of central West Coast of India during a low tide. The animals were brought to the laboratory and maintained in glass tanks containing seawater of salinity 30–32 per par (30%$_0$) till further use.

Example 2

Extraction of the Dye

Extraction of the dye is a two step process. First an alcoholic extract is made and second the alcohol is evaporated and the fluorophore is separated and dissolved in solvent ether as follows:

Step 1: The animals were first washed with tap water and then with Milliq water (ultra pure water). The body was cut open with the sharp scissors and the female gonads were identified and removed. The color of the ovaries varied from yellow to orange. 1 milligram (1 mg) of the ovarian tissue is weighed and 70% ethyl alcohol was added to it in the ratio of 1:3 (weight by volume ratio). Yellowish orange colored pigment came out. The dye solution was decanted. To the remaining tissue again 70% ethyl alcohol was added and colored solution removed. These steps were repeated three times for extraction of the pigment without homogenizing the tissue of the ovary. The extract was filtered through Whattman No. 1 filter paper. The extract was was stores in a vial with screw cap at 4° C. and termed as "Stock dye solution". The extract carrying both light-yellow and orange colored pigments from the ovarian tissue were characterized by the following methods. The properties were found the same. 1 mg ovarian tissue: 3 ml of 70% ethyl alcohol (3 times) i.e. 1 mg of pigment in 9 ml or 9000 microliter of alcohol.

Step 2: 15 ml of 70% alcoholic dye solution was taken, heated to coagulate the proteins and evaporated slowly to dryness in a water bath at 80° centigrade. The dried material was not soluble in water and alcohol. It was soluble in ether.

Ether was added to the dried material and allowed to stand at the room temperature for 15 minutes. The coloring portion got dissolved. It was then filtered by a Whattman no 1 filter paper to obtain a clear yellow colored solution, which was labeled as "Non-polar fluorescent dye".

Example 3
Physical Characteristics of the Dye
Color and Solubility

The said Dye solution is orange in color with the naked eye. In the daylight/tube light it gives varied colors emissions. The dye is insoluble in water but is soluble in non-polar solvent ether. Hence it is a non-polar dye. The dye has pH of 7.0.

Example 4

The said extract was subjected to paper electrophoresis. A whattman No.1 filter paper was soaked in phosphate buffer (0.1 M) pH 7 and placed in an electrophoresis chamber. Both the electrodes were immersed in phosphate buffer. A spot was made with 5 microlitre ($\mu l$) of the dye subjected to paper electrophoresis at 40 volts. The yellow spot does not move toward to any side. Further, it is getting dissolved only in the non-polar solvent ether. Since the dye is dissolving only in the ether, it is a non-polar dye.

Example 5
Photostability

The ether extract of the dye is stable at room temperature. However to safeguard from evaporation the ether solution of the dye is kept at a cool place. Once the cells are labeled with the dye the fluorescence remains for months together at the room temperature.

Example 6
Test for Electric Charge of the Dye by Electrophoresis

The said extract was subjected to paper electrophoresis. A whattman No. 1 filter paper was soaked in phosphate buffer (0.1 M) pH 7 and placed in an electrophoresis chamber. Both the electrodes were immersed in phosphate buffer. A spot was made with 5 microlitre ($\mu l$) of the of the dye subjected to paper electrophoresis at 40 volts. The yellow spot does not move toward to any side.

However, the 70% alcohol solution of isolation of phase 1 when tried, the colored spot moved towards positive pole. Which indicates that the non-polar pigment of the present dye in the phase 1 alcoholic extract of the ovarian tissue is attached to some negative protein. Chemical and HPLC analysis found the presence of proteins and carbohydrates in the alcoholic extract.

Example 7
Chemical Properties of Dye 1 ml of the dye solution, which is the alcoholic ovarian extract, was taken and 0.2 grams of di thio erythritol was incorporated. The solution does not get decolorized. It showed that the coloring part of the fluorescent dye does not contain a reducible group.

Example 8
Test of Non-proteinaceous Nature of the Dye 5 ml of the step 1 extract was subjected to heating in a water bath at 100 degree centigrade. Coagulation was observed in the alcoholic extract. This confirmed presence of protein in the starting alcoholic extract, however the protein was removed b coagulation. The colored solution came from the dried matter by dissolving it in ether. Since, the protein part has been removed the dye is said to be of non-proteinaceous nature.

Example 9
Absence of Agglutination of Bioactivity

One loop of live *E. coli* bacteria was placed in 50 microliter of water on a microscopic slide and mixed. To this was added 1 microlitre (1 $\mu l$) of the dye solution. The alcohol was allowed to evaporate by leaving the slide on bench for 10–15 sec. A coverslip was then placed on the preparation of bacteria and sealed. Similarly a control preparation of bacteria was made without any dye.

Both the slides were screened under oil immersion objective of an epifluorescence microscope (100×objective, 10×eye lens) for checking the agglutination bioactivity and the fluorescence under WU, WB, WG and BF. It was seen that the bacteria did not show any clump formation (FIGS. 10, 10a).

The agglutination behavior was, however, noticed in the 70% alcoholic solution removed from the ovary tissue in phase 1 of isolation. But the protein was removed in the second phase of isolation and the present dye solution was of non-proteinaceous nature.

The absence of the tendency of cells to make aggregations in the presence of the present dye solution indicated that it does not contain a lectin like glycoprotein any more.

Example 10
Agglutination Bioactivity Test with Eukaryotic Sperms

One milliliter solution of oyster sperms (100 microliter) was placed in the cavity of a sedgewick counter used for phytoplankton counts. 1 microliter (1 $\mu l$) of dye solution was added. The slide was screened under 40×objective of a microscope with 10×eye lens. It was observed that the sperms did not make clumps, which confirmed lacking of lectin like activity of the dye.

Example 11
Test for Fluorophore and Protein Association in Phase 1 Material of 70% Alcoholic Solution but Absent in the Present Dye Phase 2 Isolation As mentioned in examples 4 and 6, the fluorophore shows non-polar behavior. But it appears that in the 70% alcoholic solution of ovarian tissue of isolation phase 1 the colored spot moves towards positive pole during paper electrophoresis. It may be bound in that phase to some component, which is negatively charged. The HPLC data of the 70% alcoholic solution detected only proteins and carbohydrates. As carbohydrates do not have an electric charge, it suggested that the colored component of the present dye in phase 1 (70% alcoholic solution) be attached to some protein, which is negatively charged. However, in isolation phase 2, which produces the present dye, it gets separated from the protein on coagulation by heating. It is the solution of phase 2 dye, which forms the present nonpolar dye solution.

Example 12
Method of Using the Non Polar Dye in Experiments

The dye is soluble in ether so a special method is adopted for of adding dye to the experimental animals. Live cells are taken on a clean slide. To this is added a measured amount of ultra pure/seawater depending upon the media in which the cells are cultured and remain alive in controls. The measured amount of the dye is placed on outer skirt of the drop and allowed to evaporate for 2–3 seconds. The solution is then mixed with tip of an eppendorf. A coverslip is immediately placed on the sample and sealed. The slides are labeled and the cells are viewed under an epifluorescence microscope.

Example 13
Nontoxicity Test of the Dye on Eukaryotic Cells

The extract was tested for nontoxicity upon the oyster sperms. The survival of the sperms in the experimental set ups was taken as a parameter for showing nontoxicity Male gonads of an oyster were removed and sperms were released in 100% seawater. These were filtered through a musline cloth to remove any debris. 1 mililiter (ml) of the sperm solution was taken and different concentrations (1 µl, 2 µl, 3 µl, 4 µl and 5 µl) of the Dye solutions were added. At every half an hour the observations of survival of the sperms were made under a microscope. The experiments were continued for 24 hours. The Controls were maintained without addition of Dye. It was seen that there was no harmful effect upon the survival of sperms with the addition of the dye. This proved nontoxic nature of the dye to estuarine and marine animal cells.

Example 14
Nontoxicity Test of the Dye on Prokaryoles

Figure 3:
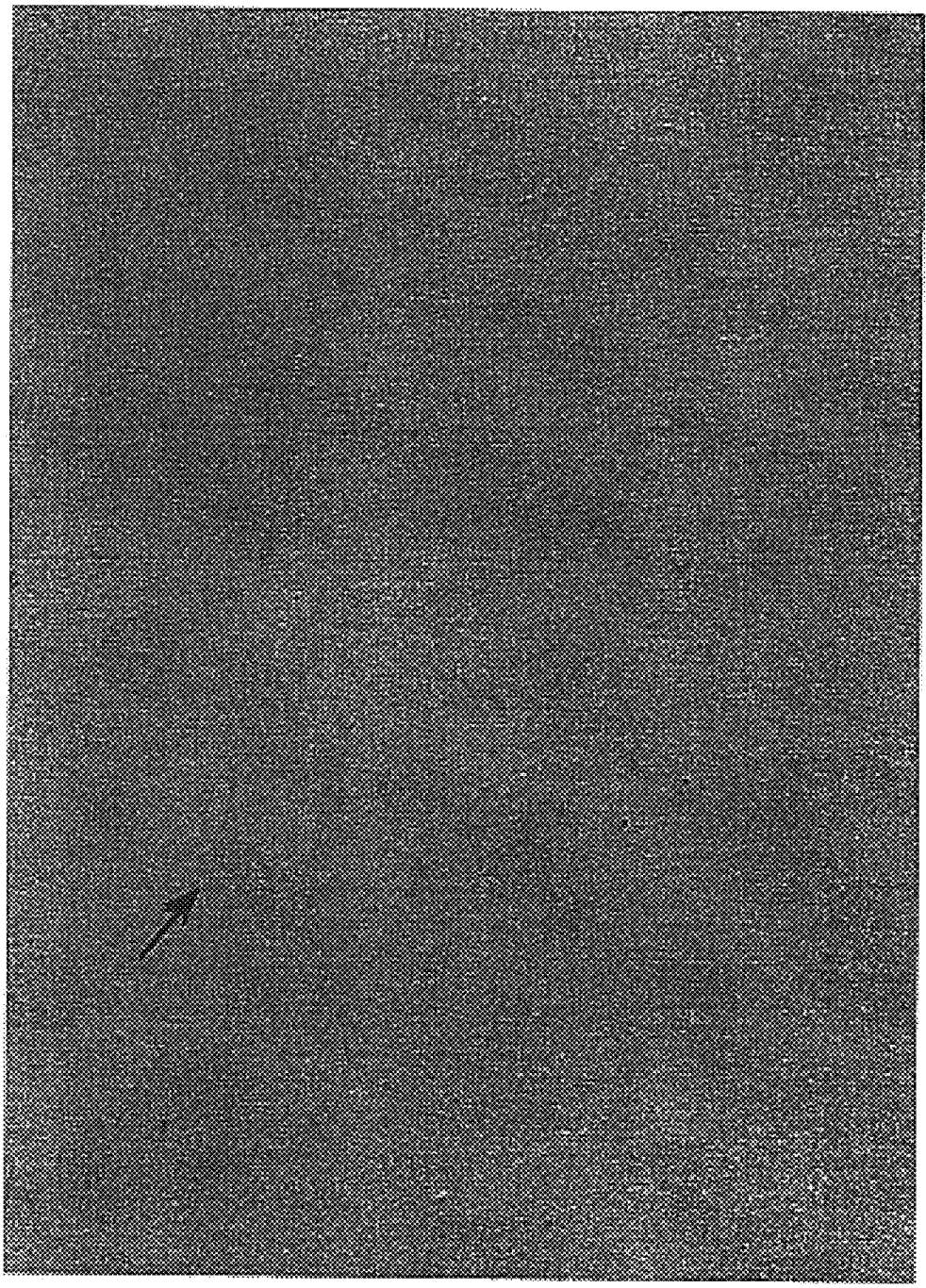
FIG. 3 Black and white figure of epifluorescence microscopy results of dead bacteria showing no fluorescence.
Figure 3A:
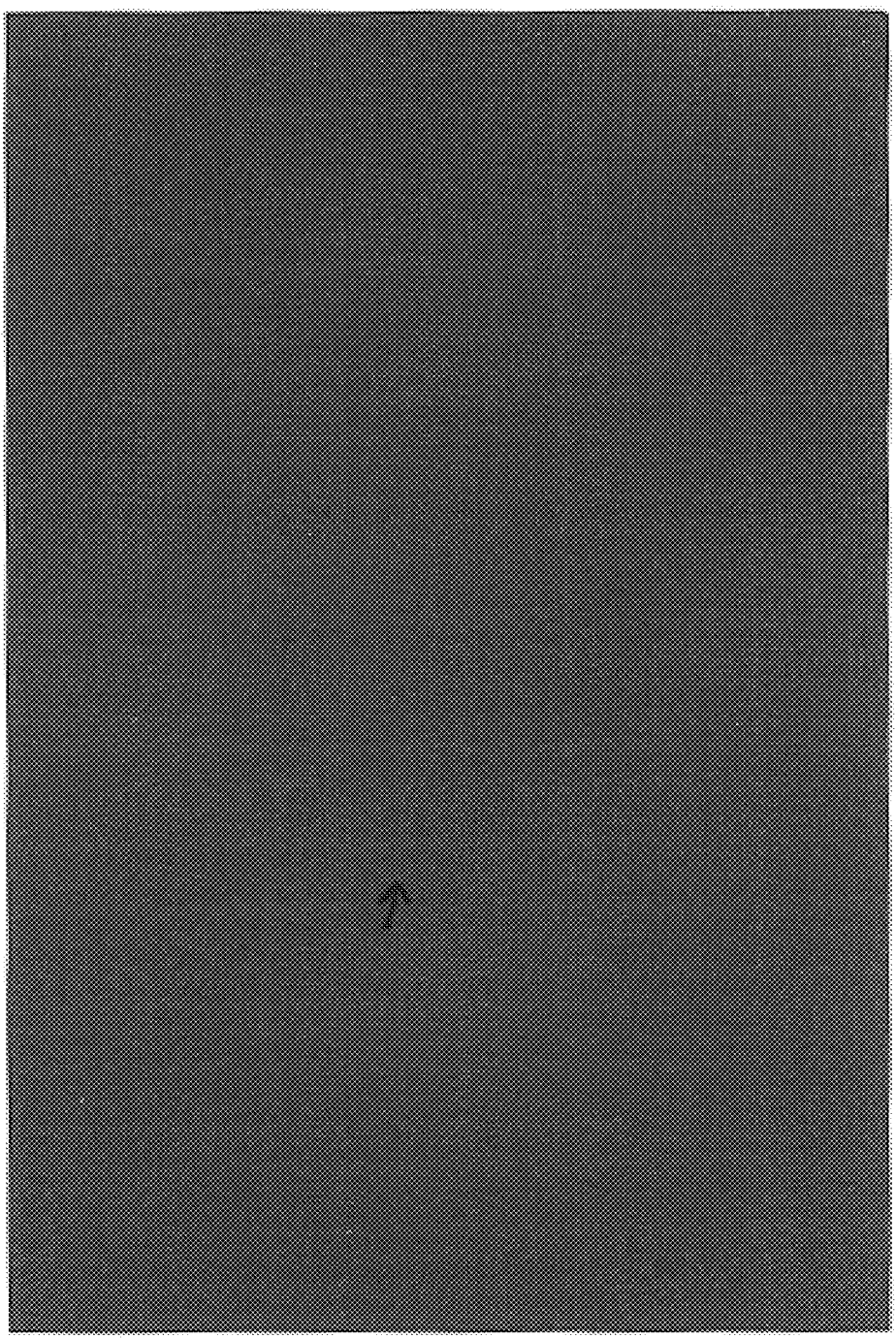
FIG. 3a Colored photograph of the same under WG filter cube of Olympus BX-60 microscope having excitation range of 510 nm–550 nm.
Figure 4:
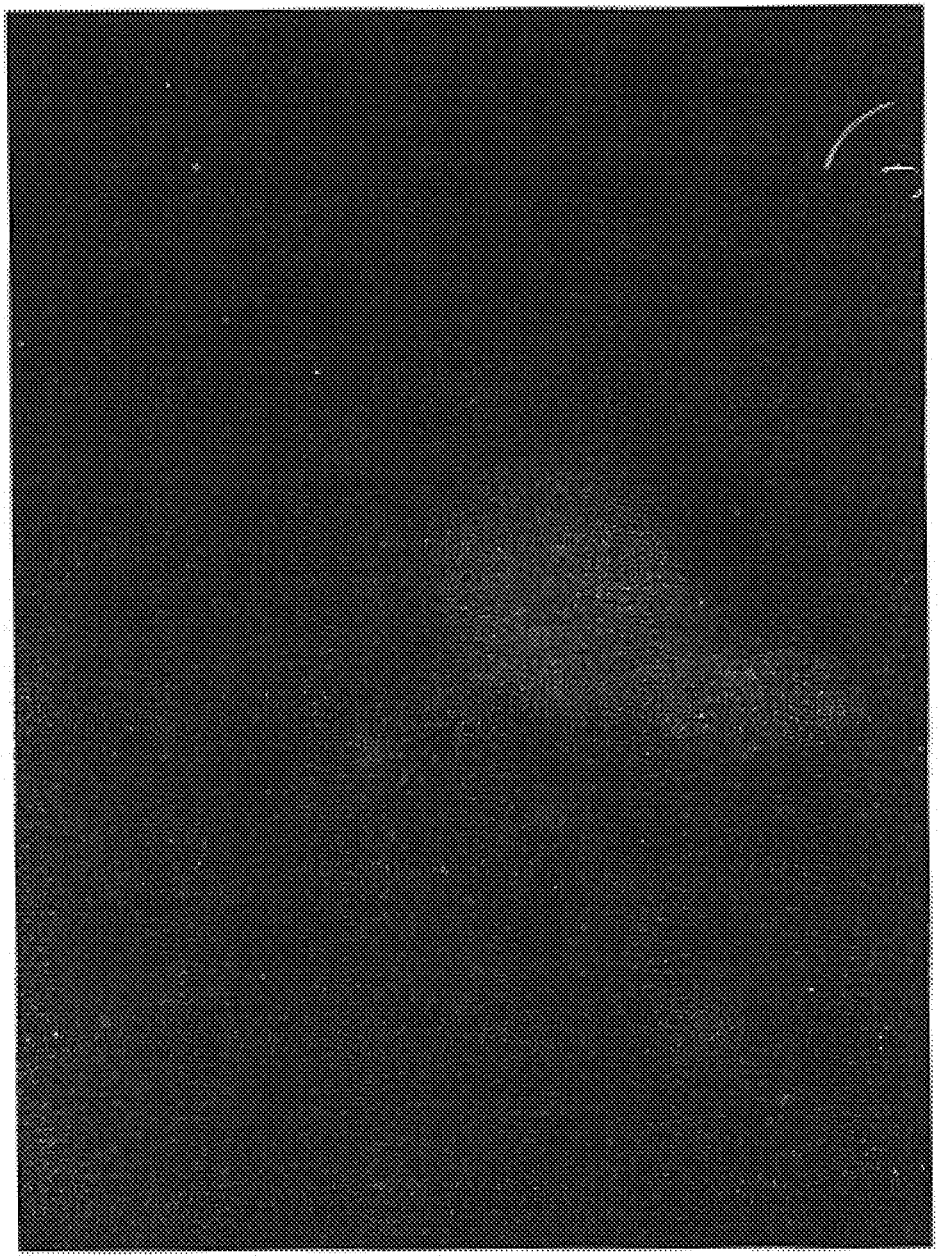
FIG. 4 Black and white figure of epifluorescence microscopy results of dark red color fluorescent emissions of the dye and orange colored emissions of the oyster egg cell where dye has attached when the dye was excited with WG filter cube of Olympus BX-60 microscope having excitation range of 510 nm–550 nm nm. The nuclear envelope and chromatin is seen.
Figure 4A:
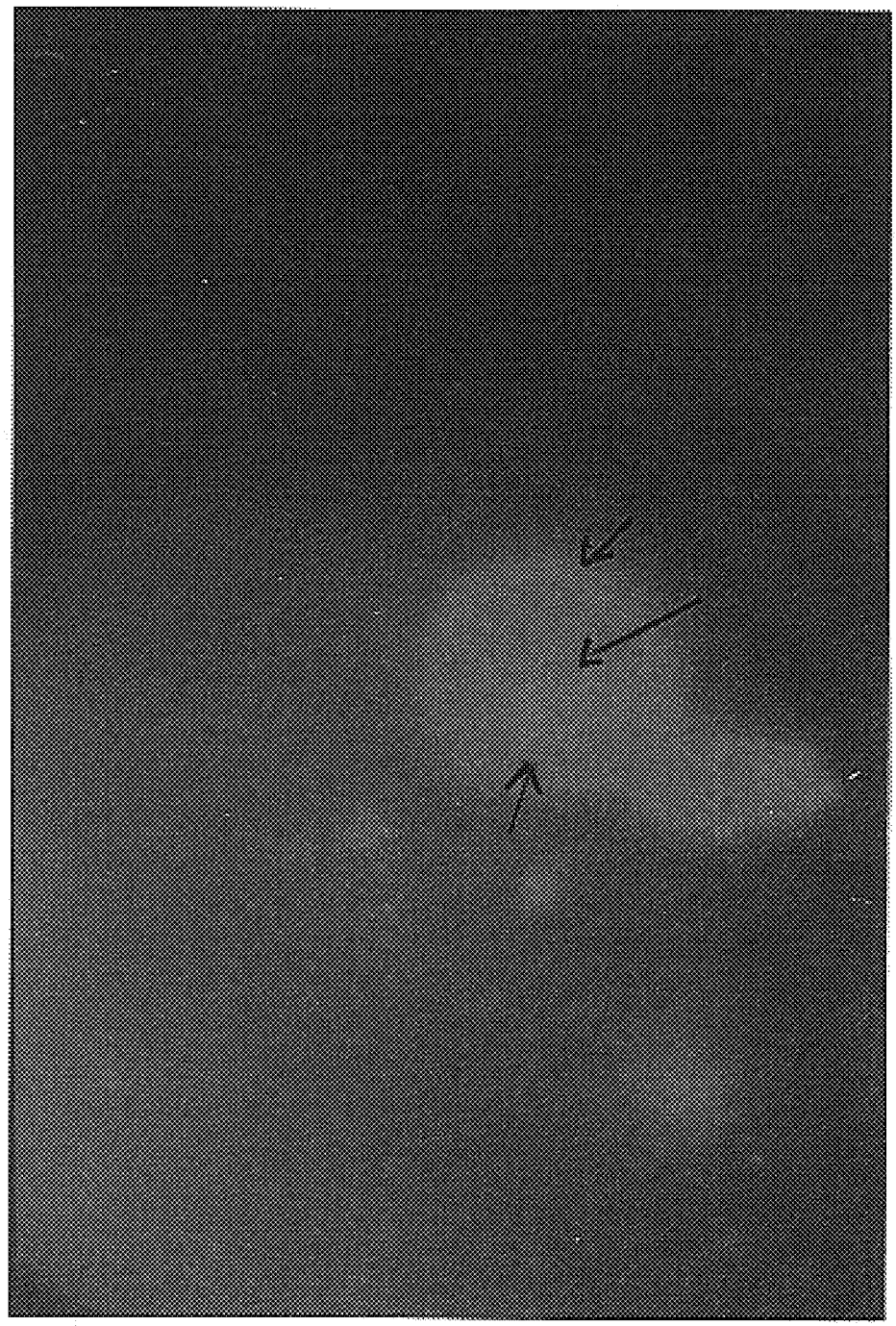
FIG. 4a Colored photograph of FIG. 4.
Figure 5:
FIG. 5 Black and white figure of epifluorescence microscopy results of green color fluorescent emissions of the dye and yellow colored emissions of the live egg cells where dye has permeated (arrow) when the dye was excited with WB filter cube of Olympus BX-60 microscope having excitation range of 450–480 nm. The cell permeant nature of the dye showing egg membrane and nuclear envelope and the cytoplasm and nucleoplasm stained (arrows)
Figure 5A:
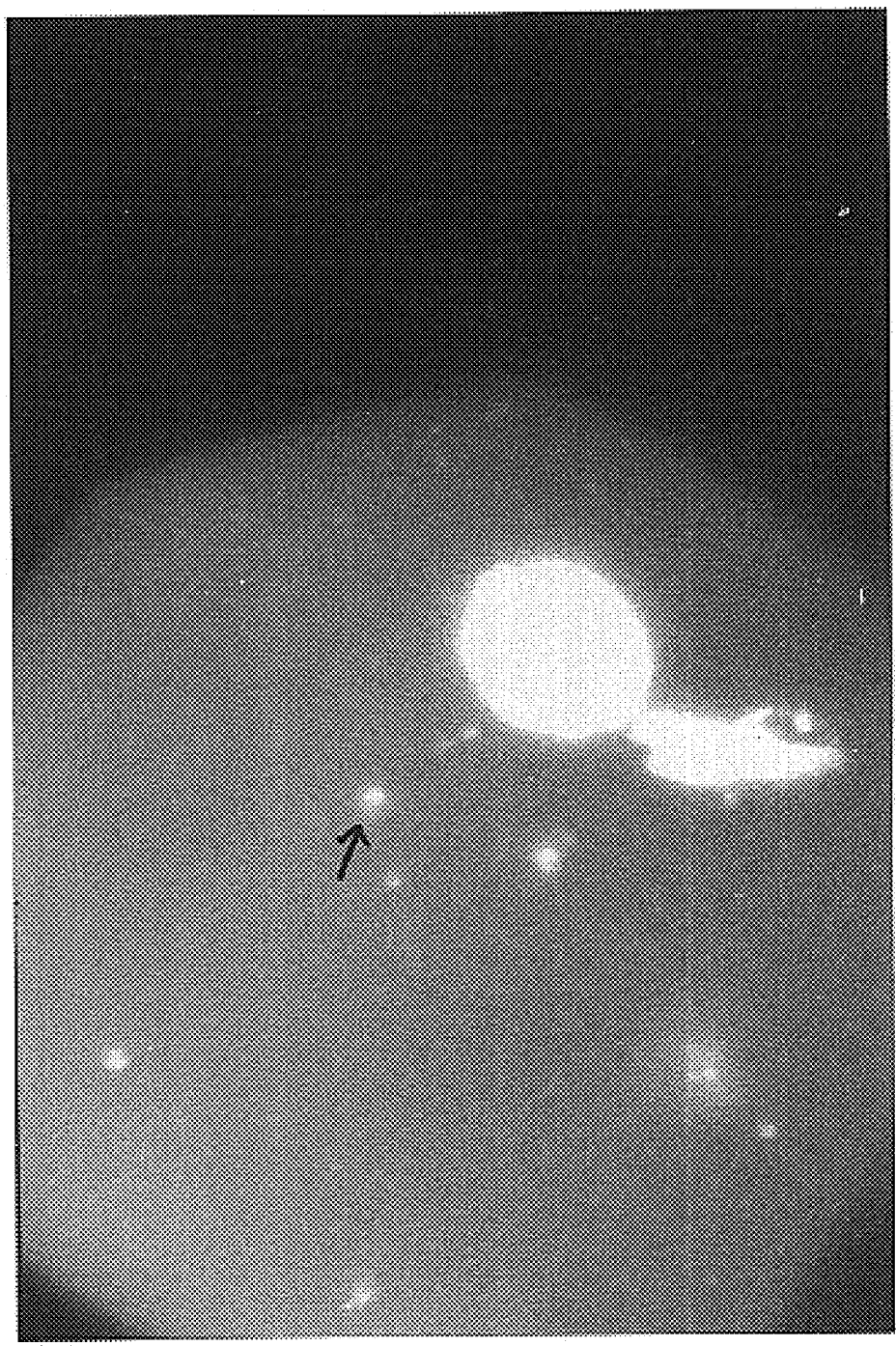
FIG. 5a Colored photograph of FIG. 5. The chromatin of sperm nucleus is also seen.
Figure 6:
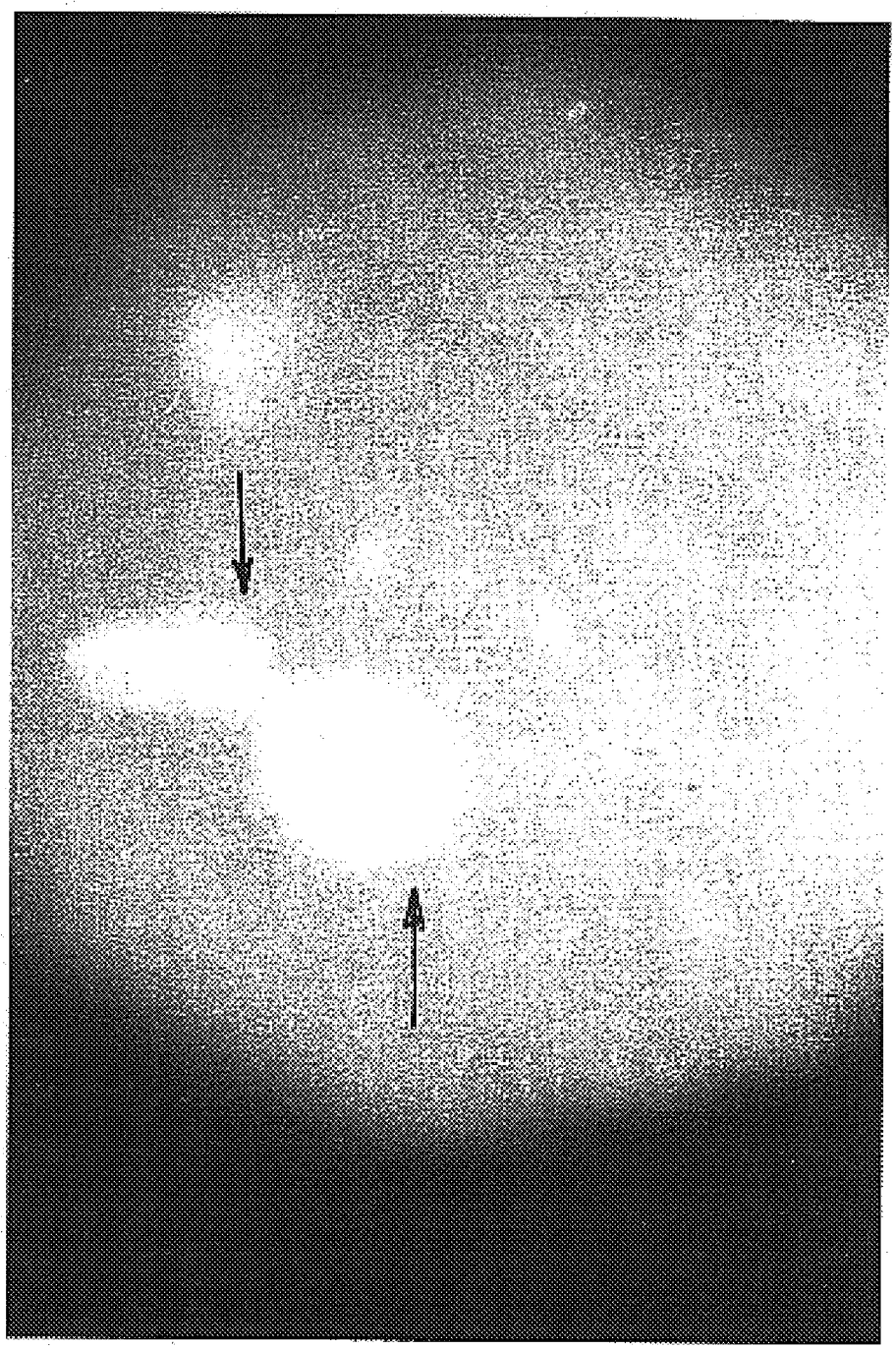
FIG. 6 Black and white figure of epifluorescence microscopy results of dark bluish green color fluorescent emissions of the dye and blue colored emissions of the live egg cells where dye has permeated (arrow) when the dye was excited with WU filter cube of Olympus BX-60 microscope having excitation range of 330 nm–385 nm. The cell permeant nature of the dye showing egg membrane and nuclear envelope and the cytoplasms and nucleoplasm stained.
Figure 6:
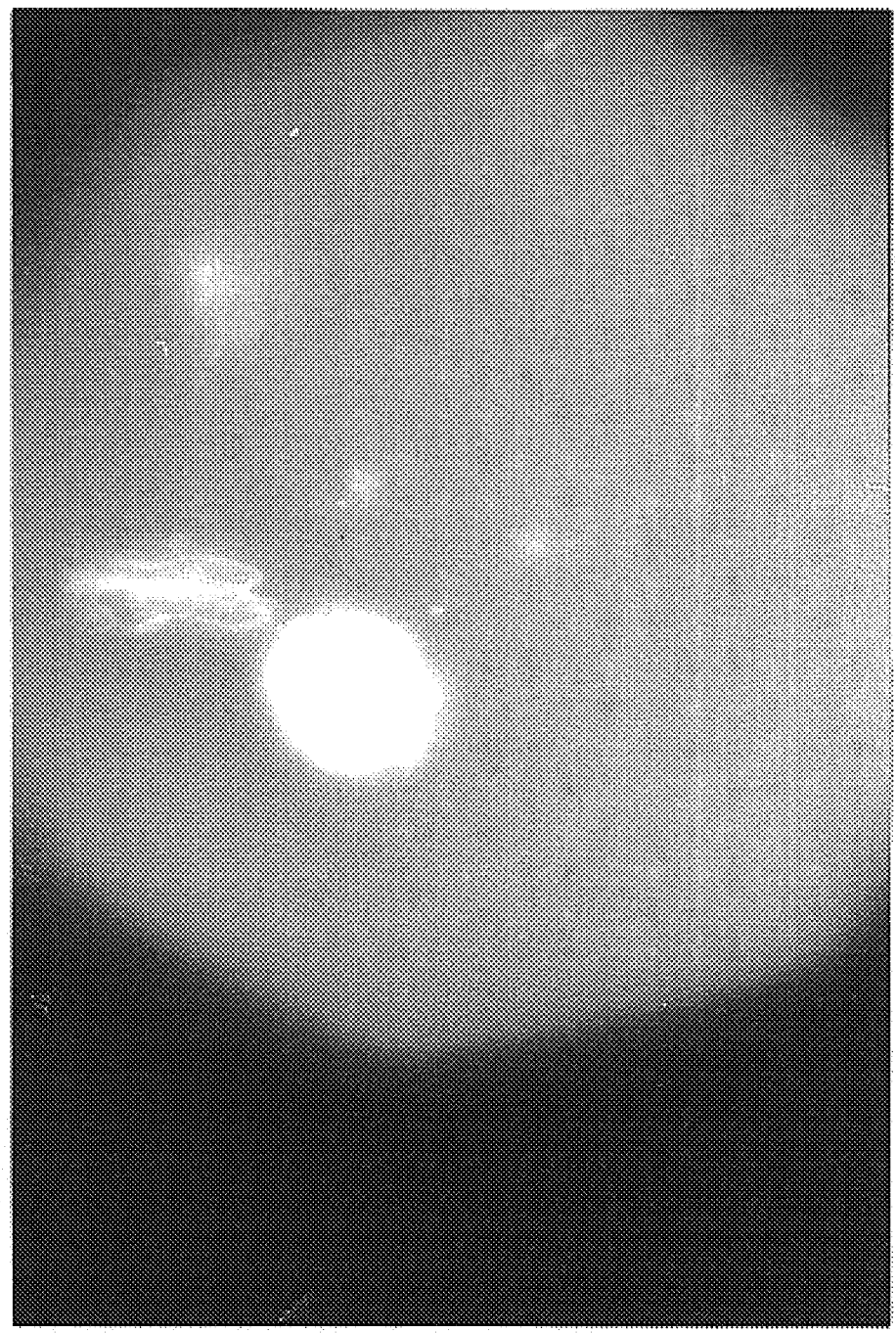
Figure 7:
FIG. 7 Black and white figure of epifluorescence microscopy results of dark bluish green color fluorescent emissions of the dye and bright bluish white colored emissions of the oyster embryo cells 5 days after the permeation of the dye (arrow) when the dye was excited with WU filter cube of Olympus BX-60 microscope having excitation range of 330 nm–385 nm.
Figure 7A:
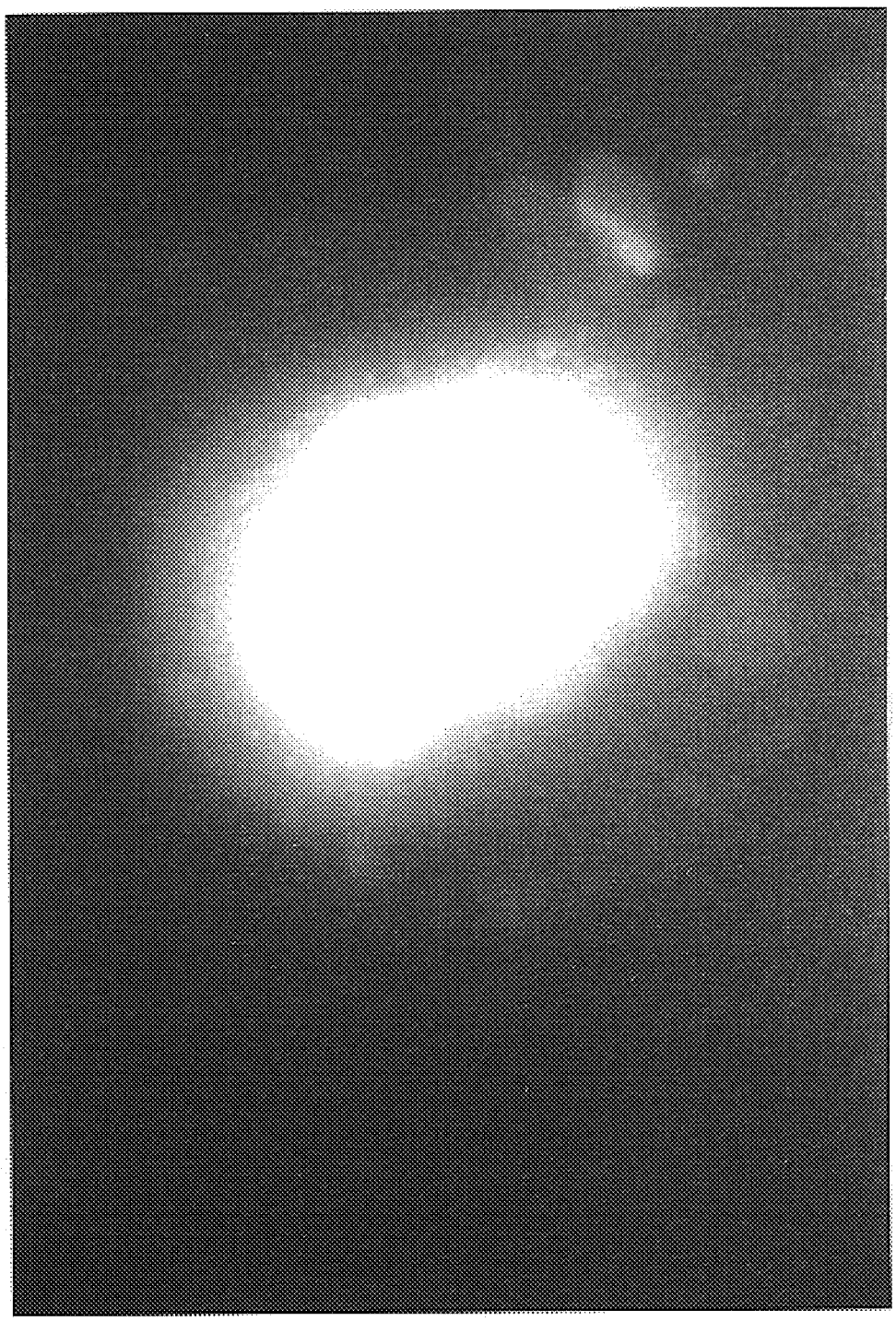
FIG. 7a Colored photograph of FIG. 7.
Figure 8:
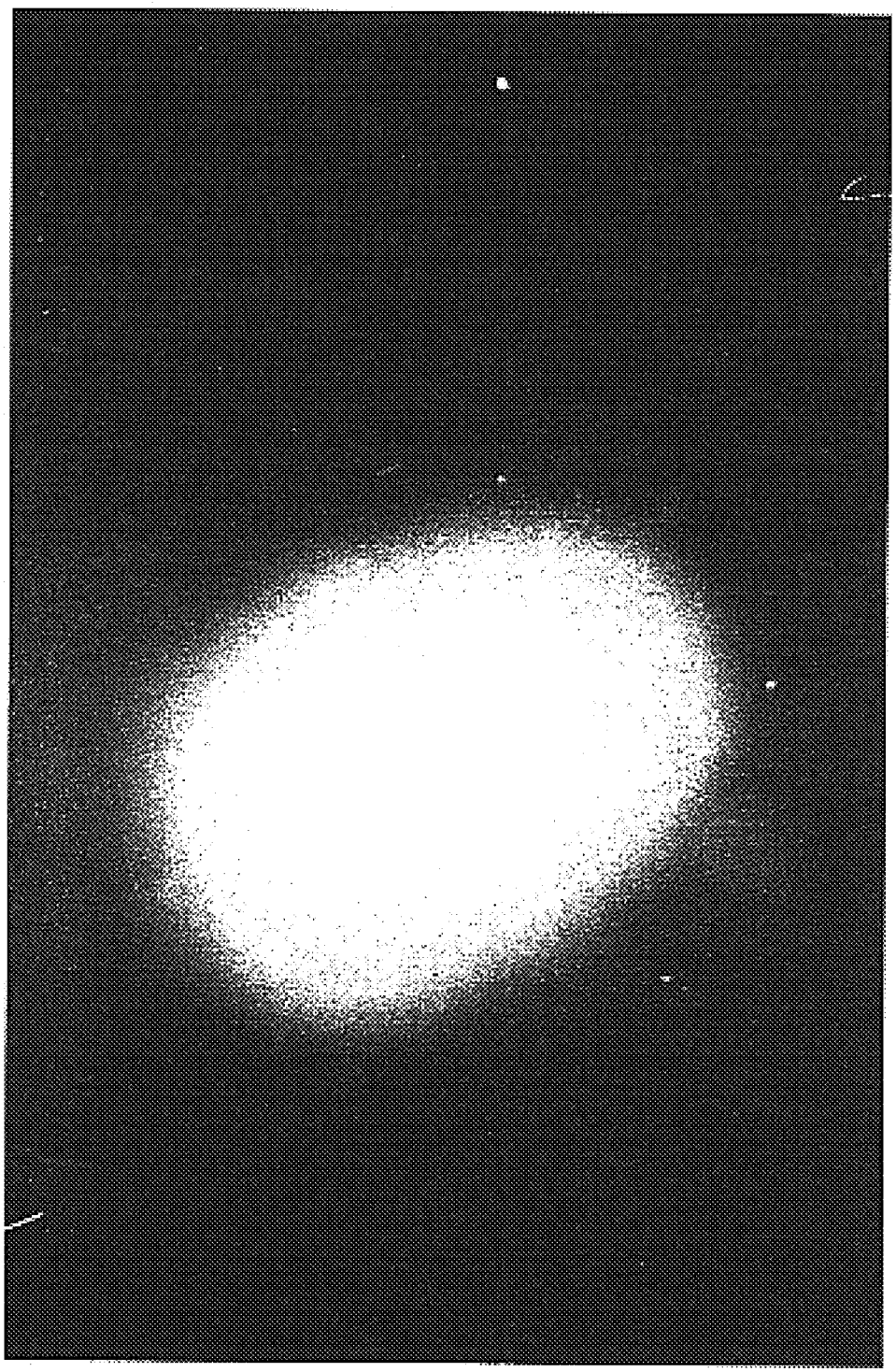
FIG. 8 Black and white figure of epifluorescence microscopy results of dark bluish green color fluorescent emissions of the dye and yellow colored emissions of the live oyster embryo cells 5 days after permeation of the dye (arrow) when the dye was excited with WB filter cube of Olympus BX-60 microscope having excitation range of 450–480 nm.
Figure 8A:
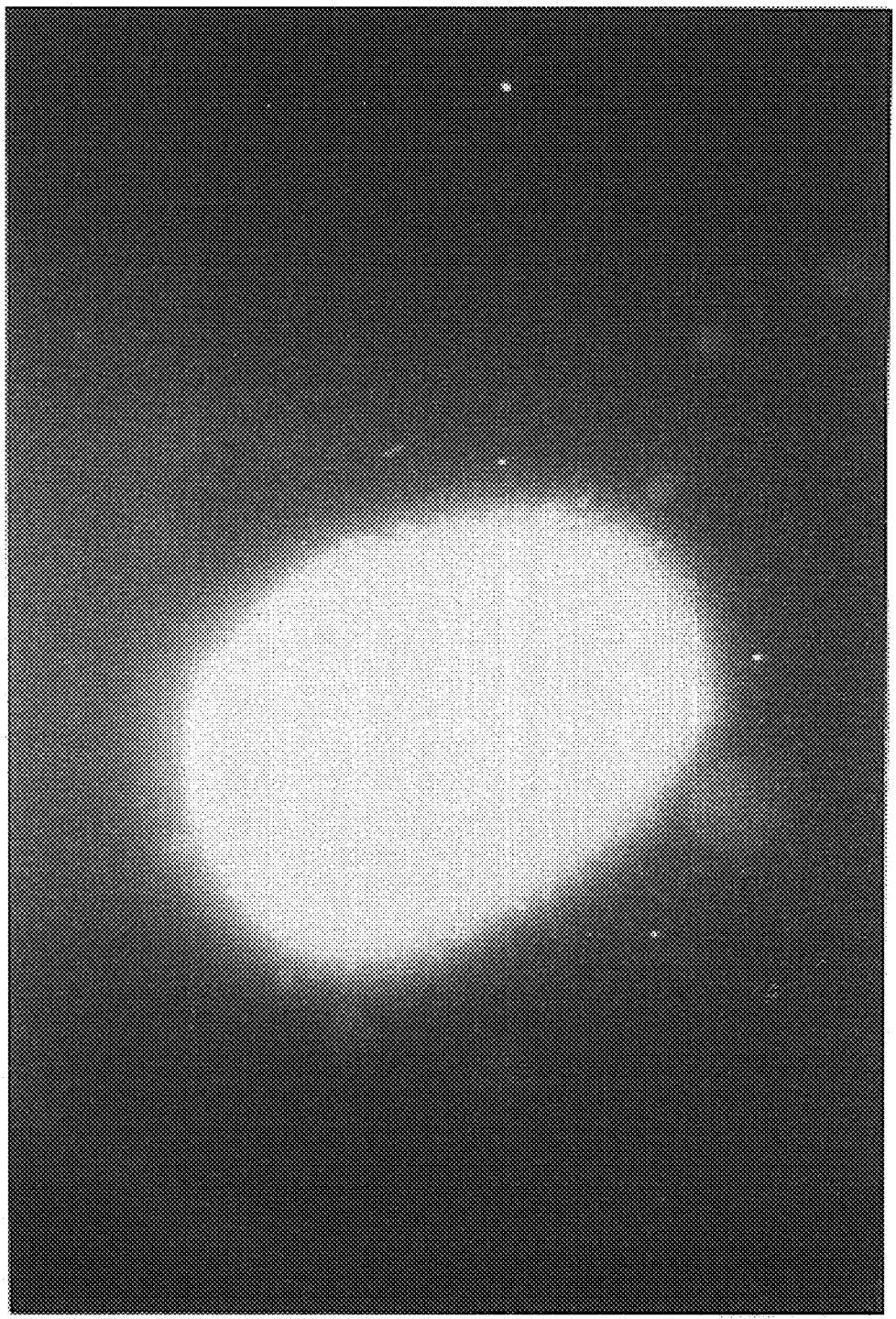
FIG. 8a Colored photograph of FIG. 8.
Figure 9:
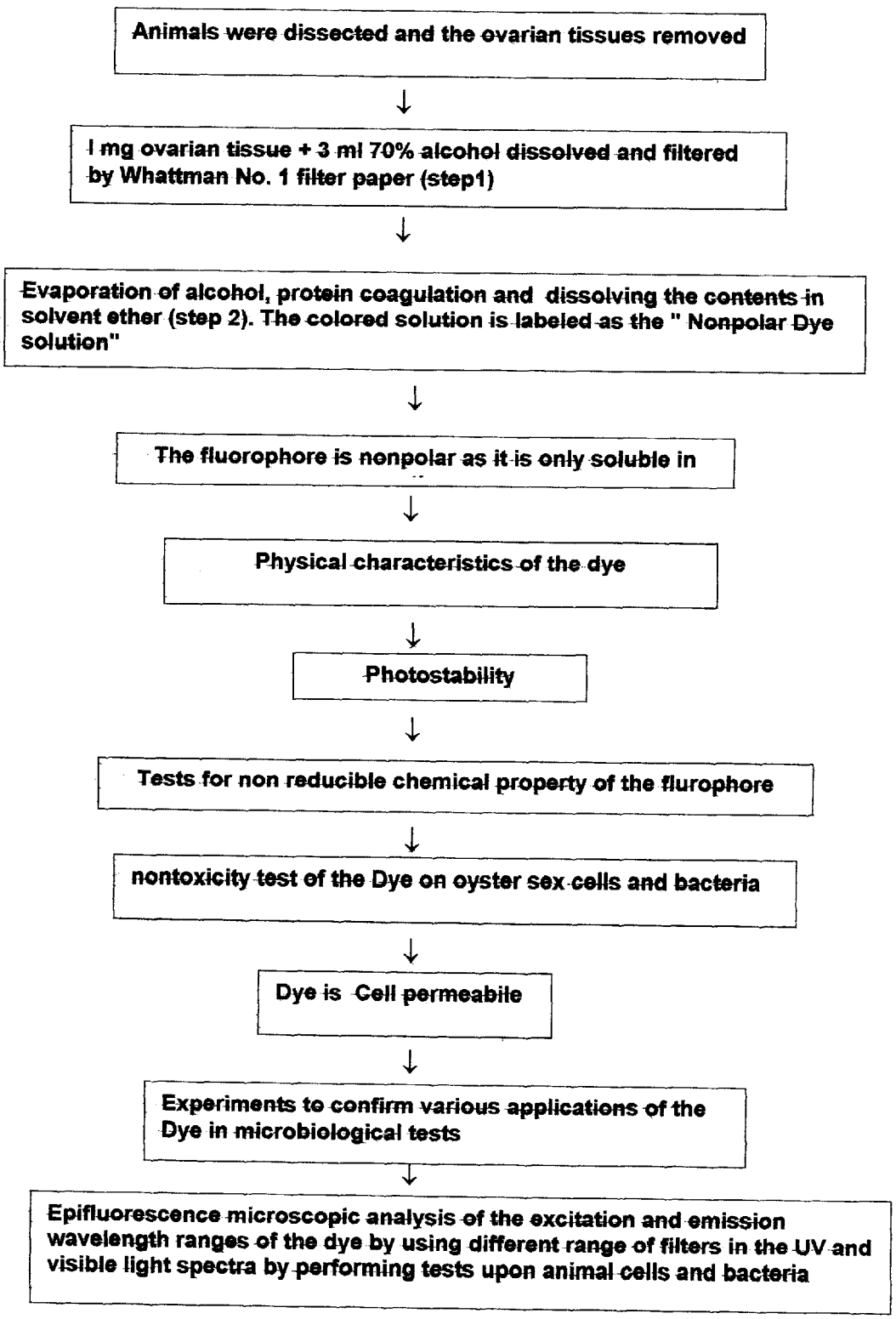
FIG. 9 Flow-chart.

The extract was tested for toxicity upon gram negative *E.coli* bacteria by observing their survival/mortality. Live *E.coli* bacteria were taken on a clean slide. To this was added 25 µl ultra pure water. 1 µl of the dye is placed on outer skirt of the drop and allowed to evaporate for 2–3 seconds. The solution is then mixed with tip of an eppendorf. A cover slip is immediately placed on the sample and sealed. The slides are labeled and the cells are viewed under an epifluorescence microscope FIGS. 1,1a, 2 and 2a). The dead bacteria do not show any fluorescence (FIGS. 3,3a).

Example 15
Dye Permeability Test in Oyster Eggs

The unfertilized, fertilized eggs and larvae of oysters were stained with the dye and egg suspension ratio of 1:50 microliter and screened under a fluorescent microscope. It was seen that the fluorescence was noticeable in the plasma membrane, nuclear envelop and chromatin. Though the wavelength ranges of emissions were the same and the colors were the hues of the same shade, there was a noticeable demarcation of boundaries of these parts of the cell (FIGS. 4,4a, 5,5a, and 6,6a). This proved that the dye is permeable through the live and fixed cell membranes of egg plasma membrane, cytoplasm, nuclear membrane, nucleoplasm and chromatin. The absence of fluorescence of these parts of the cell in the dead cells showed that dye is impermeable to dead cell membranes.

Example 16
Detection of Live and Dead Bacteria in Cultures

A drop of the live *E.coli* bacteria in water (25 µl) was placed on a microscopic slide. To this was added 1 µl of the dye. The slide was sealed temporarily so as to save it from evaporation. It was seen under the microscope that the bacteria gave fluorescence in all the filter excitation ranges like WU, WB and WG. The controls were kept with the live *E.coli* without the stain and the dead *E.coli*. In both the controls the bacteria did not show fluorescence. This showed that the dye could be used for sorting live and dead bacteria in cultures (FIGS. 3,3a)

Example 17
Dye Useful for Checking Results of Cytotoxicity Bioassays

The quality of showing fluorescence in the live and fixed cells and not the dead cells is useful for checking cytotoxicity and antibacterial activity of various compounds by performing bioassays and checking the results with this dye.

Example 18
Dye Useful for Checking Bacterial Contamination

The quality of showing fluorescence in the live and fixed cells and not the dead cells is useful for checking contamination in the environmental and industrial samples where presence and absence of bacteria needs to be seen.

Example 19
Epifluorescence Microscopy of the Fluorophore

The epifluorescence microscopic studies are made by using this dye as a stain in the dilutions of 1:100 and recording emissions of light when excited by different cubes and compared the color hues with the known fluorochromes. It was noticed that the emissions were much stronger with the fluorophore though the shades of colors were the same. The screening was done using excitations of UV light and visible light spectra by WU, WB, WG and BF cubes of the Olympus reflected light. The details of cubes were as follows:

WU cube's wavelength range was 330 nm–385 nm.
WB cube's wavelength range was 450 nm–480 nm.
WG cube's wavelength range was 510 nm–550 nm.
BF is for the bright field where an ordinary tungsten bulb delivers light.

Example 20

The emission ranges of the dye at different excitation ranges were found out. It was seen that excitation with the WU 330 nm–385 nm range emitted fluorescence in the 450 nm–470 nm range. Excitation with the WB filter having spectral range of 450 nm–480 nm emitted fluorescence in the 510 nm–570 nm range. The excitation with the WG filter having spectral range of 510 nm–550 nm emitted fluorescence in the 610nm–650 nm range. With BF the shades of yellowish grays were seen.

Example 21
Fluorescence Emissions in the Oyster Cells

The dye was used as microscopical stain on the dead, live and fixed eggs of the oyster. The slides were screened under an epifluorescent microscope. It was noticed that the dead cells do not take up dye and shows no fluorescence. (FIGS. 4, 4a, 5, 5a, 6, 6a, 7, 7a, 8 and 8a). The fluorescence was observed in the eggs even 5 days after the first use of the dye and leaving the slides it the room temperature.

The live and fixed cells showed fluorescence. The excitation spectral range and the emitted fluorescence strictly followed the Stoke's law. These were different from the dye solution and was as given below:

Excitation with the WU 330 nm–385 nm range emitted fluorescence in the 470 nm–500 nm range. Excitation with the WB filter having spectral range of 450 nm–480 nm emitted fluorescence in the 570 nm–610 nm range. The excitation with the WG filter having spectral range of 510 nm–550 nm emitted fluorescence in the 610 nm–650 nm range. The epifluorescent microscopic screening of the dead, live and fixed eggs under Bright Field by using transmitted light emitted light in full white range of the visible spectra and depending upon the density of the cell ingredients gave hues of gray a phase contrast like effect.

Example 22
Fluorescence Emissions in the *E.Coli* Cells

The dye was used as microscopical stain on the *E.coli*. The slides were screened under a epi fluorescent microscope. It was noticed that the dead cells do not take up dye and show no fluorescence. (FIGS. 3, 3a). The live cells showed fluorescence. The excitation spectral range and the emitted fluorescence strictly followed the Stoke's law. These were different from the dye solution and was as given below:

Excitation with the WU 330 nm–385 nm range emitted fluorescence in the 470 nm–500 nm range. Excitation with the WB filter having spectral range of 450 nm–480 nm emitted fluorescence in the 570 nm–610 nm range. The excitation with the WG filter having spectral range of 510 nm–550 nm emitted fluorescence in the 610 nm–650 nm range. The control *E.coli* without dye did not show any fluorescence.

Example 23
Microphotography of the Fluorescent Cells with the Dye used as Stain

The microphotography of emitted fluorescence in the areas of slides without cells and with specimen cells, under WU 330 nm–385 nm range, WB 450 nm–480 nm range, WG 510 nm–550 nm range and Bright field was done by Kodak film of 400 ASA speed with an exposure varying from 50 to 60 seconds.

Advantages Over the Present Marketed Dyes

1) The dye is non-radioactive as it is a dye from a natural source and not synthetic.
2) The dye is nontoxic to estuarine, marine animals and gram negative *E.coli* bacteria
3) The dye is cell membrane permeant and attaches itself to nuclear mebrane and chromatin also.
4) The dye is permeant to cytoplasm and nucleoplasm.
5) The dye is a non-polar fluorescent dye from a non-bioluminescent marine animal.
6) The dye is a partially purified fluorophore in solution.
7) This dye in its single form is equivalent to six synthetic fluorochromes which covers the major part of UV and visible light spectrum emission of fluorescent colors.
8) The dye can be used as a quick microscopic stain giving a phase contrast effect without any extra expenses on phase contrast accessory of a microscope and without any lengthy protocols of fixations and preservations of specimens, especially on the spot quality check of live samples.
9) Being non-degradable in quality of fluorescence at the room temperature, it does not require refrigeration while exporting the dye. The presently marketed fluorescent dyes are exported under refrigeration equivalent to –20 degree centigrade.
10) Being non-degradable in quality of fluorescence on stained cells for longer duration, it does not require refrigeration while exporting stained slides. The dye solution can be marketed at 4 degree centigrade. The presently marketed fluorescent dyes exported under refrigeration equivalent to –20 degree centigrade.
11) The dye has a pH in the range of 7.0 so in compositions the pH of the products will not change drastically.
12) The fluorophore can be conjuagetd with other biomolecules.
13) The dye is non-polar.
14) It is soluble in ether.
15) The dye is non-degradable under natural conditions.
16) The dye is non-degradable under natural conditions and also once it gets attached to the cell membranes. This can be of immense value to study live cell functions, organelle structure, cell sorting and flowcytometry.
17) The dye solution is nontoxic to live bacteria and oyster eggs and sperms.
18) The nontoxic nature of the dye has the advantage that this can be made a dye component of kits dealing with analysis of live cells
19) The nontoxic nature of the dye has the advantage that this can be made a dye component of kits dealing in situ operational studies in oceanography.
20) The dye does not stain and do not show fluorescence on dead bacteria. This is useful in tissue culture for checking live and dead cells.
21) The dye being nontoxic to live cells can be useful in following up of cell lines.
22) The dye is cell membrane permeant in the live and fixed cells. This is a natural dye so has the advantage over the synthetic ones because it will be more ecofriendly.
23) The dye covers a wider range of emission wavelengths at selective excitations. This makes it a very acceptable component of dual emission dyes kits marketed presently for addition of a third emission color range.
24) The dye does not undergo photobleaching while screening under the microscope.
25) The dye does not show photobleaching once it stains the cells on slides. This makes it useful in histochemical studies.
26) The dye emitted these fluorescence colors even at a dilution range of 1:400000 to 1:900000 times
27) These multicolored emissions of the dye at different wavelengths of excitations are comparable to the fluorochrome microscopic stains already in the market.
28) The blue colored fluorescence of the present dye is comparable to the emission of same color by DAPI fluorochrome at the same wavelength excitation, used as components of the non-radioactive labeling kits of biochemistry, cell biology, immunochemistry, and molecular biology.
29) The blue colored fluorescence of the present dye is also comparable to the emission of color by Hoechest 33258 used as components of the non-radioactive labeling and detection kits of biochemistry, cell biology, immunochemistry, and molecular biology.
30) The blue colored fluorescence of the present dye is also comparable to the emission of color by Hoechest 33342 fluorochrome at the same wavelength excitation used as components of the non-radioactive labeling and detection kits of biochemistry, cell biology, immunochemistry, and molecular biology.
31) The yellow colored fluorescence of the said dye in the visible range is comparable to the same colored emissions of Acridine orange used as components of the non-radioactive labeling and detection kits of biochemistry, cell biology, immunochemistry, and molecular biology.
32) The yellow colored fluorescence of the said dye in the visible range is comparable to the same colored emissions of auramine used as components of the non-radioactive labeling and detection kits of biochemistry, cell biology, immunochemistry, and molecular biology.
33) The yellow colored fluorescence of the said dye in the visible range is comparable to the same colored emissions of FITC used as components of the non-radioactive labeling and detection kits of biochemistry, cell biology, immunochemistry, and molecular biology.
34) The orange colored fluorescent emission is comparable to the orange fluorescence color of Propidiumr Iodide fluorochrome used as components of the non-radioactive labeling and detection kits of biochemistry, cell biology, immunochemistry, and molecular biology.
35) The orange colored fluorescent emission is comparable to the orange fluorescence color of Rhodamine fluorochrome used as components of the non-radioactive labeling and (detection kits of biochemistry, cell biology, immunochemistry, and molecular biology.

36) The orange colored fluorescent emission is comparable to the orange fluorescence color of TRITC fluorochrome used as components of the non-radioactive labeling and detection kits of biochemistry, cell biology, immunochemistry, and molecular biology.

37) Unlike the synthetic commercial dyes used for the same purposes, the present dye is stable at the room temperature and has a long shelf life. Molecular non-radioactive kits of the said dye can be exported at the room temperatures.

38) The said single dye has characteristics of atleast one hundred and twenty three different fluorochromes (DAPI, Hoechest 33258, Hoechest 33342, FITC, acridine orange, auramine, Rhodamine, TRITC, and propidium iodide etc.) now in the market.

39) Under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.

40) The microphotographs with Kodak film rolls show hues of the adjacent color emission wavelengths. Like when seen blue color fluorescence under the epifluorescence microscope in microphotograph the hues of green also comes.

41) The microphotographs with Kodak film rolls show hues of the adjacent color emission wavelengths. Like when seen yellow color fluorescence under the epifluorescence microscope in microphotograph the hues of green also comes.

42) The dye when seen orange fluorescence color under the epifluorescence microscope in microphotograph the hues of red also come.

43) The cytogenetic slides seen under all fluorescence gives a counterstain effect of cells with the background where no specimen but only dye is present.

44) The dye can be used in fluorescent colors in variety of paints, inks, and textiles.

45) The dye can be used in compositions of fluorescent dye for bleaching and brightening polymer.

46) The dye can be used in leak detection with a full spectrum fluorescent dye.

47) It can also be used in automated chemical metering system. It can also be used to mark the location of crashed aircraft, life crafts, and equipment for example rockets. Further it can be used in under sea probes.

48) The nontoxic and cell permeant nature of the dye can be used as a component of the non-radioactive labeling and detection kits of biochemistry, cell biology, mmunochemistry, and molecular biology for labeling of DNA, RNA, Proteins and enzymes., Immunofluorescent detections, Counterstain of DIG-labeled oliogonucleotide probes and Anti-DIG Fab-fragments, Single and multiple cell quantitative fluorescence in Flowcytometry., Fluorochrome stains for epifluorescence microscopy.

49) The dye can be used for a quick check of biocontamination in the health food industry, cosmetic industry, pharmaceutical and chemical industries, for rapid estimations of biocontaminants in laboratory cultures, for a rapid check of biopollutants under field conditions.

50) The dye can be used in compositions where a nontoxic dye is required.

51) The dye is environmentally friendly. It does not kill estuarine/marine animal larvae.

52) The dye can be used natural colorant. A bioactive composition of the marine dye in the ratio of 1:40000 to 1:400000 to obtain fluorescence of six colors at three different wavelengths and a phase contrast effect under transmitted light.

53) The dye being non-polar can easily be attached to variety of biomolecules.

54) It fits in the criterion of a good dye demand of the industry as it shows the different parts of the cell at one emission and at different emissions.

References cited (Referenced By)

Bandaranayake, W. M. and Des Rocher, A 1999 (Marine biology 133;163–169)

Bitplane products at (http://www.bitplane.ch/public/support/standard/fluorochrome.htm)

Boehringer Mannheim GmbH, Biochemica, Catalogue, printed in Germany, Chapter II. Non-radioactive In Situ Hybridization Application Manual. 1992)

Chalfie M "Green fluorescent protein" in 1: Photochem Photobiol October 62 (4): 651–656 (1995)

Chalfie et al. SCIENCE 263 (1994) 802–805. Proteins with other wavelengths in the range of red and yellow are produced by induced mutations in some aminoacids.

Debra K. Hobson and David S. Wales. "Green dyes", Journal of the Society of Dyers and Colourists (JSDC), 114, 42–44, (1998).

Fradkov A F, Chen Y, Ding L, Barsova E V, Matz M V, Lukyanov S A "Novel fluorescent protein from Discosoma coral and its mutants possesses a unique far-red fluorescence. In 1:FEBS Lett August 18: 479 (3): 127–30. (2000).

George L. Clark, "Pigments" in Encyclopaedia of chemistry, $2^{nd}$ ed. Pages 833–835,1966.

Gurskaya N G, Fradkov A F, Terskikh A, Matz M V, Labas Y A, Martynov V I, Yanushevich Y G, Lukyanov K A, Lukyanov S A "GFP-like chromoproteins as a source of far-red fluorescent proteins" in 1: FEBS Lett October 19; 507 (1): 16–20 (2001).

Haughland R. P. Molecular probes. The Handbook of Fluorescent probes and Research Chemicals by Richard P. Haughland, $6^{th}$ edition Printed in the United States of America, 1996.

R. Norman Jones in The encycopaedia of chemistry, $2^{nd}$ edition,1966, Quote from pages 435–436

Wachter R M, Elsliger M A, Kallio K, Hanson G T, Remington S J. In 1: Structure Oct. 15, 1998; 6(10): 1267–77 described "Structural basis of spectral shifts in the yellow-emission variants of green fluorescent protein".

Youvan D C, Michel-Beyerie M E "Structure and fluorescence mechanism of GFP in National Biotechnology October 1996 14 (10): 1219–20.

George L. Clark, "Fluorescence" in Encyclopaedia of chemistry, $2^{nd}$ ed. Page 435–436, 1966.

Kowalzick L; Ott A; Waldmann T; Suckow M; Ponnighaus J, M. Vogtlandklinikum Plauen (Elsevier Science B.V2000).

Matz M V, Fradkov A F, Labas Y A, Savitsky A P, Zaraisky A G, Markelov M L, Lukyanov S A. "Fluorescent proteins from nonbioluminescent Anthozoa species ",1: Nat Biotechnolo December 1999: 17(10): 969–73.

Sepcic K, Turk T, Macek P "A fluorescent zoanthid pigment, parazoanthoxanthin A." Toxicon, 36 (6): 937–940,1998.

Olympus Optical Co. Ltd, Tokyo Japan. Catalogue. "Instructions BX-FLA Reflected Light Fluorescence attachment" Page 16. 1999.

Shimomura, O, Johnson, F. H. and Saiga, Y "A novel reporter gene" Journal of cellular and comparative physiology, 59, 223–239, 1962.

Stainfile-Dyes A has given a Dye index of 264 dyes. Out of which 258 are synthetic and only six are natural dyes (http://members.pgonline.com/~bryand/dyes/dyes.htm).

Wüerthner A. K. http://www.uniulm.de/uni/fak/natwis/oc2/ak wuert/publications.htm (referred from the internet).

Sigma-Aldrich "Biochemicals and reagents for life sciences research, 2000–2001 in their section immunochemicals of the catalogue under labeling reagents and cell linker labeling kits pp. 1454–1456. (web site www.sigma-aldrich.com)

U.S. Patents Documents

| | | |
|---|---|---|
| 4,063,878 | Dec. 20, 1977 | Weeks, B. W. |
| 4,452,822 | Jun. 5, 1984 | Shrikhande, Anil J |
| 4,774,339 | Sep. 27, 1988 | Haughland, R. P et al. |
| 4,762,701 | Aug. 9, 1988 | Horan et al. |
| 4,783,401 | Nov. 8, 1988 | Horan et al. |
| 4,859,584 | Aug. 22, 1989 | Horan et al. |
| 5,248,782 | Sep. 28, 1993 | Haughland, R. P at al. |
| 5,187,288 | Feb. 16, 1993 | Kang, H. C. at al. |
| 5,274,113 | Dec. 28, 1993 | Kang, H. C et al |
| 5,321,268 | Jun. 14, 1994 | Crosby David A and Ekstrom Philip A |
| 5,304,493 | Apr. 19, 1994 | Nowak, A. V. |
| 5,405,416 | Apr. 11, 1995 | Swinton; Robert J, |
| 5,433,896 | Jul. 18, 1995 | Kang, H. C. |
| 5,451,663 | Sep. 19, 1995 | Kang, H. C |
| 5,770,205 | Jun. 23, 1998 | Collin, P. D |
| 5,710,197 | Jan. 20, 1998 | Fischer et al. |
| 5,876,762 | Mar. 2, 1999 | Collin, P. D |
| 5,985,330 | Nov. 16, 1999 | Collin, P. D |
| 5.858,761 | Jan. 12, 1999 | Tsubokura, et al. |
| 5,902,749 | May 11, 1999 | Lichtwardt et al. |
| 5,908,650 | Jun. 1, 1999 | Lenoble, et al |
| 5,920,429 | Jul., 6 1999 | Burns et al. |
| 5,935,808 | Aug. 10, 1999 | Hirschberg, et al |
| 5,989,135 | Nov. 23, 1999 | Welch; David Emanuel |
| 6,055,936 | May 2, 2000 | Collin; Peter Donald |
| 6,056,162 | May 2, 2000 | Leighley; Kenneth C. |
| 6,103,006 | Aug. 15, 2000 | DiPietro; Thomas C. |
| 6,110,566 | Aug. 29, 2000 | White et al. |
| 6,140,041 | Oct. 31, 2000 | LaClair; James J. |
| 6,165,384 | Dec. 26, 2000 | Cooper et al. |
| 6,180,154 | Jan. 30, 2001 | Wrolstad et al. |

International patents:

| | | |
|---|---|---|
| EP0206718 | Dec. 30, 1986 | Cramer Randall J |
| IE901379 | Jan. 30, 1991 | Lee Linda G; Mize Patrick D |
| WO9010044 | Jul. 7, 1990. | Swinton; Robert J |
| DE 4416476 | Nov. 16, 1995 | S. Beckmann et al. |
| WO 30679 | Nov. 16, 1995 | S. Beckmann et al. |
| DE 19611351 | Mar. 22, 1996 | K-H. Etzbach et al. |
| AU704112 | Oct. 7, 1997 | Burns David M; Pavelka Lee A |
| WO 35926 | Oct. 2, 1997 | K.-H. Etzbach et al. |
| DE 19648564 A1 | May 28, 1998 | C. Grund et al. |
| DE 19650958 A1 | Jun. 10, 1998 | C. Grund et al. |
| WO 98/23688 | Jun. 4, 1998 | C. Grund et al. |
| DE 19643097 A1 | Apr. 23, 1998 | F. Würthner et al., |
| DE 19711445 A1 | Sep. 24, 1998 | F. Würthner et al., |
| WO 41583 | Sep. 24, 1998 | F. Würthner et al., |
| DE19755642 | Jun. 24, 1999 | Weimer Thomas DR. |
| WO9938919 | Sep. 28, 1999 | Laclair James J |
| WO0058406 | Oct. 5, 2000. | Rosenblum Barnett B et al. |
| WO9938916 | Aug. 15, 2000 | DiPietro; Thomas C |
| WO9920688 | Aug. 29, 2000 | Pavelka Lee et al. |
| WO9920688 | Aug. 29, 2000 | White et al. |

TABLE 1

The Emissions of the different colored fluorescence of the fluorescent dye when excited with different wavelength fluorescent filter cubes of the Olympus epifluorescence microscope with dye solution and when attached to cell membranes of the prokaryotic cells.

| Name of the fluorescent cube as given in the catalogue of Olympus Optical Co. Ltd. | Excitation range of the fluorescent cube | Emission range of dye solution | Emission range of dye when attached to Cell membranes | Emitted Color of dye | Emitted Color of the dye when attached to Cell membranes |
|---|---|---|---|---|---|
| M WU | 330–385 nm | 450 nm–470 | 470 nm–500 | Blue | Blue |
| M WB | 450–480 nm | 510 nm–570 nm | 570–610 nm | Green | Yellow |
| MWG | 510–550 nm | 610 nm–650 nm | 610 nm–650 nm | Orangish Red | Orangish red |
| Bright field | Transmitted light | White light | White light | Yellowish gray | Shades of yellowish dark gray |

TABLE 2

The Emissions of the different colored fluorescence of the fluorescent dye when excited with different wavelength fluorescent filter cubes of the Olympus epifluorescence microscope with dye solution and when attached to cell membranes of the eukaryotic cells.

| Name of the Fluorescent cube as given in the catalogue of Olympus Optical Co. Ltd. | Excitation range of the fluorescent cube | Emission range of dye solution | Emission range of dye when attached to Cell membranes | Emitted Color of dye | Emitted Color of the dye when attached to Cell membranes |
|---|---|---|---|---|---|
| M WU | 330–385 nm | 450 nm–470 | 470 nm–500 | Blue | Blue |
| M WB | 450–480 nm | 510 nm–570 nm | 570–610 nm | Green | Yellow |
| MWG | 510–550 nm | 610 nm–650 nm | 610 nm–650 nm | Orangish red | Orangish red |
| Bright field | Transmitted light | White light | White light | Yellowish gray | Shades of yellowish dark gray |

TABLE 3

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| Name of Animal/species | Sea cucumber *Holothuria scabra* (see example 1) | Sea cucumber *Holothuria scabra* (see example 1) | Sea cucumber *Holothuria scabra* (see example 1) |
| Bioactive extract | Pigment which is a fluorescent dye is extracted from skin of the animal with 50% alcohol (see example 2–5) | Pigment, which is a fluorescent dye, is extracted from Live female gonads (ovarian tissue) of the animal with 70% alcohol and purified by filtration. (see example 2) | Pigment, which is a fluorescent dye, is extracted from alcoholic extract of ovaries by heating it and then dissolving in the solvent either and purified by filtration. (see example 2) |
| Chemical nature | Non proteinaceous (see example 7) | Proteinaceous (see example 6, 8, 13) | Non proteinaceous and is non-polar. (see example 2, 4, 8, 11) |
| Drug properties | In compositions of drugs of insecticidal, pesticidal, veterinary medicines and cosmetics for sunscreens. (see examples 19–23) | Nontoxic to animal cells and bacteria. During bioassays the oyster sperms and bacteria remained alive in the sets treated with different concentrations. The dye can be useful in drug delivery studies for in situ applications (see examples 17, 18) | Nontoxic to animal cells and bacteria. During bioassays the oyster sperms and bacteria remained alive in the sets treated with different concentrations. The dye can be useful in drug delivery studies for in situ applications (see examples 13, 14) |
| Cell membrane permeability | Stains and fluoresce live, dead, refrigerated and fixed tissues. Dye is cell membrane permeant It is permeable to the nuclear membrane. It also stains chromatin. (see examples 21) | Stains and fluoresce live, and fixed cells. Do not stain dead animal and bacterial cells. Dye is cell membrane permeant It is permeable to the nuclear membrane. It also stains chromatin. (see examples 24) | Stains and fluoresce live, and fixed cells. Do not stain dead animal and bacterial cells. Dye is cell membrane permeant It is permeable to the nuclear membrane. It also stains chromatin. (see example 15) |
| Agglutination induction | Do not induce agglutination | Induces agglutination in oyster sperms, eggs and bacterial cells but do not kill them. (see examples 14, 15) | Neither induces agglutination in cells nor kill them (See Examples 9, 10) |
| Effect on rate of fertilization of oyster gametes | No effect on cell lines | Enhances rate of fertilization (see examples 16) | No effect |
| Biosurfactant nature | Biosurfactant nature present (see example 9) | Biosurfactant nature absent | Biosurfactant nature absent |
| Live/Dead bacterial contaminations checks | Stains and fluoresce all kind of cells and cellulose (see examples 12–17) | Stains and fluoresce only live and fixed cells. The dead bacteria do not stain and do not fluoresce. (see examples 22) | Stains and fluoresce only live and fixed cells. The dead bacteria do not stain and do not fluoresce. (see examples 14, 16, 18) |
| Live/Dead animal cell sorting in tissue cultures | Stains and fluoresce all kind of cells and cellulose (see examples 12–17) | Stains and fluoresce only live and fixed cells. The dead animal cells do not stain and do not fluoresce. (see examples 24) | Stains and fluoresce only live and fixed cells. The dead animal cells do not stain and do not fluoresce. (see examples 13, 15, 17) |
| Non-radioactive dye | Dye is non-radioactive as it is not a synthetic dye but is natural dye. Useful for in situ non-radioactive kit compositions. | Dye is non-radioactive as it is not a synthetic dye but is natural dye. Dye is non-radioactive as it is not a synthetic dye but is natural dye. | Dye is non-radioactive as it is not a synthetic dye but is natural dye. Dye is non-radioactive as it is not a synthetic dye but is natural dye. |
| Photobleaching/ Photostability | i. Do not photobleach while screening slides. ii. Photostable at the room temperature over one year iii. the fluorescence of the dye does not change even when frozen at minus 20° C., a temperature at which the molecules are unable to attain the energy necessary for activation like in extracts from luminescent organisms. (see example 18) | Do not photobleach while screening slides. Photostable at 4 degree centigrade but after staining the cells, it remains non degradable even at the room temperature for several months. The stained slides do not destain and preserve fluorescence. The fluorescence of the dye does not change even when frozen at minus 20° C., a temperature at which the molecules are unable to attain the energy necessary for activation like in extracts from luminescent organisms. (see examples 4, 25) | Do not photobleach while screening slides. Photostable at the room temperature for several months. The stained slides do not destain and preserve fluorescence which enhances with maturity of slides. The fluorescence of the dye does not change even when frozen at minus 20° C., a temperature at which the molecules are unable to attain the energy necessary for activation like in extracts from luminescent organisms. (see example 5) |
| Quantum of fluorescence | Very bright even at dilutions of 1:40000 (see examples 14) | Very bright even at dilutions of 1:400000 and above (see examples 18, 19, 22) | Higher than both the earlier dyes being much more brighter even at dilutions of 1:400000–1:900000 and above. (see examples 15, 16, 19) |
| Antimicrobial/ insecticidal/ | Antimicrobial/insecticidal/ Pesticidal activities present. | Antimicrobial/insecticidal/ Pesticidal activities absent. | Antimicrobial/insecticidal/ Pesticidal activities absent. |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| Pesticidal bioactivities Emission ranges of dyes when excited with cubes of fluorescent olympus BX-60 microscope of Olympus Co. Ltd Japan having different excitation wavelength ranges: WU range 330– 385 nm WB range 450– 480 WG range 510– 550 nm Bright field | (see examples 10) 1. Dye emits three different colored emissions 2. Fluorescence blue color emission occur in the 380 nm–400 nm range of UVA when excited under ultra violet cube WU - 330 nm–385 nm excitation range, 3. Fluorescence yellow color emission occurs in the 500 nm–570 nm range when excited under WB cube of 450 nm– 480 nm excitation range, 4. fluorescence orange color emission occurs in the 570 nm–650 nm range when excited under WG cube of 510 nm– 550 nm excitation range, 5. Phase contrast effect under bright field (see examples 14–17) | (see examples 17, 18) 1. dye emits six different colored fluorescence at 3 different wavelengths of the UV and visible ranges of the fluorescent cubes of an epifluorence microscope, 2. dye emits three different colored fluorescence at 3 different wavelengths of the UV and visible ranges of the fluorescent cubes of an epifluorescence microscope when attached to the cell membranes. These three emission ranges are different from that of the dye alone. 3. Fluorescence blue color Emission occur in the 450 nm–470 nm range when dye in solution is excited under ultra violet cube WU - 330 nm–385 nm excitation range, 4. fluorescence green color emission occurs in the 510 nm–570 nm range when dye in solution is excited under WB cube of 450 nm–480 nm excitation range, 5. fluorescence orange color emission occurs in the 610 nm–650 nm range when dye solution is excited under WG cube of 510 nm–550 nm excitation range, 6. the dye emits hues of yellowish grays under the ordinary transmitted light bulb of the epifluorescence microscope when seen under 100X objective, 7. fluorescence blue color emission occur in the 470 nm–500 nm range when dye attached to the cell membranes is excited under ultra violet cube WU - 330 nm–385 nm excitation range, 8. fluorescence green color emission occurs in the 570 nm–610 nm range when dye attached to the cell membranes is excited under WB cube of 450 nm–480 nm excitation range, 9. fluorescence orange color emission occurs in the 610 nm–650 nm range when dye attached to the cell membranes is excited under WG cube of 510 nm–550 nm excitation range, 10. the dye on cell membranes attached | (see examples 13, 14) 1. dye emits six different colored fluorescence at 3 different wavelengths of the UV and visible ranges of the fluorescent cubes of an epifluorescence microscope, 2. dye emits three different colored fluorescence at 3 different wavelengths of the UV and visible ranges of the fluorescent cubes of an epifluorescence microscope when attached to the cell membranes. These three emission ranges are different from that of the dye alone. 3. fluorescence blue color emission occur in the 450 nm–470 nm range when dye in solution is excited under ultra violet cube WU - 330 nm–385 nm excitation range, 4. fluorescence green color emission occurs in the 510 nm–570 nm range when dye in solution is excited under WB cube of 450 nm–480 nm excitation range, 5. fluorescence orange color emission occurs in the 610 nm–650 nm range when dye solution is excited under WG cube of 510 nm–550 nm excitation range, 6. the dye emits hues of yellowish grays under the ordinary transmitted light bulb of the epifluorescence microscope when seen under 100X objective, 7. fluorescence blue color emission occur in the 470 nm–500 nm range when dye attached to the cell membranes is excited under ultra violet cube WU - 330 nm–385 nm excitation range, 8. fluorescence green color emission occurs in the 570 nm–610 nm range when dye attached to the cell membranes is excited under WB cubes of 450 nm–480 nm excitation range, 9. ix. Fluorescence orange color emission occurs in the 610 nm–650 nm range when dye attached to the cell membranes is excited under WB cube of 510 nm–550 nm excitation range, 10. the dye on cell membranes attached |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | | emits hues of yellowish grays under the ordinary transmitted light bulb of the epifluorescence microscope when seen under 100X objective (see examples 19–23) | emits hues of yellowish grays under the ordinary transmitted light bulb of the epifluorescence microsope when seen under 100X objective (see examples 19–22) |
| Other chemical and physical Characteristics of the dye | 1. decolorization by a reducing agent,<br>2. not a synthetic compound,<br>3. crude extract of the dye is yellowish green in color,<br>4. purified dye being reddish brown colored powder when seen with the naked eye in the daylight,<br>5. Under tube light some hues of green are emitted,<br>6. amorphous in nature,<br>7. soluble in water,<br>8. insoluble in the organic solvents like ethanol, methanol and acetone,<br>9. is negatively charged,<br>10. has a pH of 6.5,<br>11. Presence of a phenolic group<br>12. absence of a quinoid ring,<br>13. absence of a aromatic amine group<br>14. reducing sugar is absent,<br>15. pigment cum dye is a fluorescent dye and emits fluorescence when excited with different wavelengths of UV and visible spectral ranges on a spectrophotometer,<br>16. UV, visible spectroscopy from 300 nm–700 nm and the peaks are marked at 379 nm and 439 nm wavelengths,<br>17. UV, visible spectroscopy from 250 nm–350 nm and the peaks are at 272 nm and 299 nm wavelengths,<br>18. Fluorescent spectroscopy in the UV and visible spectra, when excited with UV 270 nm wavelength the fluorescence is emitted in the 324 nm–380 nm range which comes under the UVA wavelength range of ultraviolet rays of the sunlight,<br>19. with excitation wavelength 450 nm in Fluorescent spectroscopy the fluorescence emission occurred at 500 nm–580 nm with maximum intensity,<br>20. with excitation wavelength 540 nm in Fluorescent spectroscopy, the 500 nm–620 nm with maximum intensity,<br>21. with excitation wavelength 555 nm in Fluorescent spectroscopy, the fluorescence emission occurred at 575 nm–620 nm with maximum intensity,<br>22. physical checking of Whatman Filter | 1. is a non-reducible dye<br>2. not a synthetic compound,<br>3. crude extract of the dye is yelowish orange in color,<br>4. partially purified dye being light yellowish orange in color when seen with the naked eye in the daylight,<br>5. under tube light hues of multicolors are emitted,<br>6. cannot be made into powder<br>7. is in a solution form<br>8. soluble in 70% ethyl alcohol, dilutions can be made in water/seawater.<br>9. is negatively charged,<br>10. has a pH of 6.8–7.5,<br>11. absence of a reducible group<br>12. proteinaceous in nature,<br>13. The solvent front of TLC is 12.1 cm, four spots present.<br>14. Compound 1 spot has distance migrated of 11.1 cm. Its Rf value is 0.917.<br>15. Compound 2 spot has distance migrated of 9.9 cm. Its Rf value is 0.818.<br>16. Compound 3 spot has distance migrated of 8.0 cm. Its Rf value is 0.661.<br>17. Compound 4 spot has distance migrated of 5.6 cm. Its Rf value is 0.463<br>18. It has carbohydrate<br>19. It has protein<br>20. At least one of the proteins is a glycoprotein<br>21. UV, visible spectroscopy the wavelength of excitation was maximum at 351 nm, 580 nm, 720 nm.<br>22. the fluorescence emission spectrometric analysis was in between 400 to 600 nm when excited at 351 nm.<br>23. The emission maxima were two peaks at 450 nm and 550 nm.<br>(see examples 1–25) | 1. No decolorization by a reducing agent,<br>2. not a synthetic compound,<br>3. crude extract of the dye is orange in color,<br>4. The dye is in the solution form<br>5. The dye is extracted from alcoholic extract of the female gonads.<br>6. The alcoholic extract is heated and dried at 80 degrees centigrade.<br>7. The dried mass is dissolved in solvent ether<br>8. The dissolved dye pigment extract is filtered through whattman filer No. 1.<br>9. The partially purified dye is also orange in color.<br>10. under tube light it emits variety of colors of the visible light spectrum at different angles.<br>11. the colored pigment of the dye is insoluble in water and alcohol.<br>12. Tthe partially purified dye pigment is soluble in solvent ether.<br>13. The further dilutions of the dye in experiments with animal and bacterial cells in water and seawater can be made by dissolving the ether extract of the dye in different desired concentrations and creating tribulations artificially.<br>14. The dye comes in contact with the cells and immediately permeates through the membranes and stain them.<br>15. the dye has a pH of 7.0.<br>16. there is absence of a reducible group.<br>(see example 1–22) |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | no. 1 dipped with dye concentration 1:40000 dilution under UV transilluminator and Gel Documentation system with UV bulbs of 260 nm–280 nm range emit bluish green hue color of fluorescence. (see examples 1–23) | | |
| Advantages over presently marketed dyes and common to all the three yes | 1. dye is natural and not synthetic so steps of harsh treatments with acids and alkalies which are harmful to the environment are not required. (see examples 1, 2)<br>2. The dye fits in the criterion of a good dye according to which differentiation of various part of the cell can be done under the same excitation range. (see example 21)<br>3. The dye is nonradiactive as it is a dye from a natural source and not synthetic. (see examples 1, 2)<br>4. the dye has antibacterial quality (see example 10)<br>5. it has insecticidal qualities (see example 19)<br>6. the dye has pesticidal qualities. it kills dog fleas and ticks (see example 23)<br>7. the dye is useful in drug industry for making veterinary and insecticidal compositions.<br>8. the dye is useful in medical applications where X-ray defraction based studies are needed. It can be a visual reality without even exposing them on the the X-ray films.<br>9. This dye in its single form is equivalent to three different synthetic fluorochromes giving same colored emission of fluorescent colors. (see example 14–17)<br>10. The dye can be used as a quick microscopic stain giving a phase contrast effect without any extra expenses on phase contrast accessory of a microscope and without any lengthy protocols of fixations and preservations of specimens. Especially on the spot quality check of live samples. (see example 21)<br>11. Being non-degradable in quality of fluorescence for longer durations, it does not require refrigeration while exporting. The presently marketed fluorescent dyes exported under refrigeration equivalent to −20 degree centigrade. (see example 18)<br>12. Unlike the earlier known Green | 1. dye is natural and not synthetic so steps of harsh treatments with acids and alkalies which are harmful to the environment are not required. (see examples 1, 2)<br>2. The dye fits in the criterion of a good dye according to which differentiation of various part of the cell can be done under the same excitation range. (see example 24)<br>3. The dye is nonradiactive as it is a dye from a natural source and not synthetic. (see example 1, 2)<br>4. the dye is useful in drug industry making kits for checking bacterial contaminations. (see example 17, 18)<br>5. the dye is useful in medical applications where fluorescence based in situ follow up of drugs or molecules need to be seen since the dye is cell membrane permeant and nontoxic to cells. (see example 24)<br>6. This dye in its single form is equivalent to six different synthetic fluorochromes giving same colored emission of fluorescent colors. While earlier fluorochromes needs to be used in mixed combinations this dye is a single dye showing those effects. (see example 19–23)<br>7. The dye can be used as a quick microscopic stain giving a phase contrast effect without any extra expenses on phase contrast accessory of a microscope and without any lengthy protocols of fixations and preservations of specimens.Especially on the spot quality check of live samples. (see example 19–23)<br>8. Being non degradable in quality of fluorescence for longer durations, it does not require refrigeration while exporting. The presently marketed fluorescent dyes exported under refrigeration equivalent to −20 degree centigrade. (see example 4, 25)<br>9. Unlike the earlier known Green Fluorescent protein (GFP) from a | 1. dye is natural and not synthetic so steps of harsh treatments with acids and alkalies which are harmful to the environment are not required. (see examples 1, 2)<br>2. The dye fits in the criterion of a good dye according to which differentiation of various part of the cell can be done under the same excitation range. (see example 15)<br>3. The dye is nonradiactive as it is a dye from a natural source and synthetic. (see examples 1, 2)<br>4. the dye is useful in drug industry for making kits for checking bacterial contaminations. (see example 13, 14)<br>5. the dye is useful in medical applications where fluorescence based in situ follow up of drugs or molecules need to be seen since the dye is cell membrane permeant and nontoxic to cells. (see example 15)<br>6. This dye in its single form is equivalent to six different synthetic fluorochromes giving same colored emission of fluorescent colors. While earlier fluorochromes needs to be used in mixed combinations this dye is a single dye showing those effects. (see example 19–22)<br>7. The dye can be used as a quick microscopic stain giving a phase contrast effect without any extra expenses on phase contrast accessory of a microscope and without any lengthy protocols of fixations and preservations of specimens. Especially on the spot quality check of live samples. (see example 19–22)<br>8. Being non degradable in quality of fluorescense for longer durations, it does not require refrigeration while exporting. The presently marketed fluorescent dyes exported under refrigeration equivalent to −20 degree centigrade. (see example 6)<br>9. Unlike the earlier known Green Fluorescent protein (GFP) from a marine jellyfish, the present dye is not a protein. |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No.____ | Fluorescent Dye - (CSIR NF 151-2002) Present Application U.S. patent Ser. No.____ |
|---|---|---|---|
| | Fluorescent protein ( GFP) from a marine jelly fish, our dye is not a protein and a reporter gene. The results are direct. GFP absorbs blue light at 395 nm and with a minor peak at 470 nm emits green light. Our dye emits 3 fluorescent colors and at three different fluorescent wavelengths. (see example 7) | marine jelly fish, our dye is though also is a protein but is not a reporter gene. The results are direct and 6 colored emissions occurs at three excitation wavelengths. (see example 6, 8, 13) | The results are direct and 6 colored emissions occurs at three excitation wavelengths. (see example 2, 4, 8, 13) |
| | 13. The dye is soluble in water so can be used in components where water-soluble dyes are needed. The dye is insoluble in the organic solvents like ethanol, methanol and acetone. (see example 2) | 10. The dye is soluble in 70% alcohol (see example 2) 11. The dye is negatively charged protein dye (see example 6, 8, 13) 12. The dye has a pH of 6.8–7.5 which is almost neutral and hence will not effect final properties of pH drastically in compositions. (see example 6) | 10. the dye is soluble in solvent ether and is insoluble in water and alcohol. This gives its utility in specific dyes where non-polar dyes are needed. (see example 2) 11. The dye non-polar and has no charge. (see example 2, 4, 8, 13) 12. The dye has a pH of 7.0 and hence will not effect final properties of pH in compositions. (see example 6) |
| | 14. The dye is negatively charged (see example 8) 15. The dye has a pH of 6.5 which is almost neutral and hence will not effect final Properties of pH drastically in compositions. (see example 24) | 13. The dye is proteinaceous in nature and stable at 4 degree centigrade but once it stains the cell membranes the fluorescence of cells is nondegradable for several months. (see example 4, 25) 14. The dye emitted these fluorescence colors even at a dilution range of 1:400000 times and above The fluorescence of the extract persisted even after several months at the room temperature. These multicolored emissions of the dye at different wavelengths of excitations are comparable to the fluorochrome microscopic stains already in the market. (see example 18, 19, 22) | 13. The dye is non-proteinaceous in nature so non-degradable under natural conditions. (see example 5) 14. The dye emmitted these fluorescence colors even at a dilution range of 1:450000 times to 1:900000 times and above The fluorescence of the extract persisted even after at least 1 year at the room temperature. These multicolored emissions of the dye at different wavelengths of excitations are Comparable to the fluorochrome micorscopic stains already in the market. (see example 19–23) |
| | 16. The dye is non-proteinaceous in nature so non degradable under natural conditions. (see example 18) 17. The dye has nature of a biosurfactant so can be used in soaps and toiletry compositions. (see example 9) 18. The dye has antimicrobial qualities (see example 10) 19. The dye emitted these fluorescence colors even at a dilution range of 1:40000 times (i.e. 1 gm powder of dye dissolved in 40 liters of ultrapure water). The fluorescence of the extract persisted even after at least 1 year at the room temperature. These multicolored emissions of the dye at different wavelengths of excitations are comparable to the fluorochrome microscopic stains already in the market (see example 14). 20. The blue colored fluorescence of the present dye is comparable to the emission of same color by DAPI fluorochrome at the same wavelength excitation, used as components of the non-radioactive labeling kits of biochemistry, cell biology, Immunochemistry, and molecular biology. (see example 14–17) 21. The blue colored fluorescence of the | 15. The blue colored fluorescence of the present dye is comparable to the emission of same color by DAPI fluorochrome at the same wavelength excitation, used as components of the non-radioactive labeling kits of biochemistry, cell biology, immunochemistry, and molecular biology. (see example 19–23) 16. The blue colored fluorescence of the present dye is also comparable to the emission of color by Hoechest 33258 used as components of the non-radioactive labeling and detection kits of biochemistry, cell biology, immunochemistry, and molecular biology. (see example 19–23) 17. The blue colored fluorescence of the present dye is also comparable to the | 15. The blue colored fluorescence of the present dye is comparable to the emission of same color by DAPI fluorochrome at the same wavelength excitation, used as components of the non-radioactive labeling kits of biochemistry, cell biology, immunochemistry, and molecurlar biology. (See example 19–22). 16. The blue colored fluorescence of the present dye is also comparable to the emission of color by Hoechest 33258 used as components of the non-radioactive labeling and detection kits of biochemistry, cell biology, immunochemistry, and molecular biology. (see example 19–22). 17. The blue colored fluorescence of the present dye is also comparable to the emission of color by Hoechest 33342 fluorochrome at the same wavelength excitation used as the same wavelength |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | present dye is also comparable to the emission of color by Hoechest 33258 used as components of the non-radioactive labeling and detection kits of biochemistry, cell biology, immunochemistry, and molecular biology. (see example 14–17) | emission of color by Hoechest 33342 fluorochrome at the same wavelength excitation used as components of the non-radioactive labeling and detection kits of biochemistry, cell biology, immunochemistry, and molecular biology. (see example 19–23) | non-radioactive labeling and detection kits of biochemistry, cell biology, immunochemistry, and molecular biology, (see example 19–22). 18. The yellow colored fluorescence of the said dye in the visible range is comparable to the same colored emissions of Acridine orange used as components of the non-radioactive labeling and detection kits of biochemistry, cell biology, immunochemistry, and molecular biology, (see example 19–22). 19. The yellow colored fluorescence of the said dye in the visible range is comparable to the same colored emissions of auramine used as components of the non-radioactive labeling and detection kits of biochemistry, cell biology, immunochemistry, and molecular biology. (see example 19–22). 20. The yellow colored fluorescence of the said dye in the visible range is comparable to the same colored emissions of FITC used as components of the non-radioactive labeling and detection kits of biochemistry, cell biology., immunochemistry, and molecular biology. (see example 19–22). 21. The orange colored fluorescent emission is comparable to the orange fluorescence Color of Propidium Iodide fluorochrome used as components of the non-radioactive labeling and detection kits of biochemistry, cell biology, immunochemistry, and molecular biology. (see example 19–22). 22. The orange colored fluorescent emission is comparable to the orange fluorescence Color of Rhodamine non-radioactive Labeling and detection kits of biochemistry, cell biology, immunochemistry, and molecular biology. (see example 19–22). 23. The orange colored fluorescent emission is comparable to the ornage fluorescence color of TRITC fluorochrome used as components of the non-radioactive labeling and detection kits of biochemistry, cell boilogy, immunochemistry, and molecular biology.. (see example 19–22). 24. Unlike the synthetic commercial dyes used for the same purposes, the present |
| | 22. The blue colored fluorescence of the present dye is also comparable to the emission of color by Hoechest 33342 fluorochrome at the same wavelength excitation used as components of the non-radioactive labeling and detection kits of biochemistry, cell biology, immunochemistry, and molecular biology.(see example 14–17) | 18. The yellow colored fluorescence of the said dye in the visible range is comparable to the same colored emissions of Acridine orange used as components of the non-radioactive labeling and detection kits of biochemistry, cell biology, immunochemistry, and molecular biology. (see example 19–23 | |
| | 23. The yellow colored fluorescence of the said dye in the visible range is comparable to the same colored emissions of Acridine orange used as components of the Non-radioactive labeling and detection kits of biochemistry, cell biology, Immunochemistry, and molecular biology.. (see example 14–17) | 19. The yellow colored fluorescence of the said dye in the visible range is comparable to the same colored emissions of auramine used as components of the non-radioactive labeling and detection kits of biochemistry, cell biology, immunochemistry, and molecular biology. (see example 19–23) | |
| | 24. The yellow colored fluorescence of the said dye in the visible range is comparable to the same colored emissions of auramine used as components of the non-radioactive labeling and detection kits of biochemistry, cell biology, immunochemistry, and molecular biology.. (see example 14–17) | 20. The yellow colored fluorescence of the said dye in the visible range is comparable to the same colored emissions of FITC used as components of the non-radioactive labeling and detection kits of biochemistry, cell biology, immunochemistry, and molecular biology. (see example 19–23) | |
| | 25. The yellow colored fluorescence of the said dye in the visible range is comparable To the same colored emissions of FITC used as components of the non-radioactive Labeling and detection kits of biochemistry, cell biology, immunochemistry, and Molecular biology.. (see examples 14–17) | 21. The orange colored fluorescent emission is comparable to the orange fluorescence color of Propidium Iodide fluorochrome used as components of the non-radioactive labeling and detection kits of biochemistry, cell biology immunochemistry, and molecular biology. (see example 19–23) | |
| | 26. The orange colored fluorescent emission is comparable to the orange fluorescence color of Propidium Iodide fluorochrome used as components of the non-radioactive labeling and detection kits of biochemistry, cell biology, immunochemistry, and molecular biology.. (see example 14–17) | 22. The orange colored fluorescent emission is comparable to the orange fluorescence color of Rhodamine fluorochrome used as components of the non-radioactive labeling and detection kits of biochemistry, cell biology, immunochemistry, and molecular biology. (see example 19–23) 23. The orange colored fluorescent emission is comparable to the orange fluorescence color of TRITC fluorochrome used as components of the non-radioactive labeling and detection kits of biochemistry, cell biology, | |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | 27. The orange colored fluorescent emission is comparable to the orange fluorescence color of Rhodamine fluorochrome used as components of the non-radioactive labeling and detection kits of biochemistry, cell biology, immunochemistry, and molecular biology.. (see example 14–17) | immunochemistry, and molecular biology. (see example 19–23) 24. Unlike the synthetic commercial dyes used for the same purposes, the present dye is stable at the room temperature and has a long shelf life. Molecular non-radioactive kits of the said dye can be exported at the room temperatures. (see example 19–23) | dye is stable at the room temperature and has a long shelf life. Molecular non-radioactive kits of the said dye can be exported at the room temperatures.. (see example 19–22). |
| | 28. The orange colored fluorescent emission is comparable to the orange fluorescence color of TRITC fluorochrome used as components of the non-radioactive labeling and detection kits of biochemistry, cell biology, immunochemistry, and molecular biology.. (see example 14–17) | 25. The said single dye has characteristics of at least one hundred and twenty three different fluorochromes (DAPI, Hoechest 33258, Hoechest 33342, FITC, acridine orange, auramine, Rhodamine, TRITC, and propidium iodide etc.) now in the market. (see example 19–23) | 25. The said single dye has characteristics of at least one hundred and twenty three different fluorochromes (DAPI, Hoechest 33258, Hoechest 33342, FITC, acridine orange, auramine, Rhodamine, TRITC, and propidium iodide etc.) now in the market. (see example 19–22). |
| | 29. Unlike the synthetic commercial dyes used for the same purposes, the present dye is stable at the room temperature and has a long shelf life. Molecular non-radioactive kits of the said dye can be exported at the room temperatures.. (see example 18). | 26. under ordinary light of microscope hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence. (see example 19–23) | 26. Under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.. (see example 19–22). |
| | 30. The said single dye has characteristics of at least one hundred and twenty three different fluorochromes (DAPI, Hoechest 33258, Hoechest 33342, FITC, acridine orange, auramine, Rhodamine, TRITC, and propidium iodide etc.) now in the market. | 27. The microphotographs with Kodak film rolls shows hues of the adjacent color emission wavelengths. Like when seen blue color fluorescence under the epifluorescence microscope in microphotograph the hues of green also comes. (see example 19–23) | 27. The microphotograhs with Kodak film rolls show hues of the adjacent color emission wavelengths. Like when seen blue color fluorescence under the epifluorescence microscope in microphotograph the hues of green also comes.. (see example 19–22). |
| | 31. under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence. | 28. The microphotographs with Kodak film rolls shows hues of the adjacent color emission wavelengths. Like when seen yellow color fluorescence under the epifluorescence microscope in microphotograph the hues of red also comes. The dye when seen orange fluorescence color under the epifluorescence microscope in microphotograph the hues of red also comes. (see example 19–23) | 28. The microphotographs with Kodak film rolls shows hues of the adjacent color Emission wavelengths. Like when seen yellow color fluoroscence under the epifluorescence microscope in microphotograph the hues of green also comes. The dye when seen orange fluorescence color under the epifluorescence microscope in Microphotograph the hues of red also comes.. (see example 19–22). |
| | 32. The microphotographs with Kodak film rolls shows hues of the adjacent color emission wavelengths. Like when seen blue color fluorescence under the epifluorescence microscope in microphotograph the hues of green also comes. | 29. The cytogenetic slides seen under all fluorescence gives a counterstain effect of cells with the background where no specimen but only dye is present. (see | 29. The cytogenetic slides seen under all fluorescence gives a counterstain effect of cells with the background where no specimen but only dye is present.. (see example 19–22). |
| | 33. The microphotographs with Kodak film | | 30. The dye can be used for the preparation of polyvinyl chloride film that exhibits fluorescent colors. It also can be used in |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | rolls shows hues of the adjacent color emission wavelengths. Like when seen yellow color fluorescence under the epifluorescence microscope in microphotograph the hues of green also comes. The dye when seen orange fluorescence color under the epifluorescence microscope in microphotograph the hues of red also comes. <br>34. The cytogenetic slides seen under all fluorescence gives a counterstain effect of cells with the background where no specimen but only dye is present. <br>35. The dye can be used for the preparation of polyvinyl chloride film that exhibits fluorescent colors. It also can be used in fluorescent colors in variety of paints, inks, textiles. <br>36. The dye can be used in compositions of fluorescent dye for bleaching and brightening polymer. The dye can be used in leak detection with a full spectrum fluorescent dye. It can also be used in automated chemical metering system. It can also be used to mark the location of crashed aircrafts, life crafts, and equipment for example rockets. Further it can be used in under sea probes. The dye can be used in photo chemotherapy of skin cancers. <br>37. The dye can be used as chromatophore sunscreen component of cosmetics creams and lotions. <br>38. The water miscible quality of the dye can make it easily miscible in moisturizers. It can be used as fluorescent in situ hybridization application kit component for molecular diagnostics. It can also be used as a component of the non-radioactive labeling and detection kits of biochemistry, cell biology, immunochemistry, and molecular biology for labeling of DNA, RNA, Proteins and enzymes, Immunofluorescent detections, Counterstain of DIG-labeled oliogonucleotide probes and Anti-DIG Fab-fragments, | example 19–23) <br>30. The dye can be used for the preparation of polyvinyl chloride film that exhibits fluorescent colors. It also can be used in fluorescent colors in variety of paints, inks, textiles. <br>31. The dye can be used in compositions of fluorescent dye for bleaching and brightening polymer. The dye can be used in leak detection with a full spectrum fluorescent dye. It can also be used in automated chemical metering system. It can also be used to mark the location of crashed aircrafts, life crafts, and equipment for example rockets. Further it can be used in under sea probes. The dye can be used in photo chemotherapy of skin cancers. <br>32. It can be used as fluorescent in situ hybridization application kit component for molecular diagnostics. It can also be used as a component of the non-radioactive labeling and detection kits of biochemistry, cell biology, immunochemistry, and molecular biology for labeling of DNA, RNA, Proteins and enzymes, Immunofluorescent detections, Counterstain of DIG-labeled oliogonucleotide probes and Anti-DIG Fab-fragments, Single and multiple cell quantitative fluorescence in Flowcytometry., Fluorochrome stains for epifluorescence microscopy. <br>33. The dye can be used for a quick check of biocontamination in the health food industry, cosmetic industry, pharmaceutical and chemical industries, for rapid estimations of biocontaminants in laboratory cultures, for a rapid check of biopollutants under field conditions (see example 24) <br>34. The dye can be used natural colorant <br>35. Dye can be used in fertilization rate enhancements in medical, biomedical, agricultural and aquaculture science (see example 14, 15) | fluorescent colors in variety of paints, inks and textiles. <br>31. The dye can be used in compositions of fluorescent dye for bleaching and brightening polymer. The dye can be used in leak detection with a full spectrum fluorescent dye. It can also be used in automated chemical metering system. It can also be used to mark the location of crashed aircrafts, life crafts, and equipment for example rockets. Furthur it can be used in under sea probes. The dye can be used in photo chemotherapy of skin cancers. <br>32. It can be used as fluorescent in situ hybridization application kit component for =molecular diagnostics. It can also be used as a component of the non-radioactive labeling and detection kits of biochemistry, cell biology, immunochemistry, and molecular biology for labeling of DNA, RNA, Proteins and enymes., Immunofluorescent detections, Counterstain of DIG-labeled oliogonucleotide probes and Anti-DIG Fab-fragments, Single and multiple cell quantitative fluorescence in Flowcytometry., Fluorochrome stains for epifluorescence microscopy <br>33. The dye can be used for a quick check of biocontamination in the health food industry, cosmetic industry, pharmaceutical and chemical industries, for rapid estimations of biocontaminants in laboratory cultures, for a rapid check of biopollutants under field conditions <br>34. The dye can be used natural colorant <br>35. The dye being a non-polar fluorochrome, which is separated from the protein part, can be used in formulations of variety of new molecules by attachments.. (see example 2, 4, 8, 13) |

TABLE 3-continued

Table showing various commercially important features of the three natural fluorescent dyes extracted from the sea cucumber Holothuria scabra by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | Single and multiple cell quantitative fluorescence in Flowcytometry., Fluorochrome stains for epifluorescence microscopy.<br>39. The dye can be used for a quick check of biocontamination in the health food industry, cosmetic industry, for rapid estimations of biocontaminants in laboratory cultures, for a rapid check of biopollutants under field conditions. It can also be a competitive inhibitor of cholinesterases.<br>40. The dye can be used in anti microbial compositions.<br>41. The dye can be used as a biosurfactant in toiletry compositions<br>42. The dye can be used natural colorant | | |
| Specific uses of the 3 natural fluorescent dyes described here. | a. preparation of flexible polyvinyl chloride film that exhibits fluorescent colors;<br>b. .use of fluorescent colors in variety of paints, inks, textiles;<br>c. a composition of fluorescent dye for bleaching and brightening polymer;<br>d. leak detection with a full spectrum fluorescent dye;<br>e. use in automated chemical metering system;<br>f. .to mark location of crashed air-crafts, life crafts, and equipment for example rockets;<br>g. under sea probes;<br>h. UVA is used in photo chemotherapy of skin cancers;. (see example 11)<br>i. Chromatophore sunscreen component of cosmetics creams and lotions;<br>j. the water miscible quality of the dye can make it easily miscible in moisturizers;<br>k. fluorescent in situ hybridization application kit component for molecular diagnostics;<br>l. component of the non-radioactive labeling and detection kits of biochemistry, cell biology, immunochemistry, and molecular biology for labeling of DNA, RNA, Proteins and enzymes;<br>m. immunofluorescent detections;<br>n. counterstain of DIG-labeled oligonucleotide probes and Anti-DIG Fab-fragments;<br>o. single and multiple flow cytometry applications;<br>p. fluorochrome stains for epifluorescence microscopy;<br>q. for a quick of biocontamination in the health food industry, cosmetic industry, pharmaceutical and chemical | a. use of fluorescent colors in variety of paints, inks, textiles;<br>b. a composition of fluorescent dye for bleaching and brightening polymer;<br>c. leak detection with a full spectrum fluorescent dye;<br>d. use in automated chemical metering system;<br>e. to mark location of crashed air-crafts, life crafts, and equipment for example rockets;<br>f. under sea probes;<br>g. fluorescent in situ hybridization application kit component for molecular diagnostics;<br>h. component of the non-radioactive labeling and detection kits of biochemistry, cell molecular immunochemistry, and molecular biology for labeling of DNA, RNA, Proteins and enzymes;<br>i. immunofluorescent detections;<br>j. counterstain of DIG-labeled oligonucleotide probes and Anti-DIG Fab-fragments;<br>k. single and multiple flow cytometry applications;<br>l. fluorochrome stains for epifluorescence microscopy;. (see example 19–23).<br>m. for a quick check of biocontamination in the health food industry, cosmetic industry, pharmaceutical and chemical industries;. (see example 22).<br>n. for rapid estimations of biocontaminants in laboratory cultures;. (see example 22)<br>o. for a rapid check of biopollutants under field conditions;. (see example 22).<br>p. agglutination compositions;. (see example 14, 15) | a. use of fluorescent colors in variety of paints, inks, textiles;<br>b. a composition of fluorescent dye for bleaching and brightening polymer;<br>c. leak detection with a full spectrum fluorescent dye;<br>d. use in automated chemical metering system;<br>e. to mark location of crashed air-crafts, life crafts, and equipment for example rockets;<br>f. under sea probes;<br>g. chromatophore sunscreen component of cosmetics creams and lotions;<br>h. fluorescent in situ hybridization application kit component for molecular diagnostics;<br>i. component of the non-radioactive labeling and detection kits of biochemistry, cell biology, immunochemistry, and molecular biology for labeling of DNA, RNA, Proteins and enzymes;<br>j. immunofluorescent detections;<br>k. counterstain of DIG-labeled oligonucleotide probes and Anti-DIG Fab-fragments;<br>l. singel and multiple flow cytometry applications;<br>m. fluorochrome stains for epifluorescence microscopy;. (see example 19–22).<br>n. for a quick check of biocontamination in the health food industry, cosmetic industry, pharmaceutical and chemical industries;. (see example 14, 16, 18)<br>o. For rapid estimations of biocontaminants in laboratory cultures. (see example 14, 16 and 18)<br>p. for a rapid check of biopollutants under |

TABLE 3-continued

Table showing various commercially important features of the three natural fluorescent dyes extracted from the sea cucumber *Holothuria scabra* by the present inventors. (The features are kept under different headings as shown in column no. 1)

| Heading/title | Fluorescent Dye -(CSIR NF 140 2001) patent filed U.S. patent Ser. No. 09/820,654 | Fluorescent Dye - (CSIR NF 152-2002)- Another co-pending Application U.S. patent Ser. No._____ | Fluorescent Dye - (CSIR NF 151-2002) Present Application U.S. patent Ser. No._____ |
|---|---|---|---|
| | industries; | q. a natural colorant; | field conditions; (see example 14, 16, 18) |
| | r. for rapid estimations of biocontaminants in laboratory cultures; | r. a bioactive composition of the marine dye in the ratio of 1:400000 in ultrapure water to obtain fluorescences of six colors at six different wavelengths and a phase contrast effect under transmitted light;. (see example 18, 19, 22) | q. for a rapid check of dead and live bacteria *E. coli..* (see example 14, 16, 18) |
| | s. for a rapid check of biopollutants under field conditions; | | r. a natural colorant; a bioactive composition of the marine dye in the ratio of 1:400000 to obtain fluorescences of six colors at three different wavelengths and a phase contrast effect under transmitted light;. (see example 13, 14) |
| | t. a competitive inhibitor of cholinesterases; | | |
| | u. in antimicrobial compositions;. (see example 10) | s. a dye for various fluorescent applications to be performed in areas of sub zero temperatures. | s. a dye for various fluroescent applications to be performed in areas of sub zero temperature.. (see example 5) |
| | v. as a biosurfactant in toiletry compositions;. (see example 9) | t. for fertilization rate increase in aquaculture industry. (see example 14, 15) | t. a dye for making conjugants with variety of biomolecules. |
| | w. a natural colorant; | u. for cell permeant membrane dye compositions.. (see example 24) | u. for cell permeant membrane dye compositions. |
| | x. a bioactive composition of the marine dye in the ratio of 1:40000 in ultrapure water to obtain fluorescences of three colors at three different wavelengths and a phase contrast effect under transmitted light; (see example 14) | v. for identification of dead and live cells in tissue cultures.. (see example 24) | v. for identification of dead and live cells in tissue cultures.. (see example 13, 15, 17) |
| | | w. for identification of dead and live cells/bacteria in food industries. (see example 24) | |
| | y. a dye br various fluorescent applications to be performed in areas of sub zero temperatures.. (see example 18) | x. for dye compositions in biosensors | w. for dye compositions in biosensors |
| | | y. as dye composition in molecular and microbiological kits.. (see example 24) | x. as dye composition in molecular and microbiological kits. (see example 13, 15, 17) |
| | | | y. A non-polar dye for detection of lipids and oils.. (see example 4, 8, 11) |

What is claimed is:

1. A non-polar and non-proteinaceous fluorescent dye obtained from an alcoholic extract of ovarian cells from the non bioluminescent marine organism *Holothuria scabra*, said dye having the following characteristics:
   i. having no decolorization when exposed to a reducing agent,
   ii. being a naturally produced compound,
   iii. orange in color in crude extract form,
   iv. bright orange in color in semi-purified form,
   v. emitting a variety of colors of the visible light spectrum,
   vi. having a pigment that is insoluble in water and alcohol,
   vii. having a pigment that is soluble in ether,
   viii. having pH 7.0,
   ix. not having a chromophore that can be reduced,
   x. emitting six different colored fluorescence at three different wavelengths of the UV and visible ranges,
   xi. emitting fluorescence of blue color emission in the 450 nm–470 nm range on excitation under light in the 330 nm–385 nm range,
   xii. emitting fluorescence of yellowish green color emission in the 510 nm–570 nm range on excitation under light in the 450 nm–480 nm range,
   xiii. emitting fluorescence of orange color emission in the 610 nm–650 nm range on excitation under light in the 510 nm–550 nm excitation range,
   xiv. emitting yellowish gray emission under light in the spectrum visible to the human eye,
   xv. emitting detectable fluorescence at a dilution range of 1:900,000 times
   xvi. the fluorescence of the dye persists even up to one year when preserved at about 4° C.,
   xvii. the fluorescence of the dye is highly stable against long expospres to direct light,
   xviii. the fluorescence of the dye does not change when the dye is frozen,
   xix. the dye is nontoxic,
   xx. the dye is permeable to living cell membranes,
   xxi. the dye is impermeable to dead eukaryotic cells and dead prokaryotic cells, and
   xxii. the dye is not degraded after staining cell components.

2. The dye according to claim 1 having multicolored emissions at different wavelengths of excitations.

3. The dye according to claim 1 having a blue colored fluorescence depending upon excitation wavelength.

4. The dye according to claim 1 having a yellow colored fluorescence depending upon excitation wavelength.

5. The dye according to claim 1 having an orange colored fluorescence depending upon excitation wavelength.

6. The dye according to claim 1 wherein the dye is stable at room temperature and has a long shelf life.

7. The dye according to claim 1 wherein the dye is incorporated into a kit which is exported at room temperature.

8. The dye according to claim 1 wherein the said dye is incorporated with a substrate for use in microscopy.

9. The dye according to claim 1 wherein the said dye is incorporated into a bioassay.

10. The dye according to claim 1 wherein the dye is incorporated with a cytogenetic slide.

11. The dye according to claim 1 wherein the dye is diluted with water in the ratio ranging between 1:450,000 to 1:900,000 giving fluorescence of six colors at three different wavelengths.

12. A composition comprising the dye according to claim 1 wherein the composition is used for at least one of the following applications:

i. as a flourescent coating composition or ink;
ii. as a fluorescent molecular probe;
iii. within a kit used in experiments to be performed in locations at subzero ° C.;
iv. as an agent for producing fluorochrome stains for epifluorescence microscopy;
v. within cell permeant dye compositions;
vi. a composition comprising the fluorescent dye for bleaching or brightening polymer;
vii. within a kit for leak detection with a full spectrum fluorescent dye;
viii. within an automated chemical metering system;
ix. within a kit to mark a location;
x. within an under sea probe;
xi. as a sun screen component of cosmetic creams or lotions;
xii. as a fluorescent in situ hybridization application kit component for molecular diagnostics;
xiii. as a component of non-radioactive labeling and detection kits;
xiv. as an immunofluorescent detection;
xv. as a counterstain of oligonucleotide probes or Fab-fragments;
xvi. as a component in single or multiple flow cytometry applications;
xvii. as a fluorochrome stain for epifluorescence microscopy;
xviii. as a component in a kit for detecting biocontamination in an industrial environment;
xix. as a component in a kit for detecting biocontamination in a laboratory environment;
xx. as a component in a kit for detecting biopollutants under field conditions;
xxi. as a component in a kit for detecting dead and live bacteria;
xxii. as a natural colorant;
xxiii. as a bioactive composition;
xxiv. as a dye for a fluorescent applications to be performed in areas of sub 0° C. temperatures;
xxv. as a dye for making a conjugant with a biomolecule;
xxvi. as a cell membrane permeant agent;
xxvii. as a component for identification of dead and live cells in tissue cultures;
xxviii. as a component for a biosensor;
xxix. as a component in molecular and microbiological kits; and
xxx. as a non-polar agent for detection of lipids and oils.

13. A process comprising diluting the dye according to claim 1 with water in the ratio ranging between 1:400,000 to 1:900,000 giving fluorescence of six colors at three different excitation wavelengths.

14. A process for preparation of a fluorescent dye from *Holothuria scabra*, which comprises the steps of:

removing the female gonads from *Holothuria scabra,*
extracting the gonads with alcohol to obtain a colored solution,
filtering the colored solution to obtain partially purified extract,
dissolving the extract in solvent ether, and
filtering the dissolved extract to obtain the fluorescent dye.

15. A non-polar and non-proteinaceous fluorescent dye obtained from an alcoholic extract of ovarian cells from the non bioluminescent marine organism *Holothuria scabra*.

* * * * *